US012770228B2

(12) United States Patent
Chen et al.

(10) Patent No.: US 12,770,228 B2
(45) Date of Patent: Oct. 20, 2026

(54) CONTROL BLURRING METHOD AND APPARATUS, TERMINAL DEVICE, AND READABLE STORAGE MEDIUM

(71) Applicant: HUAWEI TECHNOLOGIES CO., LTD., Shenzhen (CN)

(72) Inventors: Jian Chen, Shanghai (CN); Kun Cui, Shanghai (CN); Liang Wang, Shanghai (CN); Yonglang Wang, Shanghai (CN); Ran Huang, Beijing (CN); Yuheng Chen, Shanghai (CN); Chen Wang, Shanghai (CN); Chen Zhang, Shenzhen (CN); Yu Li, Shanghai (CN); Chao Liu, Shanghai (CN); Qucheng Zhi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 158 days.

(21) Appl. No.: 18/252,718

(22) PCT Filed: Nov. 22, 2021

(86) PCT No.: PCT/CN2021/132150

§ 371 (c)(1),
(2) Date: May 11, 2023

(87) PCT Pub. No.: WO2022/105920

PCT Pub. Date: May 27, 2022

(65) Prior Publication Data

US 2023/0419454 A1 Dec. 28, 2023

(30) Foreign Application Priority Data

Nov. 23, 2020 (CN) ......................... 202011326712.4
Nov. 30, 2020 (CN) ......................... 202011386556.0

(Continued)

(51) Int. Cl.
*G06T 5/70* (2024.01)
*G06T 11/20* (2006.01)
*G06T 13/00* (2011.01)

(52) U.S. Cl.
CPC ................ *G06T 5/70* (2024.01); *G06T 11/20* (2013.01); *G06T 13/00* (2013.01)

(58) Field of Classification Search
CPC . G06T 5/70; G06T 11/20; G06T 13/00; G06T 5/50; G06T 15/205;

(Continued)

(56) References Cited

U.S. PATENT DOCUMENTS 7,490,295 B2 2/2009 Chaudhri et al.
9,734,551 B1 * 8/2017 Esteban ................ H04N 1/387

(Continued)

FOREIGN PATENT DOCUMENTS

AU 2013206601 A1 1/2015
CN 103593155 A 2/2014

(Continued)

*Primary Examiner* — Kent W Chang
*Assistant Examiner* — Karl Duc Truong

(57) ABSTRACT

A control blurring method and apparatus, a terminal device, and a readable storage medium are provided, which are applicable to the terminal field. The method includes: obtaining a dynamic parameter of a first control in a first frame image during drawing of the first frame image; encapsulating a drawing result of the first frame image and a dynamic parameter, to obtain a result of the encapsulation; performing composition on the drawing result of the first frame image based on the dynamic parameter, to obtain a composition result having a blur effect of the first frame image; and performing display based on the composition result of the first frame image.

13 Claims, 38 Drawing Sheets

(30) Foreign Application Priority Data

Nov. 30, 2020 (CN) ......................... 202011386560.7
Dec. 28, 2020 (CN) ......................... 202011595573.5

(58) Field of Classification Search
CPC ....... G06T 2207/20221; G06F 3/04817; G06F 3/0488; G06F 3/0481; H04N 5/265; H04N 21/440218
See application file for complete search history.

(56) References Cited

U.S. PATENT DOCUMENTS

| | | | | |
|---|---|---|---|---|
| 10,365,758 | B1* | 7/2019 | Smith | G06F 3/048 |
| 2008/0297518 | A1* | 12/2008 | Sayre | G06T 5/70 345/474 |
| 2012/0154426 | A1* | 6/2012 | Darsa | G09G 5/14 345/592 |
| 2012/0293545 | A1* | 11/2012 | Engh-Halstvedt | G09G 5/14 345/531 |
| 2013/0201196 | A1* | 8/2013 | Harper | G09G 5/393 345/545 |
| 2013/0230259 | A1* | 9/2013 | Intwala | G06T 11/00 382/255 |
| 2014/0078172 | A1* | 3/2014 | Systrom | G06F 3/041 345/629 |
| 2014/0267362 | A1* | 9/2014 | Kocienda | G06T 11/60 345/592 |
| 2015/0002545 | A1* | 1/2015 | Webster | G09G 5/377 345/634 |
| 2016/0370864 | A1 | 12/2016 | Choi et al. | |
| 2017/0011494 | A1 | 1/2017 | Ahn et al. | |
| 2017/0038966 | A1* | 2/2017 | Chaudhri | G06F 3/04883 |
| 2017/0278276 | A1 | 9/2017 | Raubacher et al. | |
| 2017/0278286 | A1* | 9/2017 | An | G06T 11/60 |
| 2019/0042059 | A1* | 2/2019 | Baer | G06F 3/0481 |
| 2019/0095086 | A1* | 3/2019 | Conn | G06F 3/04847 |
| 2019/0156469 | A1* | 5/2019 | Choi | G06T 3/403 |
| 2021/0049950 | A1* | 2/2021 | Bae | G09G 3/20 |

FOREIGN PATENT DOCUMENTS

| | | | |
|---|---|---|---|
| CN | 104010212 | A | 8/2014 |
| CN | 106990951 | A | 7/2017 |
| CN | 107346250 | A | 11/2017 |
| CN | 107832103 | A | 3/2018 |
| CN | 108268288 | A | 7/2018 |
| CN | 111338743 | A | 6/2020 |
| WO | 2014149474 | A1 | 9/2014 |

* cited by examiner

CONTROL BLURRING METHOD AND APPARATUS, TERMINAL DEVICE, AND READABLE STORAGE MEDIUM

This application is a national stage of International Application No. PCT/CN2021/132150, filed on Nov. 22, 2021, which claims priority to Chinese Patent Application No. 202011326712.4, filed on Nov. 23, 2020, and Chinese Patent Application No. 202011595573.5, filed on Dec. 28, 2020 and Chinese Patent Application No. 202011386556.0, filed on Nov. 30, 2020 and Chinese Patent Application No. 202011386560.7, filed on Nov. 30, 2020. All of the aforementioned patent applications are hereby incorporated by reference in their entireties.

TECHNICAL FIELD

This application relates to the terminal field, and in particular, to a control blurring method and apparatus, a terminal device, and a readable storage medium.

BACKGROUND

In a terminal device, it is common to display a control by using an animation effect. When the control is displayed, a background of the control is usually blurred. For example, a background screenshot of a position of the control is blurred and then is used as the background of the control.

According to the existing technologies, a blurring parameter and a frame image that is generated through drawing and rendering are separately obtained in a composition process, and then blurring processing is performed, based on the blurring parameter, on the frame image that is generated through drawing and rendering. Finally, an obtained image is used as a background of a control for composition display.

However, sometimes the composition process may obtain a wrong blurring parameter, and therefore a wrong blurring parameter is used for a frame image on which blurring processing is being performed. This causes a poor effect of composition display.

SUMMARY

Embodiments of this application provide a control blurring method and apparatus, a terminal device, and a readable storage medium, to resolve a problem that a displayed frame has a wrong blurred background because in a current period, a blurring parameter of a current frame is transmitted to a composition phase while the composition phase does not receive the current frame, and the blurring parameter is used for a wrong frame.

According to a first aspect, an embodiment of this application provides a control blurring method, including: obtaining a dynamic parameter of a first control in a first frame image during drawing of the first frame image; encapsulating a drawing result and the dynamic parameter of the first frame image; performing composition on the drawing result of the first frame image based on the dynamic parameter, to obtain a composition result having a blur effect of the first frame image, where the dynamic parameter and the drawing result of the first frame image are obtained from a result of the encapsulation; and performing display based on the composition result of the first frame image.

The control blurring method according to the first aspect may be applied to a terminal device such as a mobile phone, a tablet computer, a wearable device, an in-vehicle device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the terminal device is not limited in embodiments of this application.

The dynamic parameter is a part of a blurring parameter, and may be used for blurring processing. The first frame image may be a current frame image on which drawing and rendering are being performed in a drawing and rendering process. The first control is a control marked for blurring.

It should be noted that, when the control blurring method provided in this application is applied, two or more processes may be included. For example, a drawing and rendering process for drawing and rendering and a composition thread for blurring composition may be included. The dynamic parameter of the first control in the first frame image is obtained in the drawing and rendering process. The drawing result and the dynamic parameter of the first frame image are encapsulated. The result of the encapsulation is transferred to the composition thread. The dynamic parameter and the drawing result of the first frame image are obtained from the result of the encapsulation in the composition thread. Composition is performed on the drawing result of the first frame image based on the dynamic parameter.

In the first aspect, the drawing result and the dynamic parameter of the first frame image are encapsulated. Composition is performed based on the result of the encapsulation, to obtain the composition result having the blur effect of the first frame image. Display is performed based on the composition result of the first frame image. After the drawing result and the dynamic parameter of the first frame image are encapsulated, the drawing result and the dynamic parameter of the first frame image are parameters associated with each other. When encapsulation is performed based on the dynamic parameter, composition is performed based on the drawing result of the first frame image. In this case, the dynamic parameter is not used for a wrong frame image, and it can be ensured that a correct dynamic parameter is used for the frame image for composition.

In some implementations, the first frame image may include at least one control. In the at least one control, a control whose control property includes a blurring tag is the first control, and the blurring tag is used to indicate to perform blurring on the first control.

In some other implementations, the first frame image may include at least one control. A control property of the at least one control includes a blurring tag. When the blurring tag is true, the control is the first control. The blurring tag is used to indicate to perform blurring on the first control.

For example, it may be determined whether the blurring tag is true based on a tag value of the blurring tag. For example, if the tag value is 1, it is determined that the blurring tag is true; or if the tag value is 0, it is determined that the blurring tag is false. When the blurring tag is false, the control does not need to be blurred.

In some implementations, the dynamic parameter is a parameter that is of the first control and that changes over time. The dynamic parameter includes one or more of coordinates, a size, a radius of a rounded corner, and transparency of the control.

In some implementations, before performing composition based on the result of the encapsulation, to obtain the composition result having the blur effect of the first frame image, the method further includes: obtaining a static parameter of the first control in the first frame image, where the static parameter includes a blur type and a blur strength.

The performing composition based on the result of the encapsulation, to obtain the composition result having the blur effect of the first frame image includes: performing composition based on the result of the encapsulation and the static parameter, to obtain the composition result having the blur effect of the first frame image.

In some implementations, the performing composition based on the result of the encapsulation and the static parameter, to obtain the composition result having the blur effect of the first frame image includes: obtaining the drawing result and the dynamic parameter of the first frame image based on the result of the encapsulation; determining, based on the dynamic parameter, an area corresponding to the first control in the drawing result of the first frame image; performing, based on the static parameter, blurring processing on the area corresponding to the first control in the drawing result of the first frame image, to obtain a blurred area image; and performing composition based on the drawing result of the first frame image and the blurred area image, to obtain the composition result having the blur effect of the first frame image.

In some implementations, the obtaining a dynamic parameter of a first control in a first frame image includes: obtaining the dynamic parameter of the first control according to a drawing instruction for drawing the first frame image.

In some implementations, the encapsulating a drawing result and the dynamic parameter of the first frame image includes: storing the drawing result and the dynamic parameter of the first frame image that are associated with each other, to obtain the result of the encapsulation.

In some implementations, the drawing result of the first frame image includes drawing results of one or more layers, where a drawing result of each layer is drawn based on one or more controls at the layer, and the layer includes memory space used to store the drawing result and layer information.

According to a second aspect, an embodiment of this application provides a control blurring apparatus. The apparatus includes: an obtaining module, configured to obtain a dynamic parameter of a first control in a first frame image during drawing of the first frame image; an encapsulation module, configured to encapsulate a drawing result and the dynamic parameter of the first frame image; a composition module, configured to perform composition based on a result of the encapsulation, to obtain a composition result having a blur effect of the first frame image; and a display module, configured to perform display based on the composition result of the first frame image.

In some implementations, the first frame image may include at least one control. In the at least one control, a control whose control property includes a blurring tag is the first control, and the blurring tag is used to indicate to perform blurring on the first control.

In some other implementations, the first frame image may include at least one control. A control property of the at least one control includes a blurring tag. When the blurring tag is true, the control is the first control. The blurring tag is used to indicate to perform blurring on the first control.

In some implementations, the dynamic parameter is a parameter that is of the first control and that changes over time. The dynamic parameter includes one or more of coordinates, a size, a radius of a rounded corner, and transparency of the control.

In some implementations, the obtaining module is further configured to obtain a static parameter of the first control in the first frame image, where the static parameter includes a blur type and a blur strength.

The composition module is specifically configured to perform composition based on the result of the encapsulation and the static parameter, to obtain the composition result having the blur effect of the first frame image.

In some implementations, the composition module is specifically configured to obtain the drawing result and dynamic parameter of the first frame image based on the result of the encapsulation; determine, based on the dynamic parameter, an area corresponding to the first control in the drawing result of the first frame image; perform, based on the static parameter, blurring processing on the area corresponding to the first control in the drawing result of the first frame image, to obtain a blurred area image; and perform composition based on the drawing result of the first frame image and the blurred area image, to obtain the composition result having the blur effect of the first frame image.

In some implementations, the obtaining module is specifically configured to obtain the dynamic parameter of the first control according to a drawing instruction for drawing the first frame image.

In some implementations, the encapsulation module is specifically configured to store the drawing result and the dynamic parameter of the first frame image that are associated with each other, to obtain the result of the encapsulation.

In some implementations, the drawing result of the first frame image includes drawing results of one or more layers, where a drawing result of each layer is drawn based on one or more controls at the layer, and the layer includes memory space used to store the drawing result and layer information.

According to a third aspect, an embodiment of this application provides a terminal device, including: at least one processor, a memory, and a computer program that is stored in the memory and that can be run on the at least one processor. The processor executes the computer program, to implement the method according to the first aspect.

According to a fourth aspect, an embodiment of this application provides a computer-readable storage medium. The computer-readable storage medium stores a computer program. When a processor executes the computer program, the method according to the first aspect is implemented.

According to a fifth aspect, an embodiment of this application provides a computer program product. When the computer program product is run on a terminal device, the terminal device is enabled to perform the method according to the first aspect.

According to a sixth aspect, an embodiment of this application provides a chip system. The chip system includes a memory and a processor. The processor executes a computer program stored in the memory, to implement the method according to the first aspect.

According to a seventh aspect, an embodiment of this application provides a chip system. The chip system includes a processor. The processor is coupled to the computer-readable storage medium provided in the fourth aspect. The processor executes a computer program stored in the computer-readable storage medium, to implement the method according to the first aspect.

It may be understood that, for beneficial effects of the second aspect to the seventh aspect, refer to related descriptions in the first aspect. Details are not described herein again.

Embodiments of this application provide a layer blurring method and apparatus, an electronic device, and a readable storage medium, to resolve problems of increase in GPU load and power consumption and decrease in battery life of the electronic device caused by drawing every window interface by using a GPU.

According to an eighth aspect, an embodiment of this application provides a layer blurring method, applied to an electronic device. The method includes: obtaining first layers of a first frame image, where the first layer includes a drawing result of the first frame image; determining a second layer based on the first layers, where the second layer is a layer that is in the first layers and that is used to generate a blurred layer; performing composition to obtain the blurred layer based on the second layer and a blurring parameter of a first control in the first layer, where the blurred layer includes an unblurred area and an area blurred based on the blurring parameter of the first control; obtaining, based on the blurred layer and the unblurred layer, a composition result having a blur effect of the first frame image; and performing display based on the composition result of the first frame image.

The layer blurring method according to the eighth aspect may be applied to an electronic device such as a mobile phone, a tablet computer, a wearable device, an in-vehicle device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

Each first layer may correspond to a window interface of an application. The drawing result of the first frame image corresponding to the first layer is a window interface of an application. The window interface is stored in the layer as a texture obtained through drawing and rendering.

It should be noted that the layer is a data structure, and the layer may be memory space used to store a drawing result and layer information. The layer information may include layer property information such as a layer identifier, a layer size, and a layer resolution. The layer information may further include other layer-related information, for example, may further include a blurring tag, a blurring parameter, and the like.

In this application, blurring processing is performed by a GPU only on the second layer determined based on the blurring tag, to generate the blurred layer. The blurred layer and the unblurred layer are composed to obtain the composition result having the blur effect of the first frame of image. Display is performed based on the composition result of the first frame image. Because the GPU processes only the layer indicated by the blurring tag, and does not need to process each layer, load and power consumption of the GPU can be reduced, and a battery life of the electronic device can be extended.

In some implementations, the determining a second layer based on the first layers includes: obtaining a blurring tag in the first layers and a layer sequence of the first layers, where the blurring tag includes a top-blurring tag or a bottom-blurring tag; and the blurring tag includes a top-blurring tag or a bottom-blurring tag; if the blurring tag is the top-blurring tag, the second layer includes a first layer including the blurring tag and a first layer below the first layer including the blurring tag; and/or if the blurring tag is the bottom-blurring tag, the second layer includes the first layer below the first layer including the blurring tag.

In some implementations, the unblurred layer is a first layer not indicated by the blurring tag.

In some implementations, the blurring parameter includes a dynamic parameter and a static parameter. The dynamic parameter is a parameter that is of the first control and that changes over time. The dynamic parameter includes one or more of coordinates, a size, a corner radius, and transparency of a control. The static parameter includes a blur type and a blur strength.

In some implementations, the performing composition to obtain the blurred layer based on the second layer and a blurring parameter of a first control in the first layer includes: determining to-be-blurred content in the second layer based on the dynamic parameter; and performing blurring processing on the to-be-blurred content based on the static parameter, to generate the blurred layer.

In some implementations, the performing blurring processing on the to-be-blurred content based on the static parameter, to generate the blurred layer includes: creating the blurred layer, where the blurred layer includes the to-be-blurred content; performing down-sampling on the to-be-blurred content, to obtain a to-be-blurred image; performing blurring processing on the to-be-blurred content based on the static parameter, to obtain a blurred image; and enlarging the blurred image to a size same as a size of the to-be-blurred content, and updating the blurred layer on the image.

In some implementations, when the obtaining, based on the blurred layer and the unblurred layer, a composition result having a blur effect of the first frame image includes: obtaining a quantity of blurring tags; and if the quantity of the blurring tags is 1, inputting the blurred layer and the unblurred layer to a composition acceleration apparatus, and performing composition to obtain the composition result having the blur effect of the first frame image; or if the quantity of the blurring tags is an integer greater than 1, inputting the blurred layer and the unblurred layer to a graphics processing unit, and performing composition to obtain the composition result having the blur effect of the first frame image.

In some implementations, before the inputting the blurred layer and the unblurred layer to a composition acceleration apparatus, and performing composition to obtain the composition result having the blur effect of the first frame image, the method further includes: obtaining a first quantity, where the first quantity is a quantity of channels in the composition acceleration apparatus; obtaining a second quantity, where the second quantity is a sum of a quantity of unblurred layers and a quantity of blurred layers; and if the second quantity is greater than the first quantity, combining at least two consecutive unblurred layers in the layer sequence into one unblurred layer, so that the second quantity is equal to or smaller than the first quantity.

In some implementations, the method further includes: if layer information of the first layers does not include the blurring tag, sending the first layers to the composition acceleration apparatus according to the layer sequence for composition, to obtain the composition result of the first frame image.

In some implementations, the layer sequence refers to a sequence of the first layers arranged in a direction perpendicular to a screen.

According to a ninth aspect, an embodiment of this application provides a layer blurring apparatus, applied to an electronic device. The apparatus includes: an obtaining module, configured to obtain first layers of a first frame image, where the first layer includes a drawing result of a first frame image; a determining module, configured to determine a second layer based on the first layers, where the second layer is a layer that is in the first layers and that is used to generate a blurred layer; a composition module, configured to perform composition to obtain the blurred layer based on the second layer and a blurring parameter of a first control in the first layer, where the blurred layer includes an unblurred area and an area blurred based on the blurring parameter of the first control, where the composition module is further configured to obtain, based on the blurred layer and an unblurred layer, a composition result having a blur effect of the first frame image; and a display module, configured to perform display based on the composition result of the first frame image.

In some implementations, the determining module is specifically configured to obtain a blurring tag in the first layers and a layer sequence of the first layers, where the blurring tag includes a top-blurring tag or a bottom-blurring tag; and if the blurring tag is the top-blurring tag, the second layer includes a first layer including the blurring tag and a first layer below the first layer including the blurring tag; and/or if the blurring tag is the bottom-blurring tag, the second layer includes the first layer below the first layer including the blurring tag.

In some implementations, the unblurred layer is a first layer not indicated by the blurring tag.

In some implementations, the blurring parameter includes a dynamic parameter and a static parameter. The dynamic parameter is a parameter that is of the first control and that changes over time. The dynamic parameter includes one or more of coordinates, a size, a corner radius, and transparency of a control. The static parameter includes a blur type and a blur strength.

In some implementations, the composition module is specifically configured to determine to-be-blurred content in the second layer based on the dynamic parameter; and perform blurring processing on the to-be-blurred content based on the static parameter, to generate the blurred layer.

In some implementations, the composition module is specifically configured to: create the blurred layer, where the blurred layer includes the to-be-blurred content; perform down-sampling on the to-be-blurred content, to obtain a to-be-blurred image; perform blurring processing on the to-be-blurred content based on the static parameter, to obtain a blurred image; and enlarge the blurred image to a size same as a size of the to-be-blurred content, and update the blurred layer on the image.

In some implementations, the composition module is specifically configured to: obtain a quantity of blurring tags; and if the quantity of the blurring tags is 1, input the blurred layer and the unblurred layer to a composition acceleration apparatus, and perform composition to obtain the composition result having the blur effect of the first frame image; or if the quantity of the blurring tags is an integer greater than 1, input the blurred layer and the unblurred layer to a graphics processing unit, and perform composition to obtain the composition result having the blur effect of the first frame image.

In some implementations, the obtaining module is further configured to obtain a first quantity, where the first quantity is a quantity of channels in the composition acceleration apparatus; and obtain a second quantity, where the second quantity is a sum of a quantity of unblurred layers and a quantity of blurred layers. If the second quantity is greater than the first quantity, the composition module is further configured to combine at least two consecutive unblurred layers in the layer sequence into one unblurred layer, so that the second quantity is equal to or smaller than the first quantity.

In some implementations, the composition module is further configured to: if layer information of the first layers does not include the blurring tag, send the first layers to the composition acceleration apparatus according to the layer sequence for composition, to obtain the composition result of the first frame image.

In some implementations, the layer sequence refers to a sequence of the first layers arranged in a direction perpendicular to a screen.

According to a tenth aspect, an embodiment of this application provides an electronic device including: at least one processor, a memory, and a computer program that is stored in the memory and that can be run on the at least one processor. The processor executes the computer program, to implement the method according to the eighth aspect.

According to an eleventh aspect, an embodiment of this application provides a computer-readable storage medium. The computer-readable storage medium stores a computer program. When a processor executes the computer program, the method according to the eighth aspect is implemented.

According to a twelfth aspect, an embodiment of this application provides a computer program product. When the computer program product runs on an electronic device, the electronic device is enabled to perform the method according to the eighth aspect.

According to a thirteenth aspect, an embodiment of this application provides a chip system. The chip system includes a memory and a processor. The processor executes a computer program stored in the memory, to implement the method according to the eighth aspect.

According to a fourteenth aspect, an embodiment of this application provides a chip system. The chip system includes a processor. The processor is coupled to the computer-readable storage medium provided in the eleventh aspect. The processor executes a computer program stored in the computer-readable storage medium, to implement the method according to the eighth aspect.

It may be understood that, for beneficial effects of the ninth aspect to the fourteenth aspect, refer to the related descriptions in the eighth aspect. Details are not described herein again.

Embodiments of this application provide a transcoding method and apparatus, a terminal device, and a readable storage medium, to resolve a problem of slow composition speed and a problem of frame freezing or frame loss of presented video content, which are caused due to composition thread blockage by a composition service.

According to a fifteenth aspect, an embodiment of this application provides a transcoding method. The method includes: obtaining first layers of an $x^{th}$ first frame image, where x is an integer greater than 0; determining a second layer based on a blurring tag in layer information of the first layers and a layer sequence; if it is determined that the second layer includes a to-be-transcoded video layer, performing blurring composition based on a transcoding result of an $(x-1)^{th}$ frame of a to-be-transcoded video in the to-be-transcoded video layer, to obtain a composition result having a blur effect of the $x^{th}$ first frame image, where the transcoding result of the $(x-1)^{th}$ frame of the to-be-transcoded video is obtained through transcoding performed during composition of an $(x-1)^{th}$ first frame image; and performing display based on the composition result having the blur effect of the $x^{th}$ first frame image.

A transcoding method according to the fifteenth aspect may be applied to a terminal device such as a mobile phone, a tablet computer, a wearable device, an in-vehicle device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the terminal device is not limited in embodiments of this application.

Each first layer may correspond to a window interface of an application. For example, a video layer may correspond to a window interface of a video application. The window interface is stored in the layer as a texture obtained through drawing and rendering.

It should be noted that the layer is a data structure, and the layer may be memory space used to store a drawing result and layer information. The layer information may include layer property information such as a layer identifier, a layer size, and a layer resolution. The layer information may further include other layer-related information, for example, may further include a blurring tag, a blurring parameter, and the like.

During control blurring, according to the transcoding method provided in first aspect, when a blurred layer includes a to-be-transcoded video layer, blurring composition may be performed by using a transcoding result of an $(x-1)^{th}$ frame of a to-be-transcoded video, to obtain a composition result having a blur effect of an $x^{th}$ first frame image. During blurring composition, a transcoding result obtained through transcoding is used, and blurring composition and hardware transcoding are performed asynchronously, so that time spent on waiting for completion of transcoding can be reduced. In this way, a probability of composition process blockage can be reduced, and a composition speed is effectively improved. As a result, visual effect is smoother, and visual experience of a user is improved.

In some implementations, the determining that the second layer includes the to-be-transcoded video layer includes: traversing second layers to obtain a compression format of each second layer; if the compression format of the second layer is a video compression format, determining that the second layer is a video layer; obtaining a list of video compression formats supported by a graphics processing unit; and if the compression format of the second layer is not on the list of the video compression formats supported by the GPU, determining that the second layer is the to-be-transcoded video layer.

In some implementations, if it is determined that the second layer includes the to-be-transcoded video layer, the method further includes: performing transcoding processing on an $x^{th}$ frame of the to-be-transcoded video in the video layer, to obtain a transcoding result of the $x^{th}$ frame.

In some implementations, the performing transcoding processing on an $x^{th}$ frame of the to-be-transcoded video in the video layer, to obtain a transcoding result of the $x^{th}$ frame includes: obtaining a hardware transcoding service; performing transcoding processing on the $x^{th}$ frame of the to-be-transcoded video by using the hardware transcoding service; and after transcoding processing for the $x^{th}$ frame of the to-be-transcoded video is completed, storing the transcoding processing result of the $x^{th}$ frame of the to-be-transcoded video, and adding a transcoding completion flag marking the $x^{th}$ frame.

In some implementations, the performing transcoding processing on the $x^{th}$ frame of the to-be-transcoded video by using the hardware transcoding service includes: obtaining a first compression format of the $x^{th}$ frame of the to-be-transcoded video; and sending the $x^{th}$ frame of the to-be-transcoded video to a hardware transcoding module, and converting the first compression format into a second compression format by using the hardware transcoding module, to obtain the transcoding result of the $x^{th}$ frame of the to-be-transcoded video.

In some implementations, if it is determined that the second layer includes the to-be-transcoded video layer, before the performing blurring composition based on a transcoding result of an $(x-1)^{th}$ frame of a to-be-transcoded video in the to-be-transcoded video layer, the method further includes: detecting a transcoding completion flag of the $(x-1)^{th}$ frame.

The performing blurring composition based on a transcoding result of an $(x-1)^{th}$ frame of a to-be-transcoded video in the to-be-transcoded video layer includes: if the transcoding completion flag of the $(x-1)^{th}$ frame is detected, performing blurring composition based on the transcoding result of the $(x-1)^{th}$ frame of the to-be-transcoded video in the to-be-transcoded video layer; or if the transcoding completion flag of the $(x-1)^{th}$ frame is not detected, after transcoding processing for the $(x-1)^{th}$ frame of the to-be-transcoded video is completed, performing blurring composition based on the transcoding result of the $(x-1)^{th}$ frame of the to-be-transcoded video in the to-be-transcoded video layer.

In some implementations, the first layer includes a drawing result of the first frame image.

The performing blurring composition based on a transcoding result of an $(x-1)^{th}$ frame of a to-be-transcoded video in the to-be-transcoded video layer, to obtain a composition result having a blur effect of the $x^{th}$ first frame image includes: performing composition to obtain a blurred layer based on the second layer and a blurring parameter of a first control in the first layer, where the video layer in the second layer includes the transcoding result of the $(x-1)^{th}$ frame of the to-be-transcoded video, and the blurred layer includes an unblurred area and an area that is blurred based on the blurring parameter of the first control; and obtaining, based on the blurred layer and an unblurred layer, the composition result having the blur effect of the first frame image.

In some implementations, the second layer is a layer that is in the first layers and that is used to generate the blurred layer.

In some implementations, the unblurred layer is a first layer not indicated by the blurring tag.

In some implementations, the blurring parameter includes a dynamic parameter and a static parameter. The dynamic parameter is a parameter that is of the first control and that changes over time. The dynamic parameter includes one or more of coordinates, a size, a corner radius, and transparency of a control. The static parameter includes a blur type and a blur strength.

According to a sixteenth aspect, an embodiment of this application provides a transcoding apparatus. The apparatus includes: an obtaining module, configured to obtain first layers of an $x^{th}$ first frame image, where x is an integer greater than 0; a determining module, configured to determine a second layer based on a blurring tag in layer information of the first layers and a layer sequence; a composition module, configured to: if it is determined that the second layer includes a to-be-transcoded video layer, perform blurring composition based on a transcoding result of an $(x-1)^{th}$ frame of a to-be-transcoded video in the to-be-transcoded video layer, to obtain a composition result having a blur effect of the $x^{th}$ first frame image, where the transcoding result of the $(x-1)^{th}$ frame of the to-be-transcoded video is obtained through transcoding performed during composition of an $(x-1)^{th}$ first frame image; and a display module, configured to perform display based on the composition result having the blur effect of the $x^{th}$ first frame image.

In some implementations, the determining module is further configured to traverse second layers to obtain a compression format of each second layer; if the compression format of the second layer is a video compression format, determine that the second layer is a video layer; obtain a list of video compression formats supported by a graphics processing unit; and if the compression format of the second layer is not on the list of the video compression formats supported by the GPU, determine that the second layer is the to-be-transcoded video layer.

In some implementations, the apparatus further includes a transcoding module, configured to perform transcoding processing on an $x^{th}$ frame of the to-be-transcoded video in the video layer, to obtain a transcoding result of the $x^{th}$ frame.

In some implementations, the transcoding module is specifically configured to obtain a hardware transcoding service; perform transcoding processing on the $x^{th}$ frame of the to-be-transcoded video by using the hardware transcoding service; and after transcoding processing for the $x^{th}$ frame of the to-be-transcoded video is completed, store a transcoding processing result of the $x^{th}$ frame of the to-be-transcoded video, and add a transcoding completion flag marking the $x^{th}$ frame.

In some implementations, the transcoding module is specifically configured to obtain a first compression format of the $x^{th}$ frame of the to-be-transcoded video; and send the $x^{th}$ frame of the to-be-transcoded video to a hardware transcoding module, and convert the first compression format into a second compression format by using the hardware transcoding module, to obtain the transcoding result of the $x^{th}$ frame of the to-be-transcoded video.

In some implementations, the apparatus further includes a detection module, configured to detect a transcoding completion flag of the $(x-1)^{th}$ frame. The composition module is specifically configured to: if the transcoding completion flag of the $(x-1)^{th}$ frame is detected, perform blurring composition based on the transcoding result of the $(x-1)^{th}$ frame of the to-be-transcoded video in the to-be-transcoded video layer; or if the transcoding completion flag of the $(x-1)^{th}$ frame is not detected, after transcoding processing for the $(x-1)^{th}$ frame of the to-be-transcoded video is completed, perform blurring composition based on the transcoding result of the $(x-1)^{th}$ frame of the to-be-transcoded video in the to-be-transcoded video layer.

In some implementations, the first layer includes a drawing result of the first frame image. The composition module is specifically configured to perform composition to obtain a blurred layer based on the second layer and a blurring parameter of a first control in the first layer, where the video layer in the second layer includes the transcoding result of the $(x-1)^{th}$ frame of the to-be-transcoded video, and the blurred layer includes an unblurred area and an area that is blurred based on the blurring parameter of the first control; and obtain, based on the blurred layer and the unblurred layer, the composition result having the blur effect of the first frame image.

In some implementations, the second layer is a layer that is in the first layers and that is used to generate the blurred layer.

In some implementations, the unblurred layer is a first layer not indicated by the blurring tag.

In some implementations, the blurring parameter includes a dynamic parameter and a static parameter. The dynamic parameter is a parameter that is of the first control and that changes over time. The dynamic parameter includes one or more of coordinates, a size, a corner radius, and transparency of a control. The static parameter includes a blur type and a blur strength.

According to a seventeenth aspect, an embodiment of this application provides a terminal device including: at least one processor, a memory, and a computer program that is stored in the memory and that can be run on the at least one processor. The processor runs the computer program to implement the method according to the fifteenth aspect.

According to an eighteenth aspect, an embodiment of this application provides a computer-readable storage medium. The computer-readable storage medium stores a computer program. When a processor executes the computer program, the method according to the fifteenth aspect is implemented.

According to a nineteenth aspect, an embodiment of this application provides a computer program product. When the computer program product is run on a terminal device, the terminal device is enabled to implement the method according to the fifteenth aspect.

According to a twentieth aspect, an embodiment of this application provides a chip system. The chip system includes a memory and a processor. The processor executes a computer program stored in the memory, to implement the method according to the fifteenth aspect.

According to a twenty-first aspect, an embodiment of this application provides a chip system. The chip system includes a processor. The processor is coupled to the computer-readable storage medium provided in the fourth aspect. The processor executes a computer program stored in the computer-readable storage medium, to implement the method according to the fifteenth aspect.

It may be understood that, for beneficial effects of the sixteenth aspect to the twenty-first aspect, refer to the related descriptions in the fifteenth aspect. Details are not described herein again.

DESCRIPTION OF EMBODIMENTS

Figure 1:
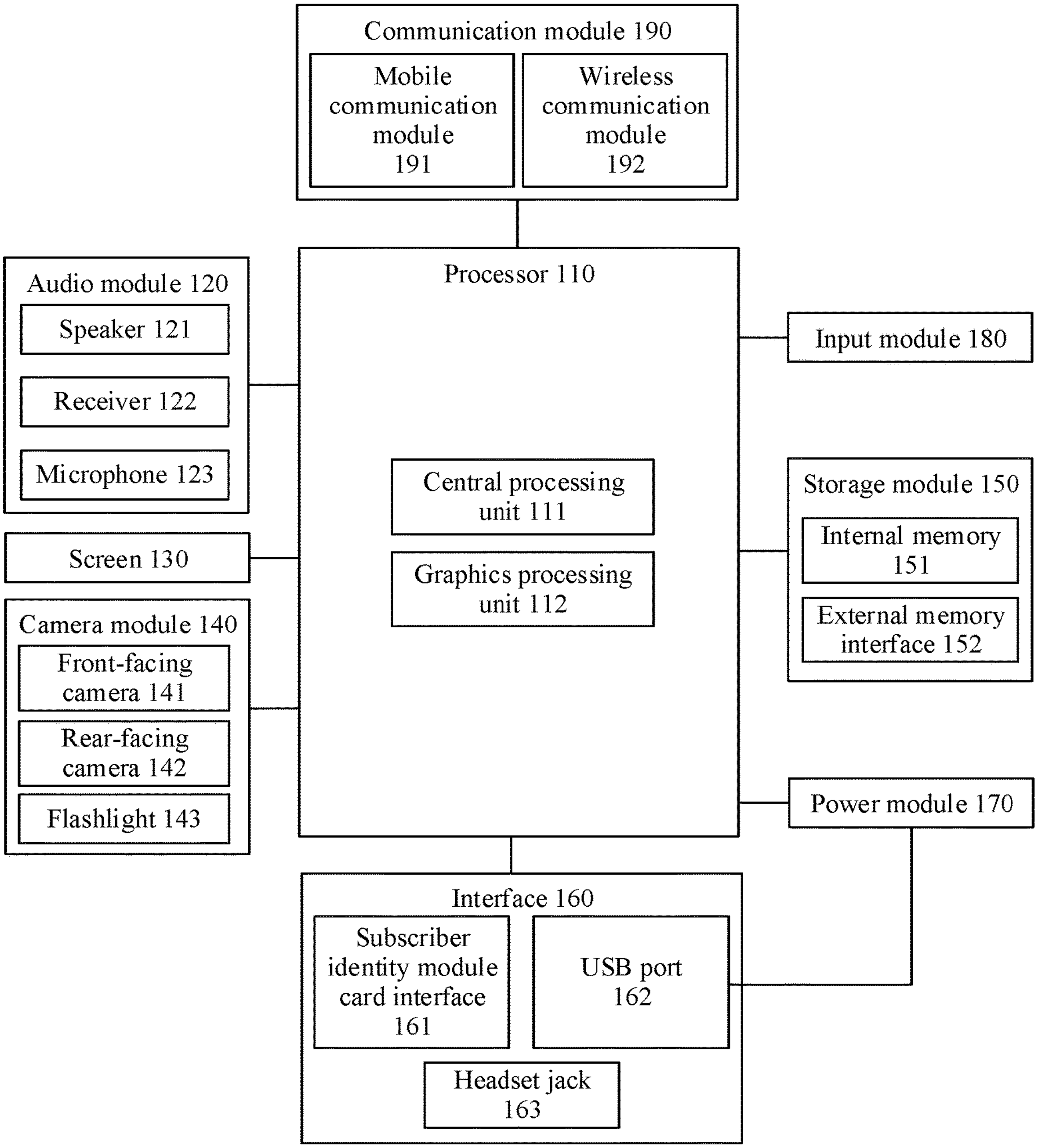
FIG. 1 is a schematic diagram of a structure of a terminal device according to an embodiment of this application.

In the following descriptions, for description instead of limitation, specific details such as a particular system structure and a technology are provided to facilitate a thorough understanding of embodiments of this application. However, a person skilled in the art should know that this application may also be implemented in other embodiments without these specific details. In other cases, detailed descriptions of well-known systems, apparatuses, circuits, and methods are omitted, so that this application is described without being obscured by unnecessary details.

It should be further understood that the term "and/or" used in the specification and the appended claims indicates any combination and all possible combinations of one or more items listed in association, and includes the combinations.

As used in the specification and the appended claims, the term "if" may be interpreted as "when", "once", "in response to determining", or "in response to detecting" depending on the context. Similarly, the phrase "if it is determined" or "if the [described condition or event] is detected" may be interpreted as "once determined", "in response to determining", "once the [described condition or event] is detected", or "in response to detecting the [described condition or event]" depending on the context.

In addition, in the descriptions of the specification and appended claims, the terms "first", "second", "third", and the like are merely used for differentiation and description, but shall not be understood as an indication or an implication of relative importance.

Reference to "an embodiment", "some embodiments", or the like described in the specification of this application indicates that one or more embodiments of this application include a specific feature, structure, or characteristic described with reference to the embodiments. Therefore, statements in this specification, such as "in an embodiment", "in some embodiments", "in some other embodiments", and "in other embodiments", that appear at different places do not necessarily mean a same embodiment. Instead, the statements mean "one or more but not all of the embodiments", unless otherwise specifically emphasized. Terms "include", "contain", "have", and variants of the terms all mean "include but are not limited to", unless otherwise specifically emphasized.

In this application, control blurring refers to performing blurring processing on a background image of a control.

The applicant finds that, currently, control blurring is implemented by using a three-level pipeline including a rendering and drawing phase, a composition phase, and a display phase. For example, a composition result of a frame image of a control with a blurred background is obtained through drawing and composition at the rendering and drawing phase and the composition phase, and is displayed at the display phase. The rendering and drawing phase refers to a phase at which processing is performed by a rendering and drawing process. The composition phase refers to a phase at which processing is performed by a composition process. The display phase refers to a phase at which a composition result of a frame image including a control with a blurred background is transferred for display.

When a control is displayed, a control animation is often used. Therefore, when a background of the control is blurred, a background image of the control changes in each frame of the animation. Consequently, a blurring parameter for blurring the control background also changes over time.

A current frame image may be separately drawn on one or more layers. For example, one or more layers may be first drawn by using the drawing and rendering process, to obtain a drawing result of each layer (that is, a part of the current frame image). A drawing result of each layer may include one or more controls.

If a control included in a layer includes a blurring tag, the control in the layer is a to-be-blurred control, and the layer is a to-be-blurred layer.

A layer is a unit for drawing an image, and memory space corresponding to the layer may be used to store a drawing result and layer information. The layer information may include layer property information such as a color gamut space, a layer position, a layer identifier, a layer size, and a layer resolution. The layer information may further include other layer-related information, for example, may further include a blurring tag, a blurring parameter, and the like.

In some system architectures, one application may correspond to at least one layer. For example, in an Android system, an application includes at least one activity component (activity). The activity is a visualized application component, and one activity may correspond to one layer. For example, an activity can be displayed in a form of a key, text, or check box.

Layer drawing is to draw control content that is provided by an application and that corresponds to the layer in a memory corresponding to the layer, to obtain a drawing result corresponding to the layer. Layer composition is to overlay drawing results of one or more layers corresponding to a frame image according to a layer sequence to obtain a composition result. The composition result can be used to display a frame image on a screen.

A drawing result of a first frame image includes drawing results of one or more layers corresponding to the first frame image. For example, if the first frame image includes one or more applications, and each application includes at least one activity, the drawing result of the first frame image includes a drawing result of each activity on a corresponding layer.

The layer sequence refers to a sequence of one or more first layers arranged in a direction perpendicular to a screen. The layer sequence can be specified by an application when creating layers, and the layer sequence can be stored in a composer (surfaceflinger).

After the drawing result of each layer is obtained at the rendering and drawing phase, the drawing result and a blurring parameter of each layer are transferred to the composition process. Then the composition phase starts. At the composition phase, the composition process invokes the GPU to perform blurring processing on the to-be-blurred layer based on the blurring parameter. Then all layers are composed to obtain a composition result of the current frame image. Finally, the composition result of the current frame image is transmitted to a display device, and is displayed at the display phase.

The blurring processing algorithm may include one of blur algorithms such as Gaussian blur, motion blur, radial blur, and lens blur.

In this application, Gaussian blur is used as an example of blurring processing. A Gaussian blur calculation process is convolving an image based on normal distribution. An image after the Gaussian blur has a visual effect similar to that of observing an image through ground glass.

In a process of drawing each layer at the drawing and rendering phase, if drawing is not completed in one period, a drawing result for each layer of the current frame image cannot be transferred to the composition phase in a current period. However, in the current period, a blurring parameter of the current frame image is transferred to the composition phase, but the drawing result of the layer corresponding to the current frame image is not received at the composition phase. In this case, the blurring parameter is used for a wrong frame image. As a result, a frame image displayed at the display phase uses a wrong blurred background. Therefore, visible frame freezing or frame skipping occurs. Therefore, this application provides a control blurring method, including: obtaining a dynamic parameter of a first control in a first frame image during drawing of the first frame image; encapsulating a drawing result and a dynamic parameter of the first frame image; performing composition based on a result of the encapsulation, to obtain a composition result having a blur effect of the first frame image; and performing display based on the composition result of the first frame image.

After the drawing result and the dynamic parameter of the first frame image are encapsulated, the drawing result and the dynamic parameter of the first frame image are parameters associated with each other. When encapsulation is performed based on the dynamic parameter, composition is performed based on the drawing result of the first frame image. In this case, the dynamic parameter is not used for a wrong frame image, and it can be ensured that a correct dynamic parameter is used for the frame image for composition. This avoids visible frame freezing or frame skipping, and improves user experience of a blur effect.

The control blurring method provided in embodiments of this application may be applied to a terminal device such as a mobile phone, a tablet computer, a wearable device, an in-vehicle device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the terminal device is not limited in embodiments of this application.

For example, the terminal device is a mobile phone in descriptions herein. As shown in FIG. 1, the terminal device may include components such as a processor 110, an audio module 120, a screen 130, a camera module 140, a storage module 150, an interface 160, a power module 170, an input module 180, and a communication module 190. A person skilled in the art may understand that the structure of the terminal device shown in FIG. 1 does not constitute a limitation on the terminal device. The terminal device may include more or fewer components than those shown in the figure, or may include a combination of some components, or may include different component arrangements.

The following describes each component and module of the terminal device in detail with reference to FIG. 1.

The processor 110 is a control center of the terminal device, and the processor 110 may include a CPU 111 and a graphics processing unit (Graphics Processing Unit, GPU) 112. The CPU 110 is connected to all parts of the terminal device by using various interfaces and lines, and performs various functions of the terminal device and data processing by running or executing a software program and/or a module stored in the storage module 150 and by invoking data stored in the storage module 150. The GPU 112 is a microprocessor that can perform calculation operations related to images and graphics. The GPU 112 may be in a plurality of forms. For example, the GPU 112 may be disposed in a display adapter, or integrated into the CPU 111, or may be an independent GPU chip.

When drawing and rendering an image and a graphic, the GPU draws or renders the image or the graphic and stores the image or the graphic in a buffer (buffer). For a GPU disposed in a display adapter, a buffer is a video memory (also referred to as a frame buffer) integrated in the display adapter. For a GPU integrated in the CPU or a GPU in a form of an independent GPU chip, the buffer may be a part of a running memory of the terminal device, for example, a part of space in a random access memory (Random Access Memory, RAM).

In some implementations, the CPU 111 may include one or more processing units. For example, the CPU 111 may be a general-purpose processor, a digital signal processor (Digital Signal Processor, DSP), an application-specific integrated circuit (Application-Specific Integrated Circuit, ASIC), a field-programmable gate array (Field-Programmable Gate Array, FPGA) or another programmable logic device, discrete gate or transistor logic device, discrete hardware component, or the like.

In some other implementations, a modem processor may further be integrated into the processor 110. The modem processor mainly processes data related to wireless communication. This is not limited in this application.

The audio module 120 is configured to process an audio signal. For example, the audio module 120 may convert an analog audio signal received by a microphone 123 into digital audio data and send the digital audio data to the processor 110. Alternatively, the digital audio data sent by the processor 110 is converted into an analog signal that can be played by the speaker 121 and the receiver 122, and the analog signals are sent to the speaker 121 or the receiver 122.

The screen 130 is configured to display, through visual output, content output by the terminal device. For example, the screen 130 can display information entered by a user, information provided for a user, a system interface of the terminal device, and an interface of an application run on the terminal device. A material of a display panel of the screen 130 may be a liquid crystal display (Liquid Crystal Display, LCD), a thin film transistor (Thin Film Transistor, TFT), a light-emitting diode (Light-Emitting Diode, LED), an organic light-emitting diode (Organic Light-Emitting Diode, OLED), or the like. This is not limited herein.

Figure 2:
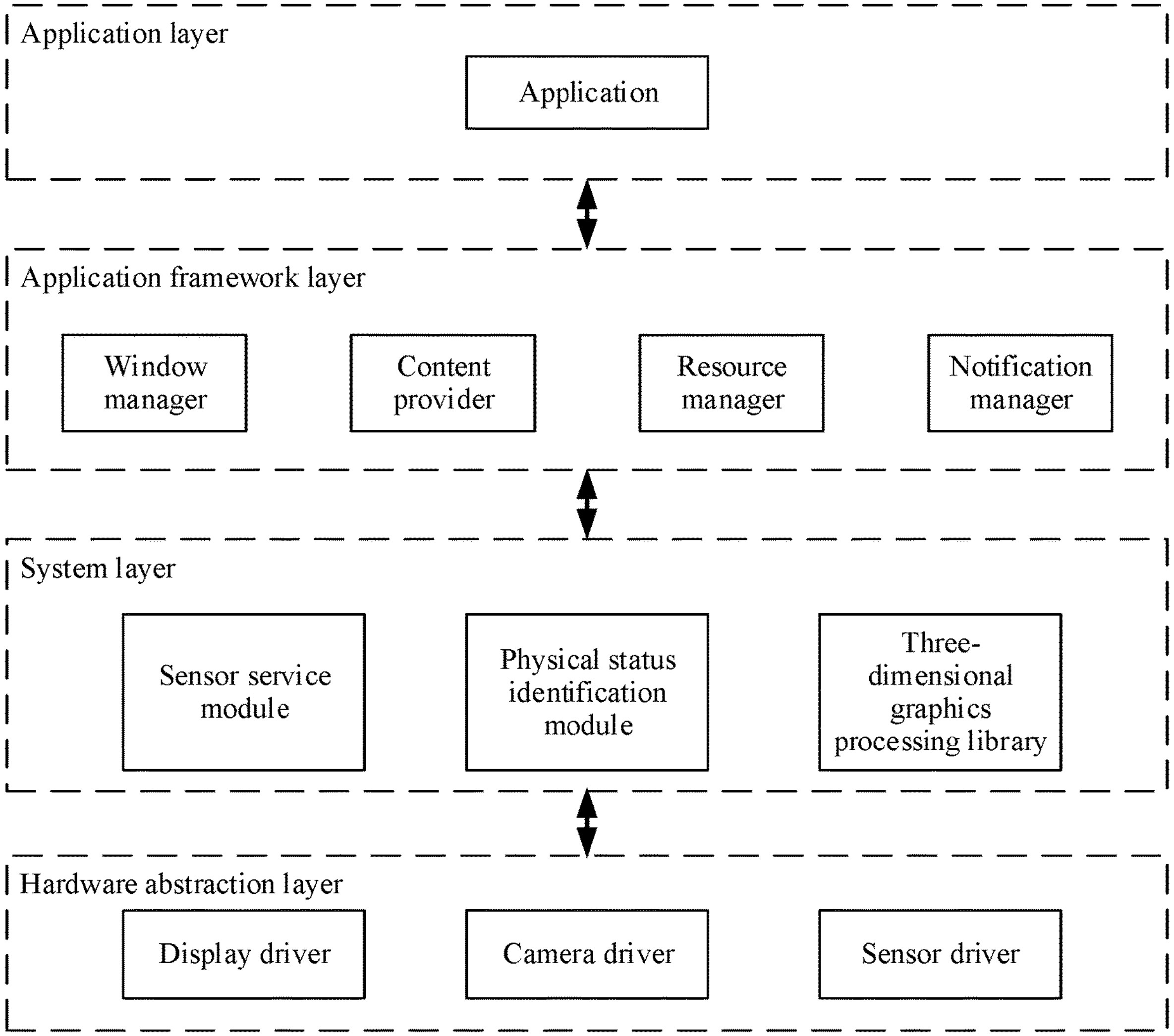
FIG. 2 is a diagram of a system architecture of a terminal device according to an embodiment of this application.

In some implementations, the display panel of the screen may further be covered with a touch panel. When detecting a touch operation on or near the touch panel, the touch panel transmits the touch operation to the processor 110 to determine a type of the touch event, and then the processor 110 provides corresponding visual output on the display panel based on the type of the touch event. In FIG. 2, the screen and the touch panel (which are not shown) are used as two independent components to implement input and input functions of the mobile phone. However, in some embodiments, the touch panel and the display panel may be integrated to implement the input and output functions of the mobile phone.

The camera module 140 includes at least one camera, and the camera may be a front-facing camera 141 or a rear-facing camera 142.

This is merely an example. The terminal device may have one lens, two lenses, three lenses, or four lenses. For example, when there are four lenses, one is a front-facing lens 141, and the other three lenses are rear-facing lenses 142. The three rear-facing lenses 142 may be lenses with different focal lengths. For example, a primary lens with an equivalent focal length of 35 mm, a wide-angle lens with an equivalent focal length of 20 mm, and a long-focus lens with an equivalent focal length of 105 mm. This is not limited in embodiments of this application.

It should be noted that, when the terminal device includes a plurality of lenses, the plurality of lenses may all be front-facing lenses, or may all be rear-facing lenses, or some of the lenses may be front-facing lenses, and the other lenses may be rear-facing lenses. This is not limited in this embodiment of this application.

The storage module 150 may include an internal memory 151 and an external memory interface 152. The internal memory 151 may be a flash memory, a hard disk drive, a memory for computing. For example, the internal memory may include at least one hard disk drive or flash memory and one memory for computing. The external memory interface 152 is configured to connect an external memory, the external memory may include a memory card, a removable hard disk, a USB flash drive, an optical disc, and the like.

The storage module 150 may be configured to store a software program and module. The processor 110 performs various function applications of the terminal device and data processing by running the software program and module that are stored in the storage module 150. The storage module 150 may include a program storage area and a data storage area. The program storage area is usually located on the internal memory 151, and may store an operating system and an application required by at least one function (for example, a sound playing function or a touch response function). The data storage area may be located on the internal memory 151, or on an external memory connected to the external memory interface 152, or on both the internal memory and the external memory. The data storage area may store data (such as audio data, image data, and video data) created when the mobile phone is used, and the like.

The interface 160 includes but is not limited to a subscriber identity module (Subscriber Identity Module, SIM) card interface 161, a USB port 162, and a headset port 163. The SIM card interface is used for inserting a SIM card provided by a carrier. In this way, when the terminal device establishes a communication connection with a base station by using a mobile communication module 191, the terminal device performs identification and verifies a user identity. After the user identity is verified, the terminal device sends a call request and a data request to the base station, and receives a call, data, an SMS message, and the like forwarded by the base station.

The USB port 162 may connect the terminal device to a computer by using a USB cable, to exchange data. In addition, the USB port 162 is further connected to a power module 170. When the USB cable is connected to a computer or a charging port, input electric energy may be transmitted to the power module 170 to charge the terminal device. The USB port 162 may be a micro-USB, a mini-USB, a USB Type-c, or the like. This is not limited herein.

The headset port 163 is configured to connect a headset. The headset port 163 may be an independent port. For example, the headset port 163 may be a 3.5 mm headset jack. Alternatively, the headset port 163 may be integrated into the USB port 162. For example, the headset port may be integrated into a USB Type-c. When a headset is plugged into the headset port 163, the audio module 120 may not send an output analog audio signal to the speaker 121 or the receiver 122, but send the output analog audio signal to the headset through the headset port 163. Then the headset plays audio. When the headset is plugged in, if it is detected that the headset does not include a microphone, in this case, the audio module still receives an analog audio signal sent by the microphone 123. If it is detected that the headset includes a microphone, the audio module receives the analog audio signal sent by the microphone of the headset, processes the analog audio signal, and sends the analog audio signal to the processor 110.

The terminal device further includes the power module 170 that supplies power to each part. The power module may include a battery, a power management module, and the like. The power management module is logically connected to the processor 110, so that functions such as charging/discharging management and power consumption management can be implemented by using the power management module.

The input module 180 may be configured to receive input information and a key signal. The input information includes digital or character information, touch information, and the like. The key signal includes a pressing signal of a physical button, a pressing signal of a virtual key, and the like.

In an implementation, the input module 180 may include a touch panel and another input device. The touch panel and the screen 130 may form a touchscreen. The touch panel may collect a touch operation performed by a user on or near the touch panel (such as an operation performed by a user on the touch panel or near the touchscreen by using an object or accessory that can be used to generate a touch signal on the touch panel, such as a finger or a stylus), and drives implementation of a corresponding function according to a preset program. Optionally, the touch panel may include two parts: a touch detection apparatus and a touch controller. The touch detection apparatus detects a touch position of a user, detects a signal generated by a touch operation, and transmits the signal to the touch controller. The touch controller receives touch information from the touch detection apparatus, converts the touch information into touch point coordinates, and then sends the touch point coordinates to the processor 110. The processor 110 receives the sent touch point coordinates, coverts the touch point coordinates into a touch instruction, and executes the instruction. The touch panel may be of a resistive type, a capacitive type, an infrared type, a surface acoustic wave type, or the like. The another input device may include but is not limited to one or more of a physical keyboard, a functional button (such as a volume control button or a power button), a trackball, a mouse, and a joystick.

The communication module 190 includes the mobile communication module 191 and a wireless communication module 192. The mobile communication module 191 supports any communication standard or protocol, including but not limited to a global system for mobile communication (Global System for Mobile communication, GSM), a general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), time-division WCDMA (Time-Division WCDMA, TD-WCDMA), time-division LTE (Time-Division LTE, TD-LTE), the $5^{th}$ generation New Radio (the $5^{th}$ generation New Radio, 5G NR), and the like. The wireless communication module 192 supports Bluetooth (Bluetooth), Wireless Fidelity (Wireless Fidelity, Wi-Fi), near field communication (Near Field Communication, NFC), and the like.

The mobile communication module 191 may be configured to connect to a communication base station by using an antenna, to establish a call link between the terminal device and another terminal device, and send and receive call audio. The wireless communication module 192 is configured to wirelessly connect to an external device. The external device may be an external device that has sound playing and receiving functions, such as a Bluetooth headset or a Bluetooth stereo, or may be an external device that is used for input, such as a Bluetooth mouse or a Bluetooth keyboard. This is not limited herein.

FIG. 2 is a schematic diagram of a software structure of a terminal device according to an embodiment of this application. An example in which the terminal device is a mobile phone and an operating system is an Android system is used for description.

In some embodiments, the Android system may be divided into four layers: an application (APP) layer, an application framework (framework, FWK) layer, a system layer, and a hardware abstraction layer. The layers communicate with each other by using a software interface.

As shown in FIG. 2, the application layer may include a series of application packages, and the application packages may include applications such as Messages, Calendar, Camera, Videos, Navigation, Gallery, and Calls.

The application framework layer provides an application programming interface (application programming interface, API) and a programming framework for an application at the application layer. The application framework layer may include some predefined functions, such as a function for receiving an event sent by the application framework layer.

As shown in FIG. 2, the application framework layer may include a window manager, a resource manager, a notification manager, and the like.

The window manager is configured to manage a window program. The window manager may obtain a size of the display screen, determine whether there is a status bar, perform screen locking, take a screenshot, and the like. The content provider is configured to: store and obtain data, and make the data accessible to an application. The data may include a video, an image, audio, calls that are made and received, a browsing history and bookmarks, an address book, and the like.

The resource manager provides various resources such as a localized character string, an icon, an image, a layout file, and a video file for an application.

The notification manager enables an application to display notification information in a status bar, and may be used to convey a message of a notification type. The message may automatically disappear after a short stay without user interaction. For example, the notification manager is configured to notify download completion, give a message notification, and the like. The notification manager may alternatively be a notification that appears in a top status bar of a system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The application framework layer may further include:

a view system (not shown), including visual controls such as a control for displaying a text and a control for displaying a picture, where the view system may be configured to construct an application, and a display interface may include one or more views, for example, a display interface including an SMS message notification icon may include a text display view and an image display view; and a phone manager (not shown), configured to provide a communication function of a mobile phone 100, for example, management of a call status (including answering, declining, or the like).

The system layer may include a plurality of functional modules, for example, a sensor service module, a physical status identification module, and a three-dimensional graphics processing library (for example, OpenGL ES).

The sensor service module is configured to monitor sensor data uploaded by various types of sensors at a hardware layer, to determine a physical status of the mobile phone. The physical status identification module is configured to analyze and identify a user gesture, a face, and the like. The three-dimensional graphics processing library is configured to implement three-dimensional graphics drawing, image rendering, composition, layer processing, and the like.

The system layer may further include: a surface manager (not shown) configured to manage a display subsystem and provide fusion of 2D and 3D layers for a plurality of applications; and a media library (not shown) supporting playing and recording in a plurality of commonly used audio and video formats, and static image files. The media library supports a plurality of audio, video, and image coding formats, such as MPEG4, H.264, MP3, AAC, AMR, JPG, and PNG.

The hardware abstraction layer is a layer between hardware and software. The hardware abstraction layer may include a display driver, a camera driver, a sensor driver, and the like, and is configured to drive related hardware, for example, a display screen, a camera, and a sensor, at the hardware layer.

Figure 3:
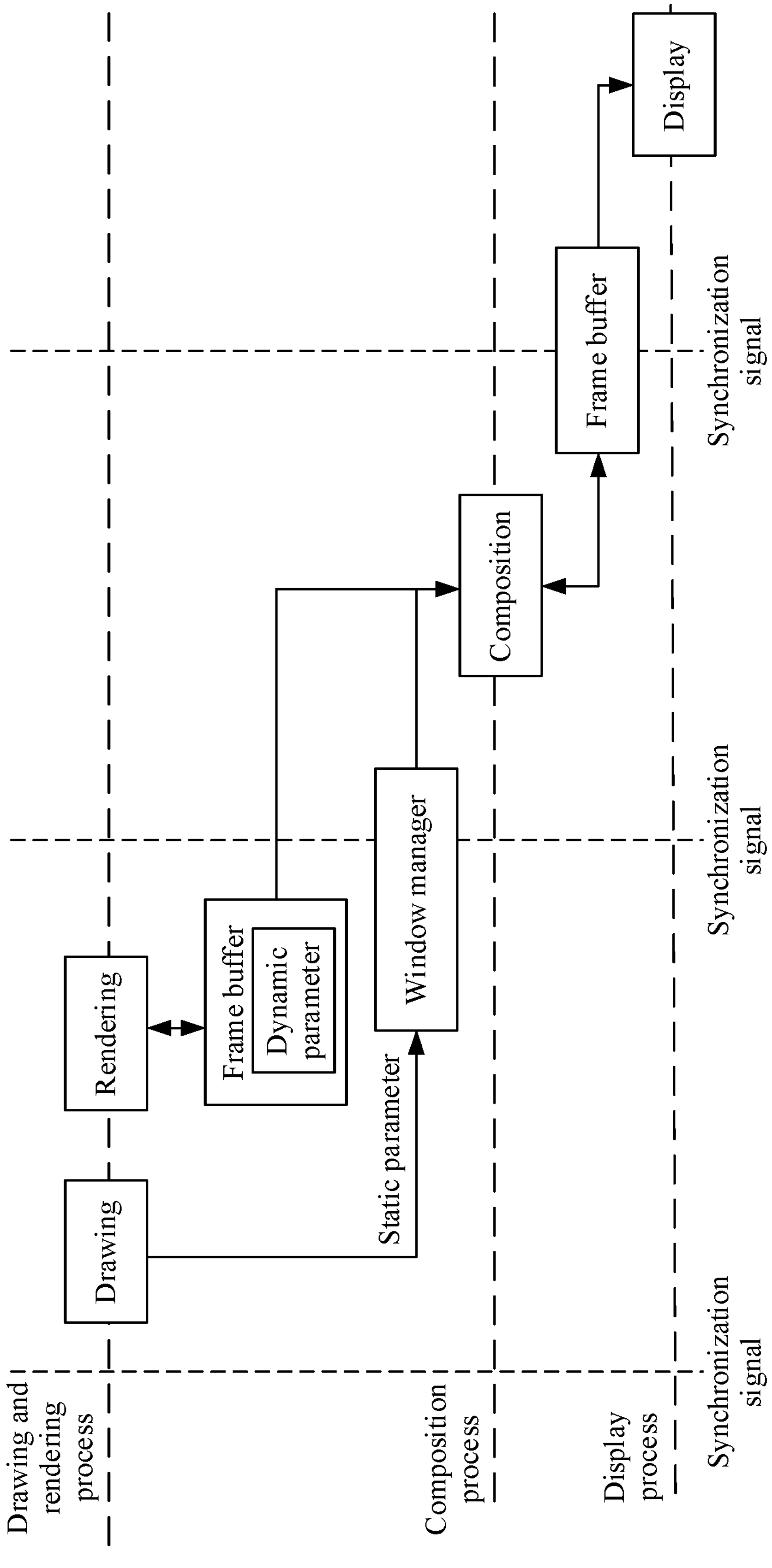
FIG. 3 is a timing diagram of applying a control blurring method according to an embodiment of this application.

FIG. 3 is a timing diagram of applying a control blurring method according to an embodiment of this application. Refer to FIG. 3. Drawing and rendering, composition, and display of a first frame image requires at least three periods. Duration between two synchronization signals is one period. Duration of the period may depend on a screen refresh rate. For example, if a screen refresh rate is 60 Hz, duration of each period is 1/60 second, that is, about 16.667 milliseconds. Graphics processing unit composition is implemented by using a GPU in a composition process, and may be used for blurring composition.

In the first period (t=0), a drawing and rendering process obtains a static parameter and a dynamic parameter according to a drawing instruction of the first frame image, and performs drawing and rendering on a drawing result of the first frame image. Then the drawing and rendering process transfers the static parameter to a composition process through a window manager. At the same time, the dynamic parameter and the drawing result of the first frame image are encapsulated and stored in a frame buffer.

In the second period (t=1), the composition process fetches the result of the encapsulation from the frame buffer, and obtains the dynamic parameter and the drawing result of the first frame image. Then, blurring composition is performed on the first frame image in the frame buffer based on the received static parameter and the obtained dynamic parameter, to obtain a composition result of the first frame image with a blur effect.

In the third period (t=2), a display process performs display, on the screen, based on the composition result having the blur effect of the first frame image in the frame buffer.

Figure 4:
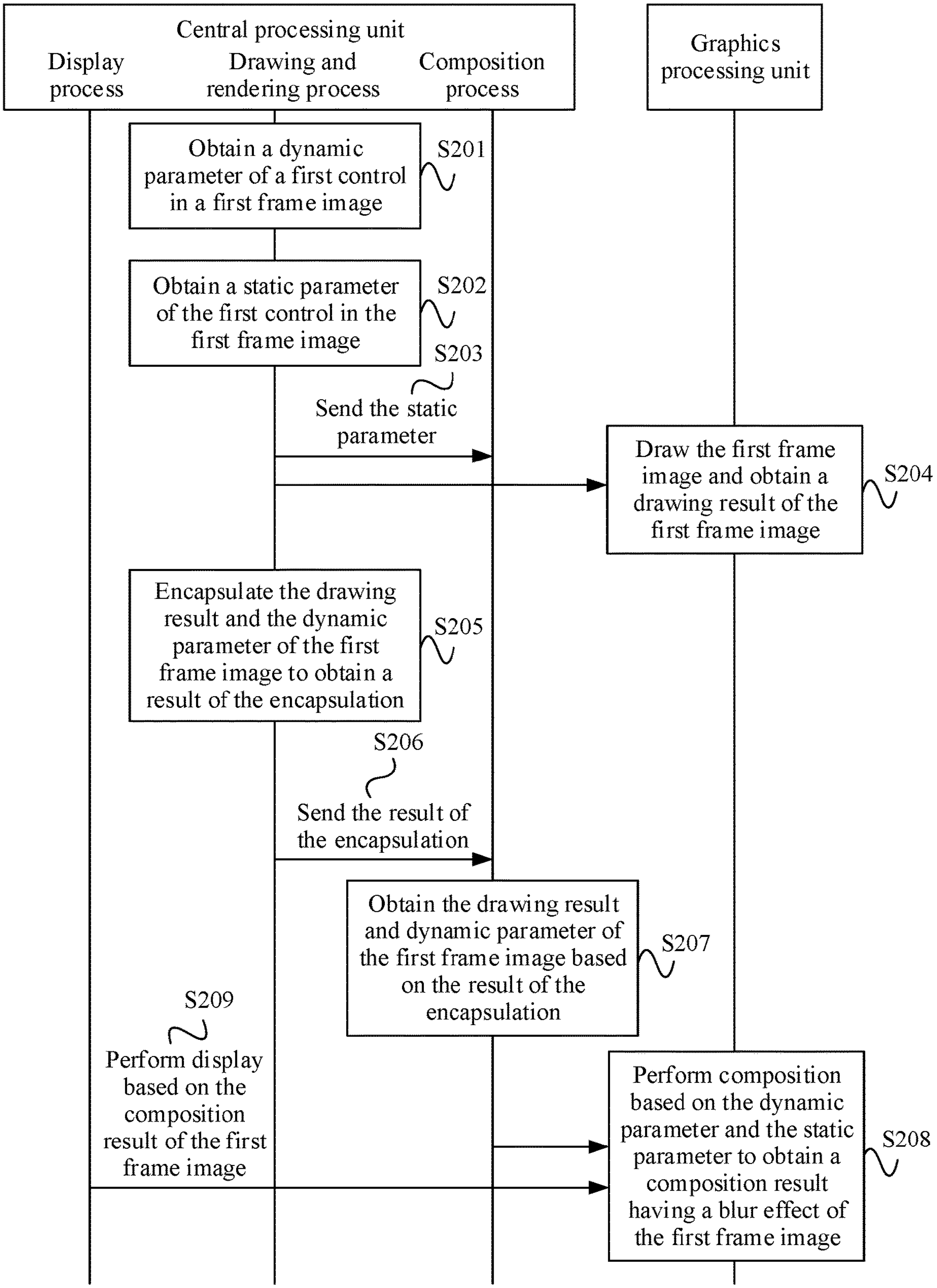
FIG. 4 is a schematic flowchart of a control blurring method according to an embodiment of this application.

The following further describes, by using a schematic flowchart of a control blurring method shown in FIG. 4, the control blurring method provided in this application. By way of example and not limitation, the method may be applied to the foregoing terminal device.

Refer to FIG. 4. The method includes the following steps.

S201: Obtain a dynamic parameter of a first control in a first frame image.

S202: Obtain a static parameter of the first control in the first frame image.

In some implementations, refer to FIG. 4. S201 and S202 may be performed in a drawing and rendering process. The drawing and rendering process may obtain a drawing instruction of the first frame image, and draw and render the first frame image in a layer according to the drawing instruction. The first frame image may be a frame image of a current frame in a control animation.

The drawing instruction includes drawing content and a blurring parameter of the drawing content. The drawing content is determined based on a control and an application interface that are included in the first frame image. For example, if the control is a notification control, and the application interface is an interface of a home screen, the drawing content includes interface drawing of the notification control and interface drawing of the home screen.

The blurring parameter can be classified into a dynamic parameter and a static parameter. The dynamic parameter may include a parameter in each frame that describes a change of a control. For example, the dynamic parameter may include one or more of parameters that change over time, such as whether a control is blurred, coordinates, a size, a corner radius, and transparency of a control. The static parameter may be used to indicate a blur effect parameter when blurring processing is performed on all frames. For example, the static parameter may include one or more of a layer sequence, a blur type, or a blur strength used for overlaying of the drawing results of the first frame image.

The blur type may be Gaussian blur, radial blur, lens blur, or the like. Each blur type corresponds to a blur strength. For example, a blur strength of Gaussian blur may be represented by using a blur radius (with pixel being a unit).

In some implementations, the first frame image may include one or more controls. In the one or more controls, a control marked as a to-be-blurred control is the first control. Whether a control is to be blurred may be marked in a control property, or may be marked in a dynamic parameter. This is not limited in this application.

It should be noted that, because a first frame image of each frame needs a drawing instruction for drawing, the dynamic parameter may be determined based on the drawing instruction of the first frame image. The determined dynamic parameter is a dynamic parameter used when blurring processing is performed on a current frame image.

Because the control is usually displayed as an animation, a location and size of the control in the first frame image at every moment change over time.

Figure 5:
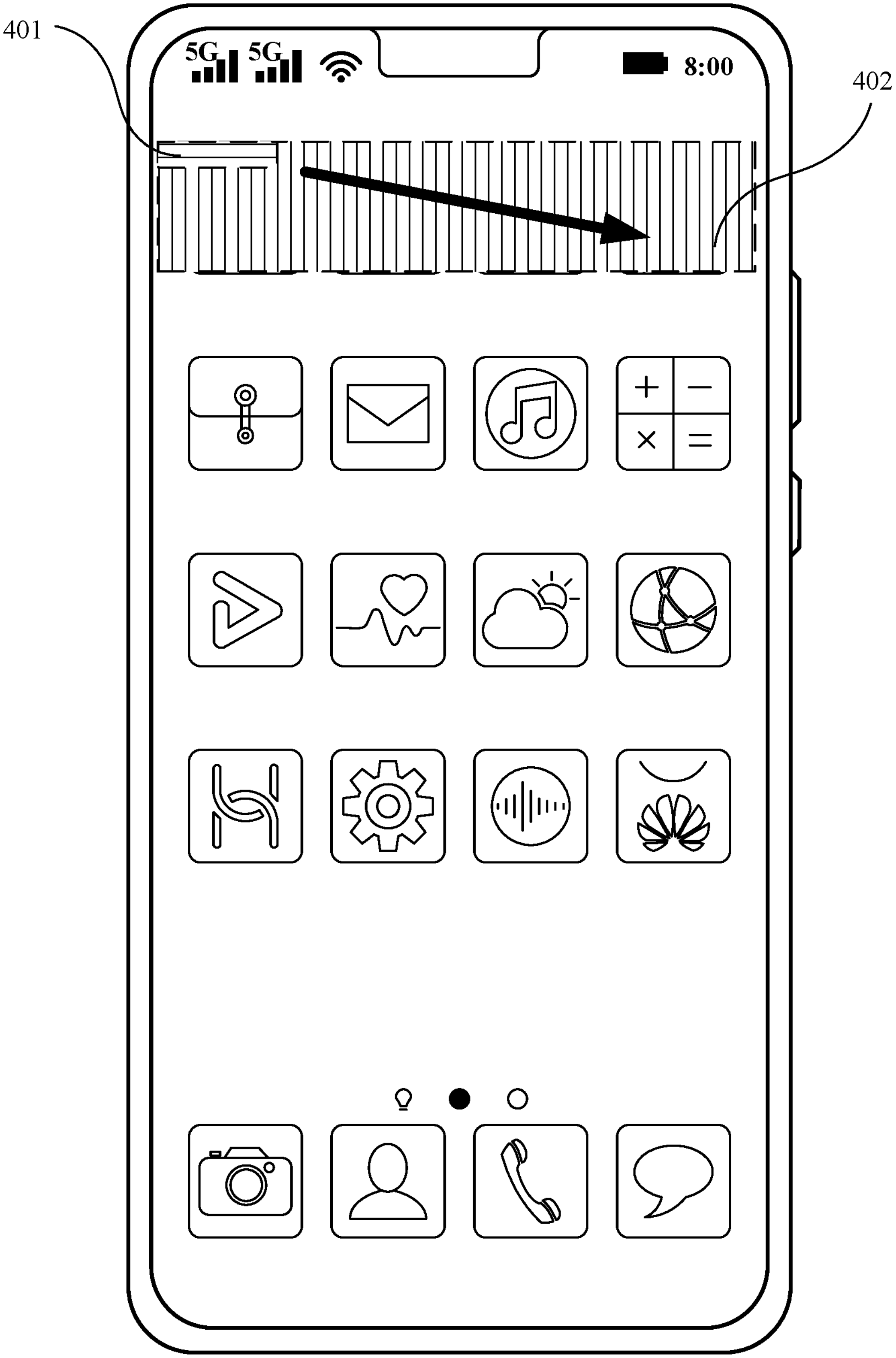
FIG. 5 is a schematic diagram of an application scenario of a control blurring method according to an embodiment of this application.
Figure 6:
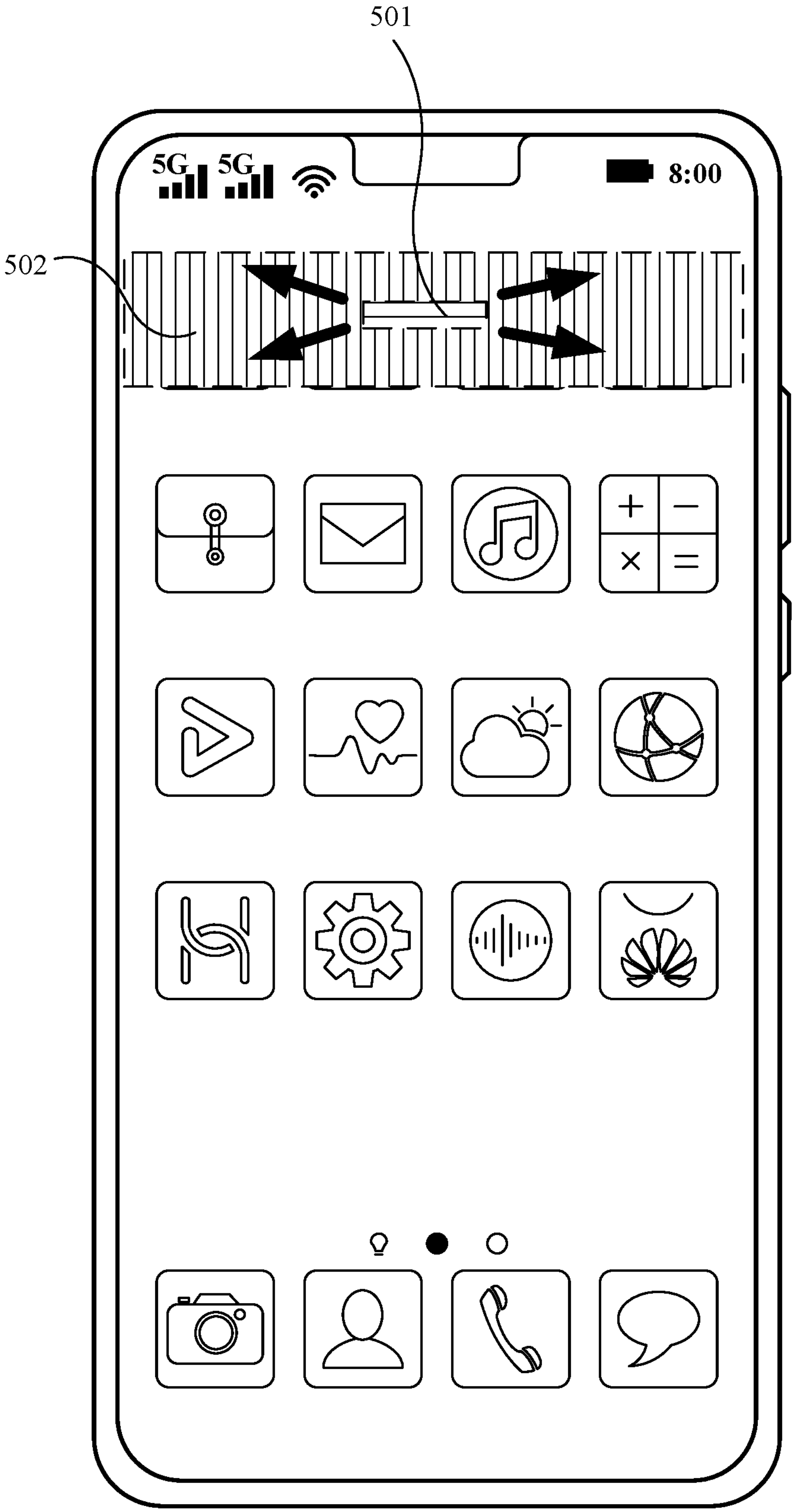
FIG. 6 is a schematic diagram of an application scenario of another control blurring method according to an embodiment of this application.
Figure 7:
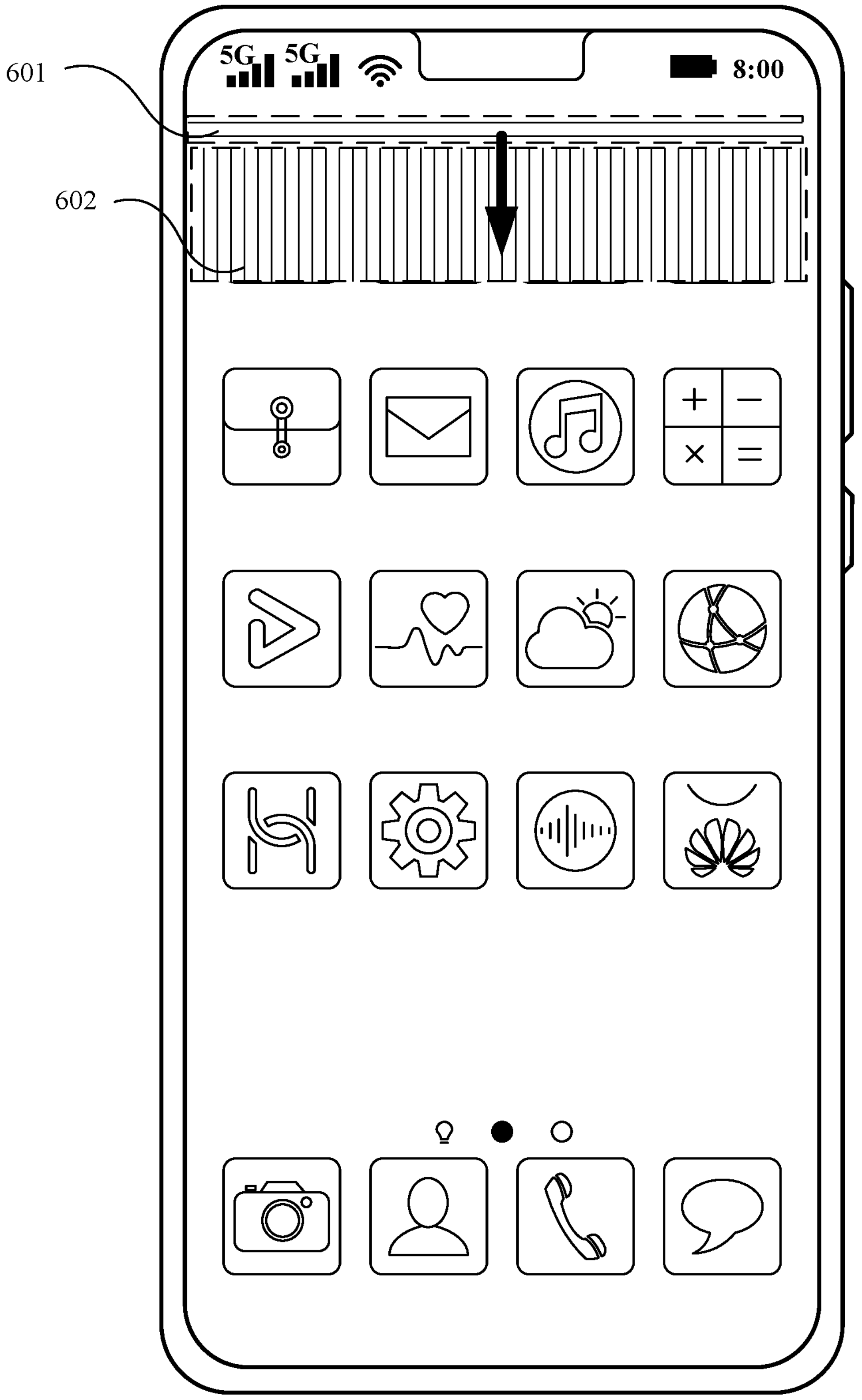
FIG. 7 is a schematic diagram of an application scenario of another control blurring method according to an embodiment of this application.

As an example, FIG. 5 to FIG. 7 show several possible implementations.

It is assumed that play time of a control animation is 0.5 second and a frame rate of the control animation is 60 frames per second (Frames Per Second, fps). An animation effect of the entire control consists of 30 frames.

Refer to FIG. 5. An effect of the control animation may be enlarging and extending the animation from a first area 401 to a second area 402. A control changes in a frame image at each moment. In other words, each frame image corresponds to one dynamic parameter. For example, refer to a control animation shown in FIG. 5. In the control animation, coordinates of an upper-left vertex of a control in the first frame are the same as coordinates of an upper-left vertex of the control in the last frame, and a control size is expanded from a size of the first area 401 to a size of the second area 402.

For another example, refer to a control animation shown in FIG. 6. In the control animation, coordinates of a center of a control in the first frame are the same as coordinates of a center of the control in the last frame, and a control size is expanded from a size of a third area 501 to a size of a fourth area 502.

Refer to a control animation shown in FIG. 7. In another implementation, a control in a first frame is in a fifth area 601, and the control moves downward and expands until the control fills a sixth area 602. During this process, the coordinates and the size of the control change accordingly.

S203: Send the static parameter to a composition process in the drawing and rendering process.

In some implementations, the composition process may be an emboss (surfaceflinger) process. When the static parameter is sent to the composition process by using the drawing and rendering process, binder (Binder) communication may be performed. Binder communication involves a client (Client) process (that is, a composition process) that uses a service, a server (Server) process providing a service (that is, a drawing and rendering process), a service manager (ServiceManager) process, and a binder driver. The binder driver determines the server process and the client process by using the ServiceManage, and then directly creates a binder communication channel between the server process and the client process. The binder communication channel is created by using the binder driver. The client process accesses a service or data in the server process by using the binder driver, to implement interprocess data transmission.

S204: Invoke a graphics processing unit by using the drawing and rendering process, to draw the first frame image and obtain a drawing result of the first frame image.

In some implementations, the drawing result of the first frame image includes drawing results of one or more layers, and a drawing result of each layer is drawn based on one or more controls at the layer.

When drawing the first frame image, the graphics processing unit needs to first obtain the drawing instruction of the first frame image, where the drawing instruction instructs to draw applications and/or controls included in the first frame image. Then, a corresponding application interface or control interface (that is, the drawing result) is drawn in a plurality of layers according to the drawing instruction. Memory space occupied by the layer (that is, a frame buffer) may be memory space that is applied for from a system and that is created when an application invokes a control. The memory space may be located in a video memory built in the GPU, or a part of space in a running memory of a terminal device may be used as the frame buffer. There may be a plurality of frame buffers, and space of each frame buffer may be adjusted based on a control type. This is not limited herein.

Figure 8:
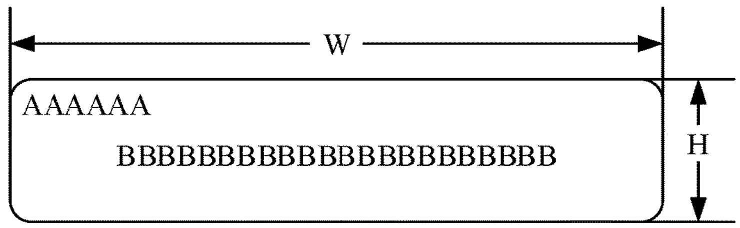
FIG. 8 is a schematic diagram of a control interface image in a control blurring method according to an embodiment of this application.

As an example, for a drawing result of a current frame image, refer to FIG. 8. FIG. 8 shows a control interface image of a notification control. Refer to the examples in FIG. 5 to FIG. 7. The interface image of the control may be the last frame in the control animation. The interface image includes notification content "AAAA" and "BBBBBBBBBBBBBBBBBBBBBBB". A width of the control is W, and a height of the control is H.

S205: Encapsulate the drawing result and the dynamic parameter of the first frame image to obtain a result of the encapsulation.

It should be noted that encapsulation may refer to storing the drawing result of the first frame image and the dynamic parameter of the first frame image that are associated with each other, so that the drawing result of the first frame image and the dynamic parameter of the first frame image can be processed together during composition. Specifically, for example, the drawing result of the first frame image and the dynamic parameter of the first frame image may be stored in a same memory unit. Alternatively, the drawing result of the first frame image may be associated with the dynamic parameter of the first frame image by using a pointer.

In some implementations, the result of the encapsulation may be stored in a frame buffer. The frame buffer includes a property information storage area and a data storage area. The property information storage area may include a size, a location, and a plurality of identifiers of the buffer. The data storage area is used to store the drawing result of the first frame of image. When the result of the encapsulation is stored in a frame buffer corresponding to the current frame, the dynamic parameter may be stored in a property information storage area, and the drawing result of the first frame image is stored in the data storage area. Alternatively, after the dynamic parameter is associated with the drawing result of the first frame image by using a pointer, the dynamic parameter and the drawing result may be stored together in the data storage area.

S206: Send the result of the encapsulation to the composition process by using the drawing and rendering process.

In some implementations, an identifier of the frame buffer storing the result of the encapsulation may be sent to the composition process, and the composition process fetches the result of the encapsulation in the frame buffer. In this way, the result of the encapsulation is sent to the composition process.

The drawing and rendering process may send the identifier of the frame buffer to the composition process through binder communication. For a specific implementation, refer to S203. Details are not described herein again.

S207: Obtain, in the composition process, the drawing result and the dynamic parameter of the first frame image based on the result of the encapsulation.

Figure 9:
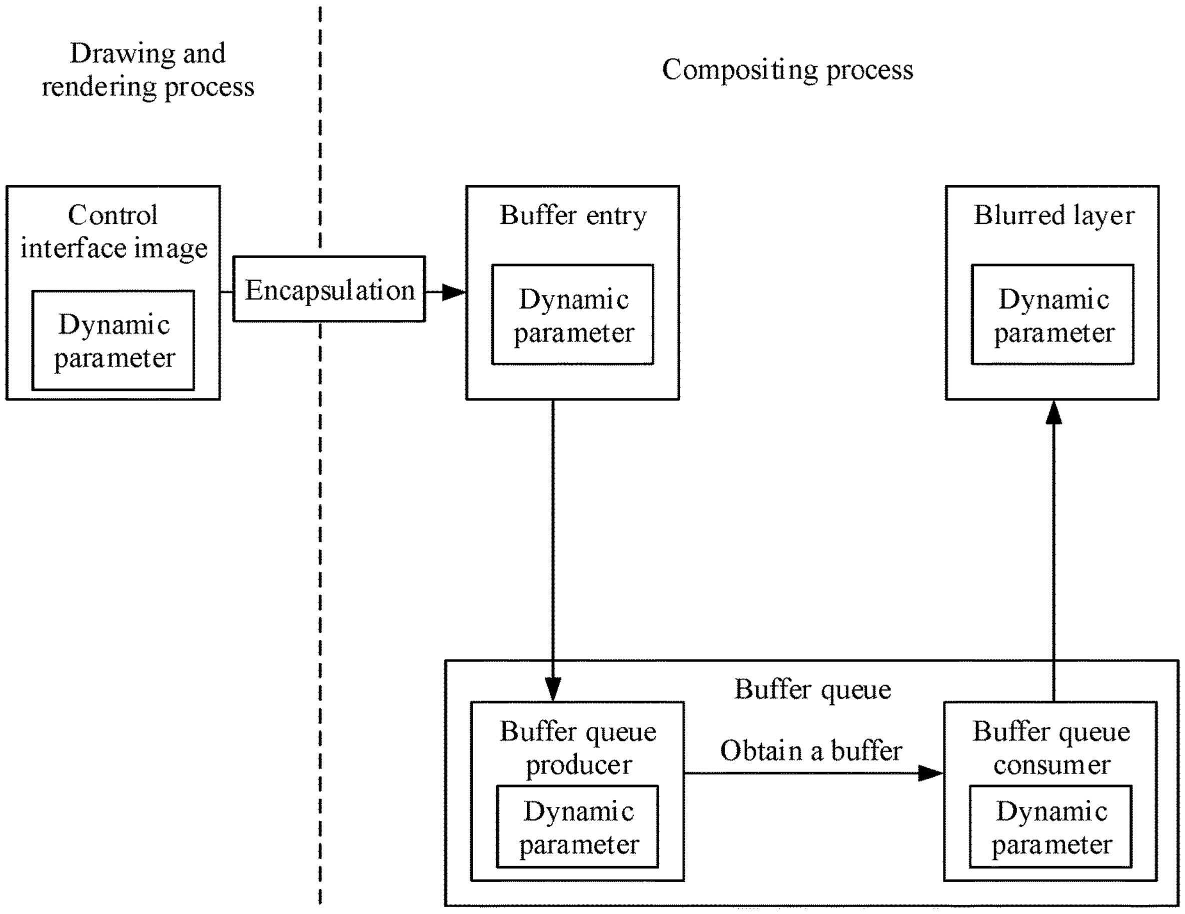
FIG. 9 is a schematic flowchart of another control blurring method according to an embodiment of this application.

As an example, FIG. 9 shows a method for storing a result of encapsulation in a frame buffer, and obtaining a drawing result and a dynamic parameter of a first frame image in a composition process. The method shown in FIG. 9 may be used to implement the process described in FIG. 3 in which the drawing result and the dynamic parameter of the first frame image are encapsulated and stored into the frame buffer in the drawing and rendering process, and then the drawing result and the dynamic parameter of the first frame image are obtained in composition process.

The drawing result and the dynamic parameter of the first frame image may be first encapsulated in the drawing and rendering process, and stored in the frame buffer to generate a buffer entry.

A buffer queue producer (Buffer Queue Producer) in the composition process uses a queue buffer instruction to use the buffer entry as a buffer in a buffer queue (Buffer Queue). A buffer queue consumer (Buffer Queue Consumer) obtains, based on the received identifier of the buffer entry, the drawing result and the dynamic parameter of the first frame image from the buffer entry corresponding to the first frame image. Finally, composition processing is performed at a blurred layer based on the drawing result and the dynamic parameter of the first frame image, where the blurred layer may be stored in the frame buffer. The composition process may perform blurring composition on the first frame image at the blurred layer based on the received static parameter and the obtained dynamic parameter, to obtain a composition result having a blur effect of the first frame image.

S208: By invoking the graphics processing unit in a composition process, perform composition based on the dynamic parameter and the static parameter to obtain a composition result having the blur effect of the first frame image.

In some implementations, the dynamic parameter includes coordinates, a size, and a corner radius of a control. The static parameter includes a layer sequence for overlaying of drawing results of the first frame image, and a blur type and blur strength that are for blurring processing.

When composition is performed based on the drawing result of the first frame image, the dynamic parameter, and the static parameter, an area that needs to be blurred in the drawing result of the first frame image may be first determined based on the dynamic parameter. Because a control background is to be blurred, an area that needs to be blurred may be an area corresponding to the first control.

A layer sequence for overlaying of the drawing results of the first frame image is obtained based on the static parameter, to determine to-be-blurred background layer. Then the to-be-blurred image that is the same as the area corresponding to the first control is obtained from the background layer based on the area corresponding to the first control. Then blurring processing is performed on the to-be-blurred image based on the blur type and the blur strength in the static parameters to obtain a blurred background of the control. Finally, the drawing result of the first frame image and the blurred background are used for overlaying and are composed to obtain the composition result having the blur effect of the first frame image.

As an example, FIG. 8 and FIG. 10 to FIG. 12 show a scenario in which composition is performed based on the dynamic parameter, the static parameter, and the drawing result of the first frame image.

Figure 10:
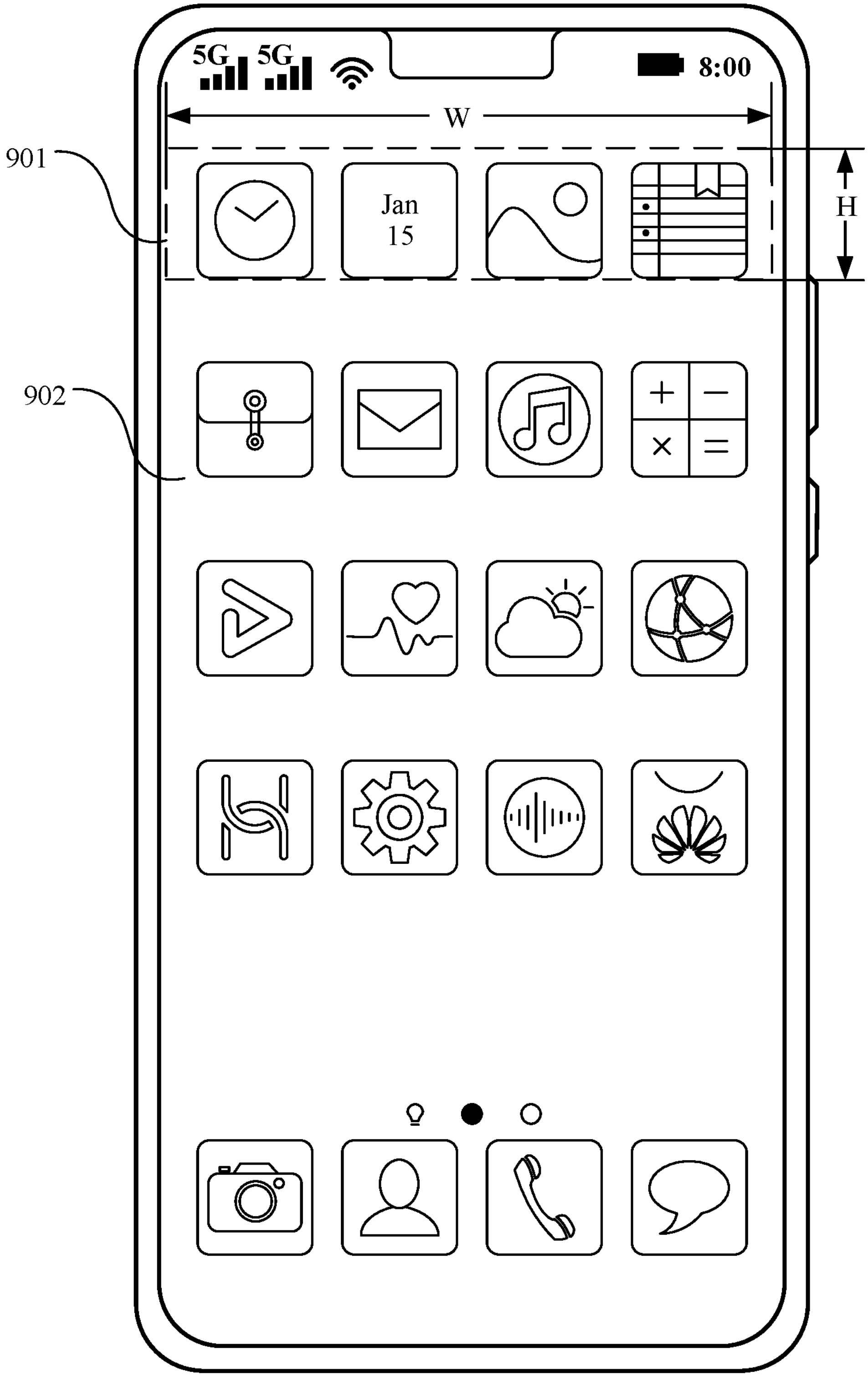
FIG. 10 is a schematic diagram of an application scenario of another control blurring method according to an embodiment of this application.

Refer to FIG. 10. A background layer 902 is determined as a to-be-blurred background layer based on a layer sequence for overlaying of the drawing results of the first frame image. An area 901 corresponding to a first control at the background layer 902 is determined based on the coordinates, the size, and the corner radius of a control in the drawing result of the first frame image in FIG. 8. An area that is at the background layer 902 and that is the same as the area 901 corresponding to the first control is captured, to obtain a to-be-blurred image shown in FIG. 11.

Figure 12:
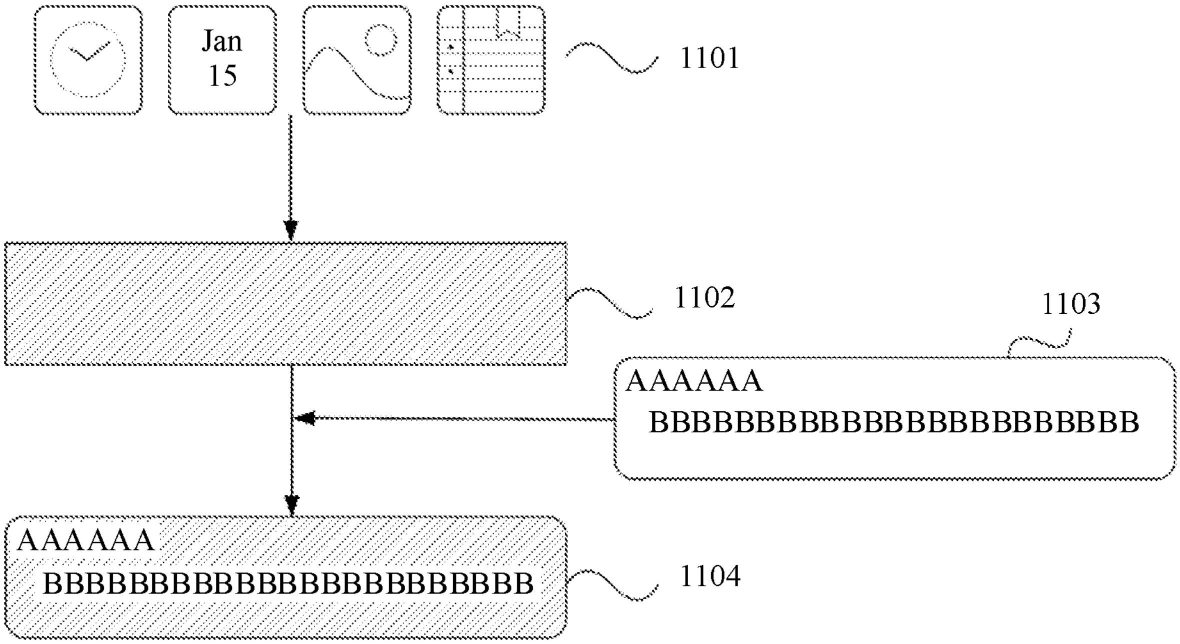
FIG. 12 is a schematic diagram of an application scenario of another control blurring method according to an embodiment of this application.

Refer to FIG. 12. Blurring processing is first performed on a to-be-blurred image 1101 based on a blur type and a blur strength, to obtain a blurred background 1102 of the control. As an example, the blur type may be Gaussian blur, and the blur strength may be 15-pixel-radius blur.

Finally, the drawing result 1103 of the first frame image and the blurred background 1102 of the control are composed to obtain a composition result 1104 having the blur effect of the first frame image.

S209: Perform display based on the composition result of the first frame image in the composition process.

Figure 13:
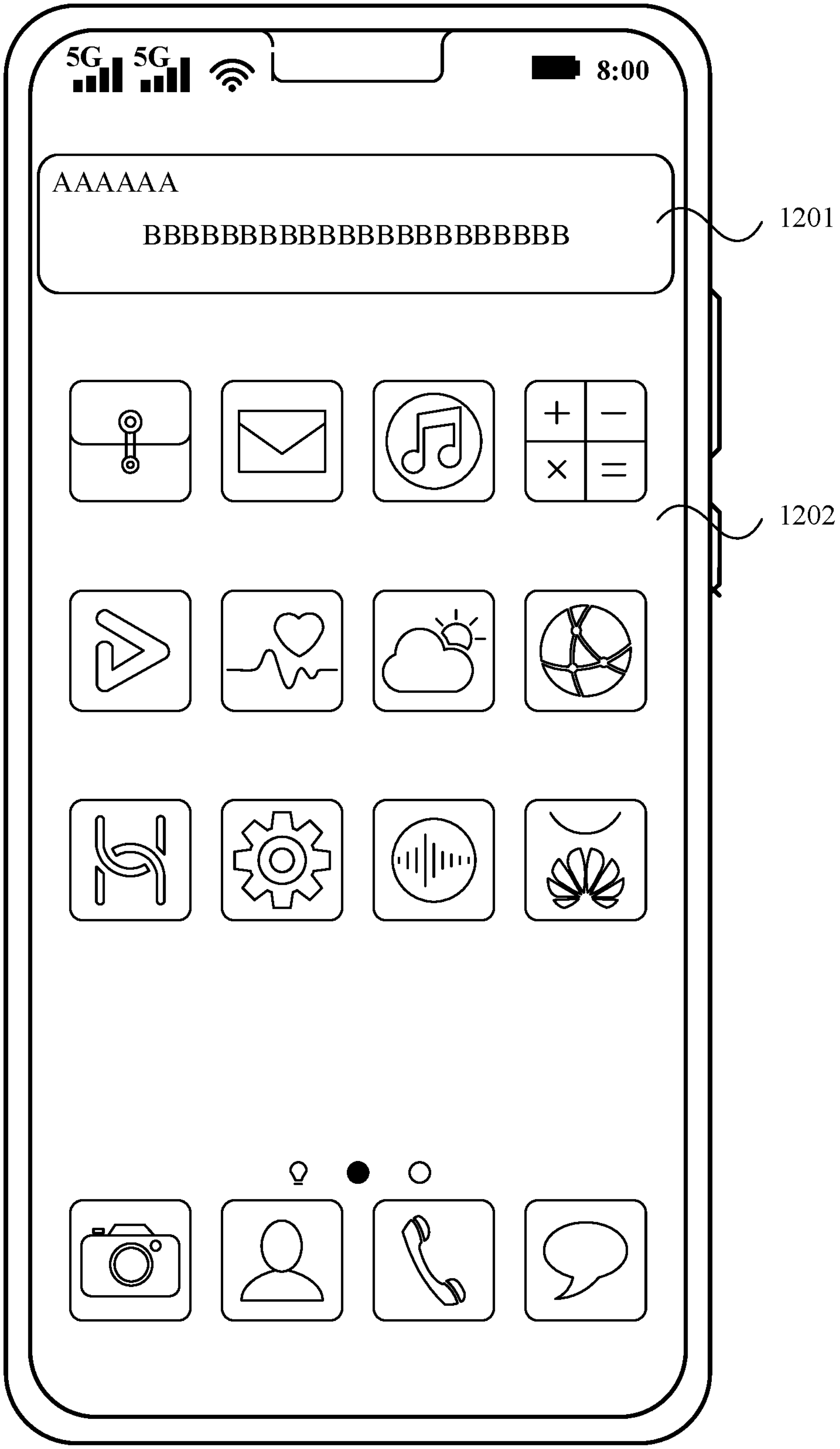
FIG. 13 is a schematic diagram of an application scenario of another method according to an embodiment of this application.

Refer to FIG. 13. For example, a screen of a mobile phone in FIG. 13 displays the composition result having the blur effect of the first frame image. An interface 1201 of a control having a blur effect is displayed in the area corresponding to the first control, and a remaining area is a background interface 1202.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this application.

Figure 14:
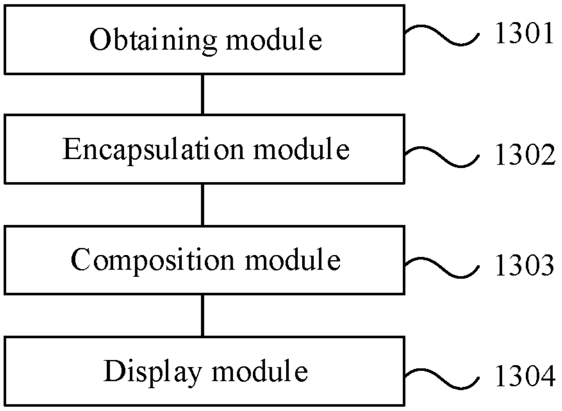
FIG. 14 is a schematic diagram of a structure of a control blurring apparatus according to an embodiment of this application.

Corresponding to the control blurring method in the foregoing embodiment, FIG. 14 is a block diagram of a structure of a control blurring apparatus according to an embodiment of this application. For ease of description, only parts related to embodiments of this application are shown.

Refer to FIG. 14. The apparatus includes: an obtaining module 1301, configured to obtain a dynamic parameter of a first control in a first frame image during drawing of the first frame image;

- an encapsulation module 1302, configured to encapsulate a drawing result and the dynamic parameter of the first frame image;
- a composition module 1303, configured to compose the drawing result of the first frame image based on the dynamic parameter, to obtain a composition result having a blur effect of the first frame image, where the dynamic parameter and the drawing result of the first frame image are obtained from a result of the encapsulation; and
- a display module 1304, configured to perform display based on the composition result of the first frame image.

In some implementations, the first frame image may include at least one control. In the at least one control, a control whose control property includes a blurring tag is the first control, and the blurring tag is used to indicate to perform blurring processing on the first control.

In some other implementations, the first frame image may include at least one control. A control property of the at least one control includes a blurring tag. When the blurring tag is true, the control is the first control. The blurring tag is used to indicate to perform blurring processing on the first control.

In some implementations, the dynamic parameter is a parameter that is of the first control and that changes over time. The dynamic parameter includes one or more of coordinates, a size, a corner radius, and transparency of the control.

In some implementations, the obtaining module 1301 is further configured to obtain a static parameter of the first control in the first frame image, where the static parameter includes a blur type and a blur strength.

The composition module 1303 is specifically configured to perform composition based on the result of the encapsulation and the static parameter to obtain a composition result having the blur effect of the first frame image.

In some implementations, the composition module 1303 is specifically configured to obtain the drawing result and dynamic parameter of the first frame image based on the result of the encapsulation; determine, based on the dynamic parameter, an area corresponding to the first control in the drawing result of the first frame image; perform, based on the static parameter, blurring processing on the area corresponding to the first control in the drawing result of the first frame image, to obtain a blurred area image; and perform composition based on the drawing result and the blurred area image of the first frame image, to obtain the composition result having the blur effect of the first frame image.

In some implementations, the obtaining module 1301 is specifically configured to obtain the dynamic parameter of the first control according to a drawing instruction for drawing the first frame image.

In some implementations, the encapsulation module 1302 is specifically configured to store the drawing result and the dynamic parameter of the first frame image that are associated with each other, to obtain the result of the encapsulation.

In some implementations, the drawing result of the first frame image includes drawing results of one or more layers, where a drawing result of each layer is drawn based on one or more controls at the layer, and the layer includes memory space used to store the drawing result and layer information.

It should be noted that content such as information exchange between the foregoing modules and an execution process is based on a same concept as that in the method embodiments of this application. For specific functions and technical effects of the content, refer to the method embodiments. Details are not described herein again.

It may be clearly understood by a person skilled in the art that, for convenient and brief description, division into the foregoing functional units and modules is merely used as an example for description. In actual application, the foregoing functions can be allocated to different functional units and modules for implementation according to a requirement, that is, an inner structure of the apparatus is divided into different functional units or modules to implement all or some of the functions described above. The functional units or modules in the embodiment may be integrated into one processing unit, or each of the units may exist alone physically, or two or more units may be integrated into one unit. The integrated unit may be implemented in a form of hardware, or may be implemented in a form of a software functional unit. In addition, specific names of the functional units and modules are merely for distinguishing between the functional units and modules, but are not intended to limit the protection scope of this application. For a specific working process of the units or modules in the foregoing system, refer to a corresponding process in the foregoing method embodiment. Details are not described herein again.

Figure 15:
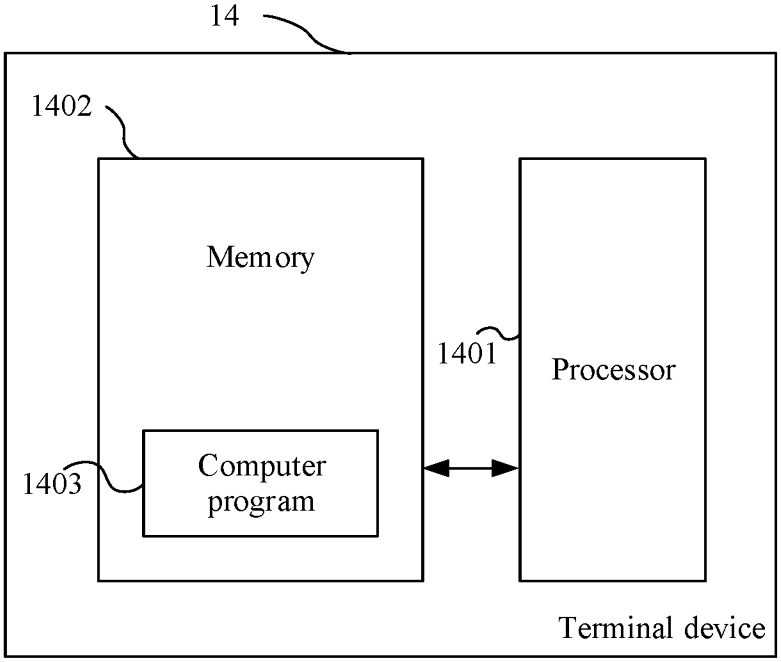
FIG. 15 is a schematic diagram of a structure of another terminal device according to an embodiment of this application.

FIG. 15 is a schematic diagram of a structure of a terminal device according to an embodiment of this application. As shown in FIG. 15, a terminal device 15 in this embodiment includes: at least one processor 1401 (only one processor is shown in FIG. 15), a memory 1402, and a computer program 1403 that is stored in the memory 1402 and that can be run on the at least one processor 1401. The processor 1401 executes the computer program 1403 to implement the steps in the foregoing method embodiments.

The terminal device 14 may be a terminal device such as a mobile phone, a desktop computer, a notebook computer, a palmtop computer, or a cloud server. The terminal device may include but is not limited to including the processor 1401 and the memory 1402. A person skilled in the art may understand that FIG. 15 is merely an example of the terminal device 14, and does not constitute a limitation on the terminal device 14. The terminal device may include more or fewer components than those shown in the figure, or some components may be combined, or different components may be used. For example, the terminal device may further include an input/output device, a network access device, or the like.

The processor 1401 may be a central processing unit (Central Processing Unit, CPU). The processor 1401 may alternatively be another general-purpose processor, a digital signal processor (Digital Signal Processor, DSP), an application-specific integrated circuit (Application-Specific Integrated Circuit, ASIC), a field-programmable gate array (Field-Programmable Gate Array, FPGA) or another programmable logic device, a discrete gate or a transistor logic device, or a discrete hardware component. The general-purpose processor may be a microprocessor, or the processor may be any conventional processor or the like.

In some embodiments, the memory 1402 may be an internal storage unit of the terminal device 14, for example, a hard disk drive or an internal memory of the terminal device 14. In some other embodiments, the memory 1402 may alternatively be an external storage device of the terminal device 14, for example, a swappable hard disk, a smart media card (Smart Media Card, SMC), a secure digital (Secure Digital, SD) card, a flash card (Flash Card), or the like that is provided on the terminal device 14. Further, the memory 1402 may alternatively include both the internal storage unit and the external storage device of the terminal device 14. The memory 1402 is configured to store an operating system, an application, a boot loader (Boot Loader), data, another program, and the like, for example, program code of a computer program. The memory 1402 may further be configured to temporarily store data that has been output or is to be output.

An embodiment of this application further provides a computer-readable storage medium. The computer-readable storage medium stores a computer program. When a processor executes the computer program, the steps in the foregoing method embodiments can be implemented.

An embodiment of this application provides a computer program product. When the computer program product is run on a mobile terminal, the mobile terminal is enabled to implement steps in the foregoing method embodiments.

An embodiment of this application provides a chip system. The chip system includes a memory and a processor. The processor executes a computer program stored in the memory, to implement the steps in the foregoing method embodiments.

An embodiment of this application provides a chip system. The chip system includes a processor. The processor is coupled to the foregoing computer-readable storage medium. The processor executes a computer program stored in the computer-readable storage medium, to implement the steps in the foregoing method embodiments.

When the integrated unit is implemented in a form of a software functional unit and sold or used as an independent product, the integrated unit may be stored in a computer-readable storage medium. Based on such an understanding, in this application, all or some of the procedures of the methods in the foregoing embodiments may be implemented by a computer program instructing related hardware. The computer program may be stored in a computer-readable storage medium. When a processor executes the computer program, steps in the foregoing method embodiments can be implemented. The computer program includes computer program code. The computer program code may be in a source code form, an object code form, an executable file form, some intermediate forms, or the like. The computer-readable medium may include at least any entity or apparatus that can carry the computer program code to a terminal device, a recording medium, a computer memory, a read-only memory (Read-Only Memory, ROM), a random access memory (Random Access Memory, RAM), an electrical carrier signal, a telecommunication signal, and a software distribution medium, for example, a USB flash drive, a removable hard disk, a magnetic disk, or an optical disk. In some jurisdictions, the computer-readable medium cannot be the electrical carrier signal or the telecommunication signal according to legislation and patent practices.

In the foregoing embodiments, descriptions of all the embodiments have respective focuses. For a part that is not described in detail in an embodiment, refer to related descriptions in other embodiments.

A person of ordinary skill in the art may be aware that the units and algorithm steps described with reference to the examples in embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In embodiments provided in this application, it should be understood that the disclosed method, apparatus, and terminal device may be implemented in other manners. For example, the described embodiments are merely examples. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected according to an actual requirement to achieve objectives of the solutions of embodiments.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

When the electronic device is used, overlapping window interfaces of a plurality of applications or controls are often displayed. For example, refer to FIG. 16. After the electronic device responds to a user operation, a control center may be raised. A window interface 12 of the control center includes a plurality of functional buttons 13, for example, a button for data sharing and a button for displaying a status of a peripheral device connected to the electronic device.

When a window of the control center is raised, to highlight an icon in the control center, blurring processing may be performed on a background window 11. The background window 11 may be a desktop of the electronic device, a window interface of a running application, or the like.

Currently, when overlapping windows of a plurality of applications are displayed, blurring processing may be performed on the windows by applying the following solution.

Window layers are drawn in respective frame buffers (Frame buffers) by using the GPU. When drawing is performed by using the GPU, blurring processing is performed on a window layer that needs to be blurred, and then the window layer is drawn in a frame buffer. After the GPU completes drawing of all the layers, all the window layers are composed by using the GPU. A composition acceleration apparatus (Display subsystem, DSS) outputs the layers, and the layers are displayed on a display screen.

The blurring processing algorithm may include one of blur algorithms such as Gaussian blur, motion blur, radial blur, and lens blur.

In this application, Gaussian blur is used as an example of blurring processing. A Gaussian blur calculation process is convolving an image based on normal distribution. An image after the Gaussian blur has a visual effect similar to that of observing an image through ground glass.

However, drawing the window layers by using the GPU is power-consuming. Each window layer is drawn by using the GPU. Composition is performed also by using the GPU. This increases load of the GPU, and therefore power consumption increases. As a result, a battery life of the electronic device decreases.

Therefore, this application provides a layer blurring method, including: obtaining first layers of a first frame image, where the first layer includes a drawing result of the first frame image; determining a second layer based on a blurring tag of the first layers and a layer sequence; performing composition to obtain a blurred layer based on the second layer and a blurring parameter of a first control in the first layer, where the blurred layer includes an unblurred area and an area blurred based on a blurring parameter of the first control; obtaining, based on the blurred layer and the unblurred layer, a composition result having a blur effect of the first frame image; and performing display based on the composition result of the first frame image.

In this application, blurring processing is performed by a GPU only on the second layer determined based on the blurring tag, to generate the blurred layer. The blurred layer and the unblurred layer are composed to obtain the composition result having the blur effect of the first frame of image. Display is performed based on the composition result of the first frame image. Because the GPU processes only the layer indicated by the blurring tag, and does not need to process each layer, load and power consumption of the GPU can be reduced, and a battery life of the electronic device can be extended.

The layer blurring method provided in this embodiment of this application may be applied to an electronic device such as a mobile phone, a tablet computer, a wearable device, an in-vehicle device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

Figure 17:
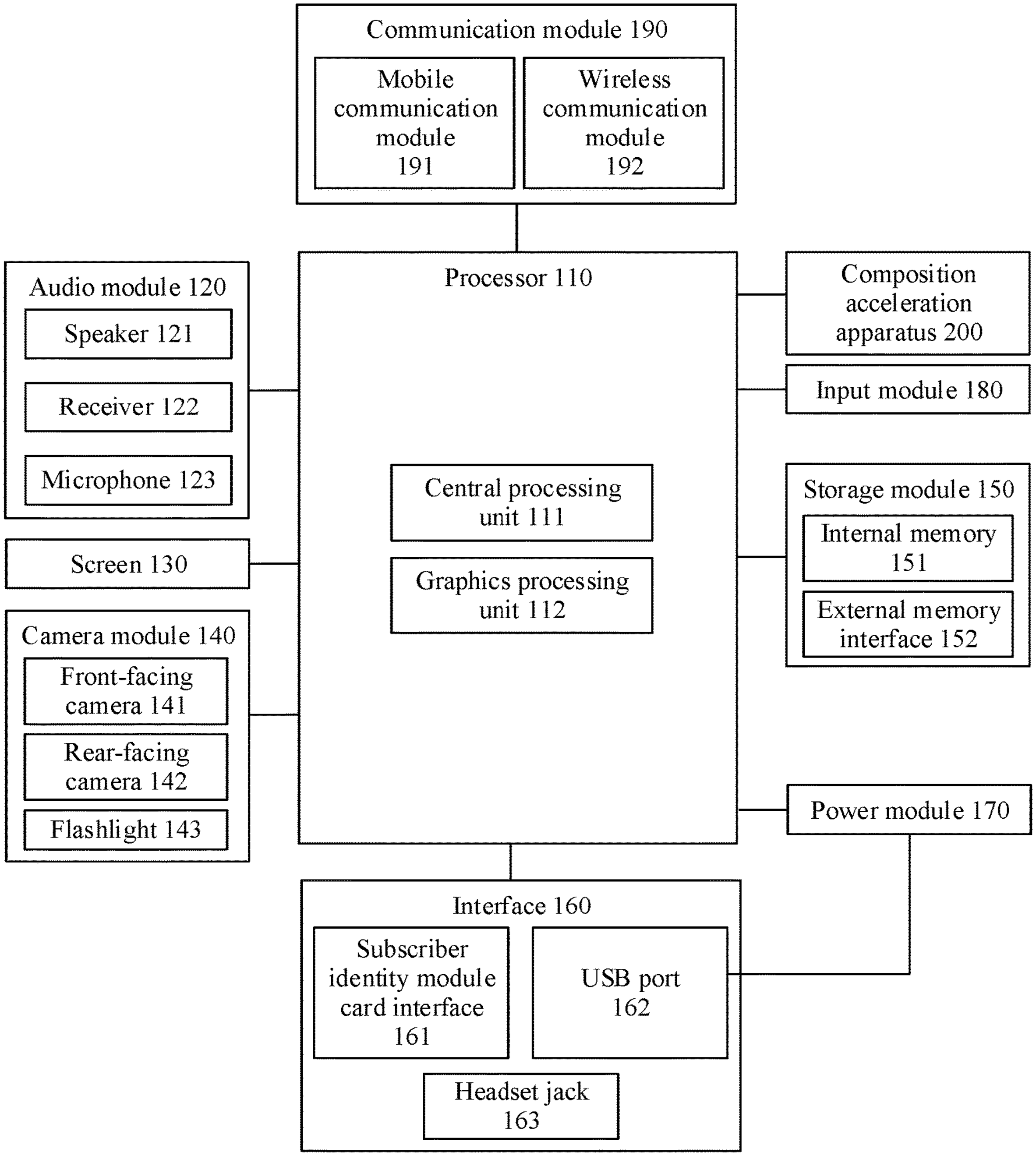
FIG. 17 is a schematic diagram of a structure of an electronic device according to an embodiment of this application.

For example, an electronic device is a mobile phone in descriptions herein. As shown in FIG. 1 and FIG. 17, the electronic device may further include a composition acceleration apparatus 200. A person skilled in the art may understand that structures of the electronic device shown in FIG. 1 and FIG. 17 do not constitute a limitation on the electronic device, and the electronic device may include more or fewer components than those shown in the figure, or some components are combined, or a different component arrangement may be used.

The composition acceleration apparatus 200 is a part of a display controller, and the composition acceleration apparatus may accelerate overlaying and composition with a plurality of channels in the display controller. Each channel corresponds to an input layer.

The software structure of the electronic device in this embodiment of this application is the same as that in FIG. 2. Details are not described herein.

FIG. 4 is a schematic flowchart of a layer blurring method according to this application. By way of example and not limitation, the method may be implemented on the foregoing electronic device.

Figure 18:
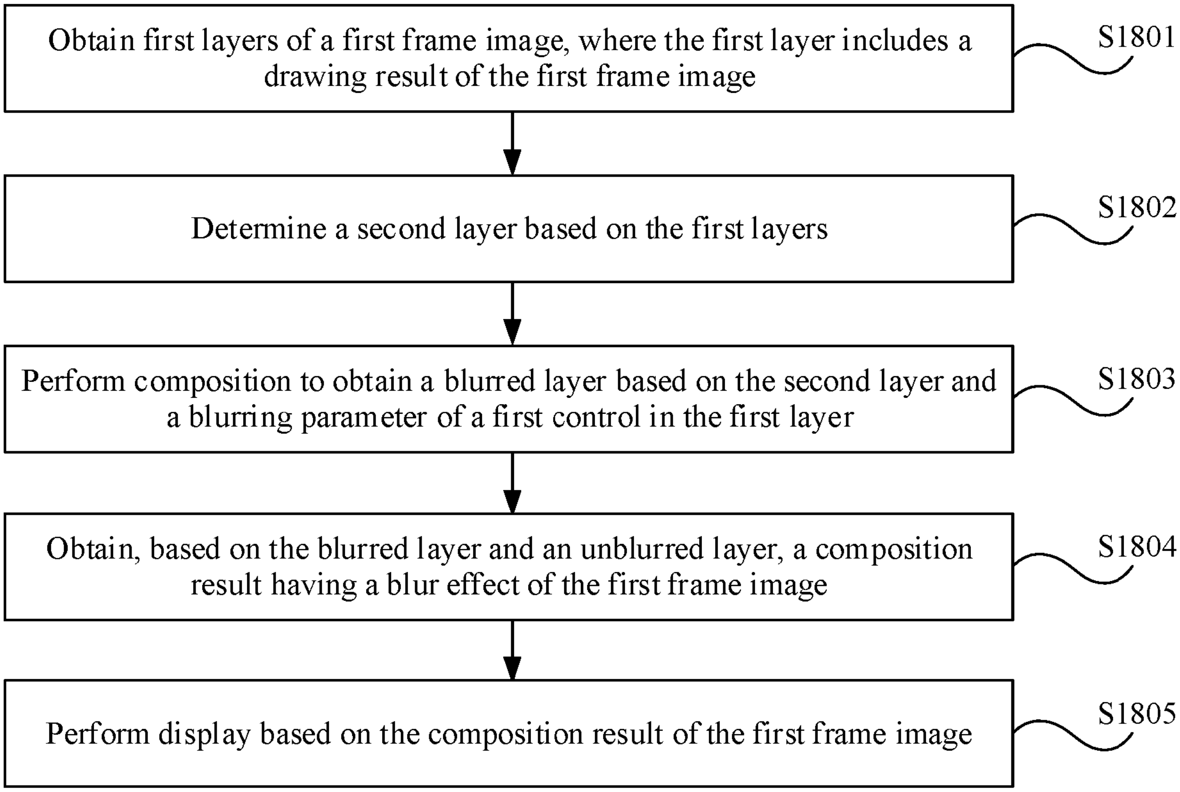
FIG. 18 is a schematic flowchart of a layer blurring method according to an embodiment of this application.

Refer to FIG. 18. The method includes the following steps.

S1801: Obtain first layers of a first frame image, where the first layer includes a drawing result of the first frame image.

S1802: Determine a second layer based on the first layers.

A layer is a unit for drawing an image, and memory space corresponding to the layer may be used to store a drawing result and layer information. The layer information may include layer property information such as a color gamut space, a layer position, a layer identifier, a layer size, and a layer resolution. The layer information may further include other layer-related information, for example, may further include a blurring tag, a blurring parameter, and the like.

In some system architectures, one application may correspond to at least one layer. For example, in an Android system, one application includes at least one activity component (activity), where the activity is a visualized application component, and one activity may correspond to one layer. For example, an activity can be displayed in a form of a button, a text, or a check box.

Layer drawing is to draw control content that is provided by an application and that corresponds to the layer in a memory corresponding to the layer, to obtain a drawing result corresponding to the layer. Layer composition is to overlay drawing results of one or more layers corresponding to a frame image according to a layer sequence to obtain a composition result. The composition result can be used to display a frame image on a screen.

The drawing result of the first frame image includes the drawing results of one or more layers corresponding to the first frame image. For example, if the first frame image includes one or more applications, and each application includes at least one activity, the drawing result of the first frame image includes a drawing result of each activity on a corresponding layer.

It should be noted that the second layer is a layer in first layers and is used to generate a burred layer. When the second layer is determined based on the first layers, a blurring tag in the first layers and a layer sequence of the first layers may be first obtained, where the blurring tag includes a top-blurring tag or a bottom-blurring tag. The layer sequence refers to a sequence of one or more first layers arranged in a direction perpendicular to the screen. The layer sequence can be specified by an application when the application creates the layer, and the layer sequence can be stored in a composer (surfaceflinger).

In some implementations, the first layer may be created by the application to draw a drawing result of the application (a window image of the application) or a drawing result of a control invoked by the application (a window image of the control).

Figure 19:
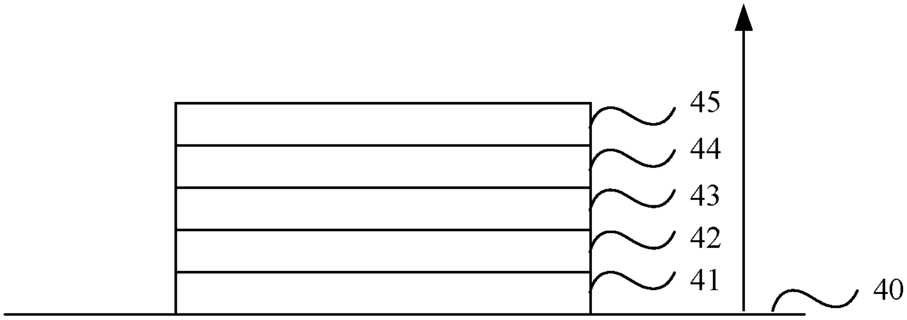
FIG. 19 is a schematic diagram of a sequence of first layers in a layer blurring method according to an embodiment of this application.

When a plurality of first layers are used for overlaying, an overlaying sequence of each first layer needs to be determined according to a layer sequence. For example, it is assumed that there are five first layers: a first layer 1, a first layer 2, a first layer 3, a first layer 4, and a first layer 5. In this case, the first layer 1 is a bottom layer in an outward direction perpendicular to the display screen, and the first layer 5 is a top layer in the outward direction perpendicular to the display screen. For example, FIG. 19 shows a sequence of a plurality of first layers, including a first layer 1 (41), a first layer 2 (42), a first layer 3 (43), a first layer 4 (44), and a first layer 5 (45). The first layer 1 is in a position closest to a display apparatus 40 among all the layers. An overlaying direction of the first layers is an outward direction perpendicular to the display apparatus 40 (a direction indicated by an arrow), that is, the first layer 5 is a top layer.

In some implementations, the first frame image may include one or more controls. In the one or more controls, a control marked as a to-be-blurred control is a first control. The first layer including the first control includes a blurring tag. The blurring tag may be recorded in layer information of the first layer when the first layer is generated.

If the blurring tag is a top-blurring tag, the second layer includes a first layer including the blurring tag and a first layer below the first layer including the blurring tag. Refer to FIG. 19. For example, if the first layer 4 (44) is marked with the top-blurring tag, the first layer 4 (44), the first layer 3 (43), the first layer 2 (42), and the first layer 1 (41) form the second layer.

If the blurring tag is a bottom-blurring tag, the second layer is a first layer below the first layer including the blurring tag. Refer to FIG. 19. For example, if the first layer 4 (44) is marked with the bottom-blurring tag, the first layer 3 (43), the first layer 2 (42), and the first layer 1 (41) form the second layer.

S1803: Perform composition to obtain a blurred layer based on the second layer and a blurring parameter of the first control in the first layer.

The blurred layer includes an area that is not blurred and an area that is blurred based on the blurring parameter of the first control.

In some implementations, the blurring parameter may include a dynamic parameter and a static parameter. The dynamic parameter may include a parameter, in each frame, that describes a change of a control. For example, the dynamic parameter may include one or more of parameters that change over time, such as whether a control is blurred, a control coordinate, a size, a corner radius, and transparency. The static parameter may be used to indicate a blur effect parameter used when blurring processing is performed on all frames. For example, the static parameter may include one or more of a blur type and blur strength.

In some implementations, to-be-blurred content in the second layer may be first determined based on the dynamic parameter.

Then blurring processing is performed on to-be-blurred content based on the static parameter, to generate the blurred layer.

Figure 20:
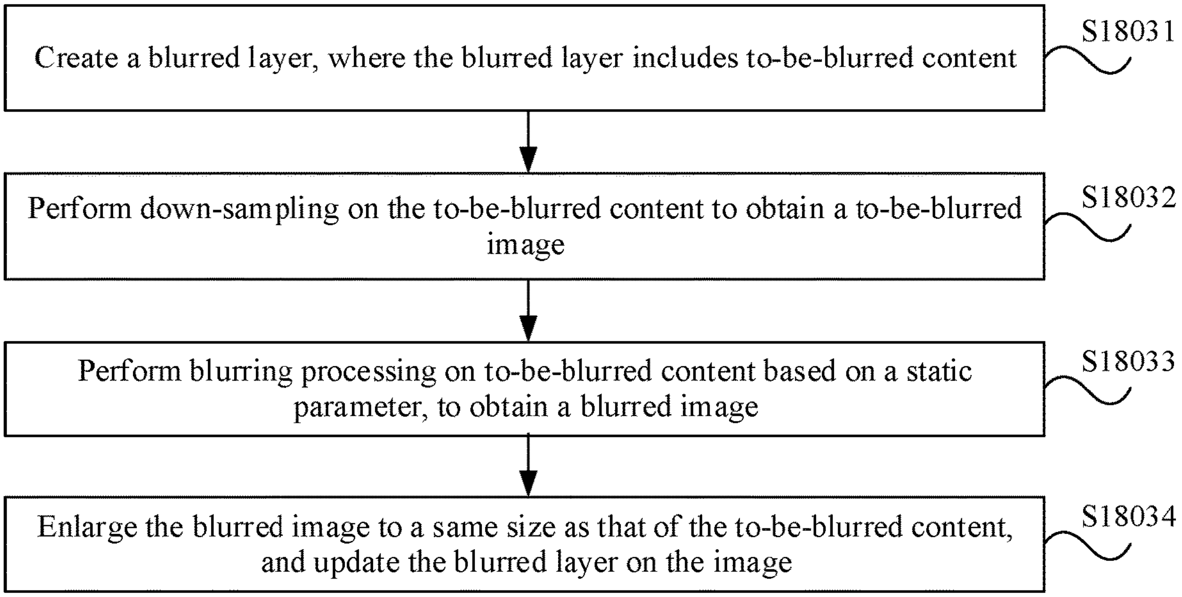
FIG. 20 is a schematic flowchart of another layer blurring method according to an embodiment of this application.

For example, for steps performed to obtain the blurred layer through composition based on the second layer and the blurring parameter of the first control in the first layer, reference may be made to the steps shown in FIG. 20.

As shown in FIG. 20, generating the blurred layer includes the following steps.

S18031: Create a blurred layer, where the blurred layer includes to-be-blurred content.

In some implementations, a sequence of the blurred layer in the layer sequence may be determined based on the blurring tag, where the blurred layer is between the first layer and the second layer. For example, there are five first layers, namely, a first layer 1, a first layer 2, a first layer 3, a first layer 4, and a first layer 5, and the first layer 4 is marked with a blurring tag. If the blurring tag of the first layer 4 is the top-blurring tag, the first layer 1, the first layer 2, the first layer 3, and the first layer 4 form a second layer, and a created blurred layer is located between the first layer 5 and the first layer 4. If the blurring tag of the first layer 4 is the bottom-blurring tag, the first layer 1, the first layer 2, and the first layer 3 form the second layer, and the created blurred layer should be located between the first layer 4 and the first layer 3.

Figure 16:
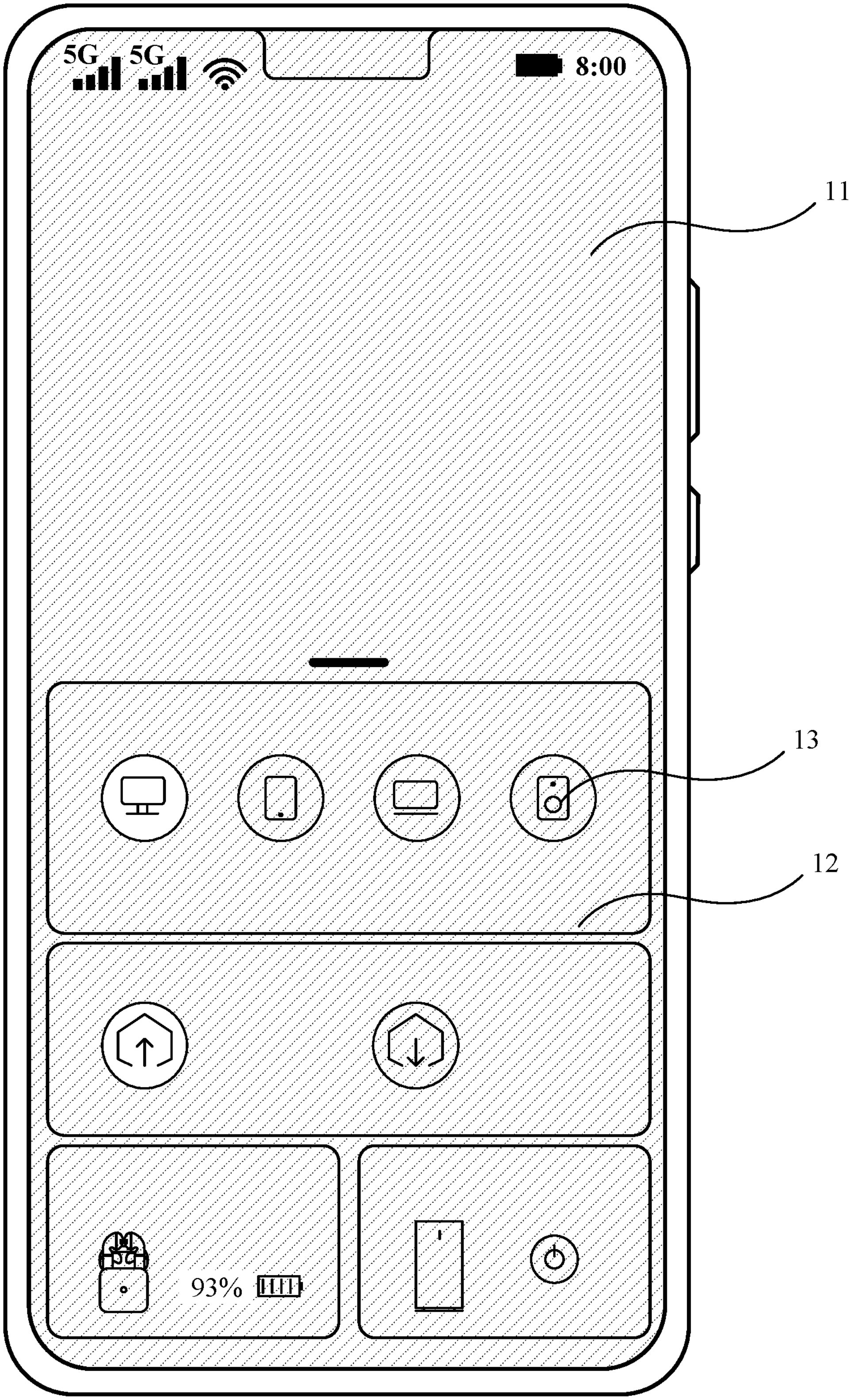
FIG. 16 is a schematic diagram of a layer blurring scenario.

It should be noted that, when the to-be-blurred content in the second layer is determined based on the dynamic parameter, the to-be-blurred content may be obtained from the second layer based on a blurred area (that is, an area corresponding to a control that needs to be blurred) indicated by the dynamic parameter. The blurred area may be implemented in a form of a layer mask. Refer to FIG. 16. For example, if the blurred area indicated by the dynamic parameter is the window 12 of the control center, a layer mask having a same size as that of the window 12 of the control center may be established. When the layer 1, the layer 2, and the layer 3 are combined to obtain the to-be-blurred content, an area outside a range of the layer mask is cropped, and only the area within the range of the layer mask is reserved as the to-be-blurred content.

It should be further noted that the to-be-blurred content obtained based on the dynamic parameter is drawn at the blurred layer, that is, the to-be-blurred content in the blurred layer is stored in a frame buffer corresponding to the blurred layer.

In another possible implementation, if layer information of the first layers does not include the blurring tag, the first layers may be sent to a composition acceleration apparatus according to a layer sequence for composition, so that the layers can be displayed on the display screen.

S18032: Perform down-sampling on the to-be-blurred content to obtain a to-be-blurred image.

S18033: Perform blurring processing on to-be-blurred content based on the static parameter, to obtain a blurred image.

S18034: Enlarge the blurred image to a same size as that of the to-be-blurred content, and update the blurred layer on the image.

In some implementations, when down-sampling is performed on the to-be-blurred content, the to-be-blurred content may be down-sampled by using a HwLayerBlurEngine service, and stored in a buffer specially used for blurring processing. Based on the blurring parameter, the GPU performs blurring processing on the to-be-blurred content in the buffer, to obtain the blurred image. Finally, the blurred image is up-sampled by using the HwLayerBlurEngine service, and is stored in a frame buffer corresponding to the blurred layer. In this way, a blurred image having a same size as that of the to-be-blurred content can be obtained.

It should be noted that the static parameter may include a blur type, a blur strength, and the like. For example, the blur type may be Gaussian blur, radial blur, lens blur, or the like. Each blur type corresponds to a blur strength. For example, a blur strength of Gaussian blur may be represented by using a blur radius (with pixel being a unit).

After down-sampling is performed on the to-be-blurred content, the size is reduced. Therefore, power consumption of a GPU is lower when blurring processing is performed on the to-be-blurred content. Moreover, up-sampling the blurred image does not significantly affect image quality. Down-sampling and blurring processing are first performed on the to-be-blurred content, and then up-sampling is performed to restore the to-be-blurred content to an original size. In this way, power consumption of the GPU can be reduced without affecting image quality, and a battery life of an electronic device can be extended.

S1804: Obtain, based on the blurred layer and the unblurred layer, a composition result having a blur effect of the first frame image.

In some implementations, when the blurred layer is obtained through composition based on the second layer and the blurring parameter of the first control in the first layer, the second layer may be composed into the blurred layer. That is, the blurred layer includes a drawing result in the second layer. In this case, the unblurred layer is a first layer not indicated by the blurring tag. For example, refer to the example in S18031. When the blurring tag is the top-blurring tag, the blurred layer includes drawing results of the first layer 1, the first layer 2, the first layer 3, and the first layer 4; and the first layer 5 is an unblurred layer. When the blurring tag is the bottom-blurring tag, the blurred layer includes drawing results of the first layer 1, the first layer 2, and the first layer 3, and the first layer 5 and the first layer 4 are unblurred layers.

In still another possible implementation, when the blurred layer is obtained through composition based on the second layer and the blurring parameter of the first control in the first layer, the second layer may not be composed into the blurred layer, but the second layer is reserved and composed with the blurred layer and the unblurred layer, to obtain the composition result having the blur effect of the first frame image.

In some implementations, when the composition result having the blur effect of the first frame image is obtained based on the blurred layer and the unblurred layer, a quantity of blurring tags may be obtained first.

If the quantity of the blurring tags is 1, the blurred layer and the unblurred layer are input to the composition acceleration apparatus, and composition is performed to obtain the composition result having the blur effect of the first frame image.

It should be noted that the composition acceleration apparatus includes a plurality of channels, and each channel corresponds to one layer. For composition, a sum of a quantity of blurred layers and a quantity of unblurred layers may be greater than a quantity of channels. Therefore, before the blurred layer and the unblurred layer are sent to the composition acceleration apparatus according to the layer sequence for composition, a first quantity and a second quantity may be obtained first. The first quantity is a quantity of channels in the composition acceleration apparatus, and the second quantity is a sum of quantities of unblurred layers and blurred layers.

If the second quantity is greater than the first quantity, at least two consecutive unblurred layers in the layer sequence are converted into one unblurred layer, so that the second quantity is equal to or smaller than the first quantity. In this way, it can be ensured that all layers can be input into the composition acceleration apparatus for composition at one time.

For example, if the first quantity is 8, and the second quantity is 9. A sum of the quantity of the unblurred layers and the quantity of blurred layers is 9. For example, nine first layers in total may be included: a first layer 1, a first layer 2, a first layer 3, a first layer 4, a first layer 5, a first layer 6, a first layer 7, a first layer 8, and a blurred layer 1. The first layer 1, the first layer 2, the first layer 3, the first layer 4, the first layer 5, the first layer 6, the first layer 7, and the first layer 8 are unblurred layers. To ensure that all layers can be sent to the composition acceleration apparatus for composition at one time, two consecutive first layers in a layer sequence may be first combined by using the GPU. For example, the first layer 2 and the first layer 3 are combined, or the first layer 6 and the first layer 7 are combined. This is not limited herein. After the combination, the second quantity becomes 8, and is equal to the first quantity, so that all layers can be input into the composition acceleration apparatus for composition at one time.

If the quantity of the blurring tags is an integer greater than 1, the blurred layer and the unblurred layer are input to the graphics processing unit, and composition is performed to obtain the composition result having the blur effect of the first frame image.

S1805: Perform display based on the composition result of the first frame image.

The following further describes, by providing several implementation procedures of applying the layer blurring method, the layer blurring method provided in this application.

Figure 21A:
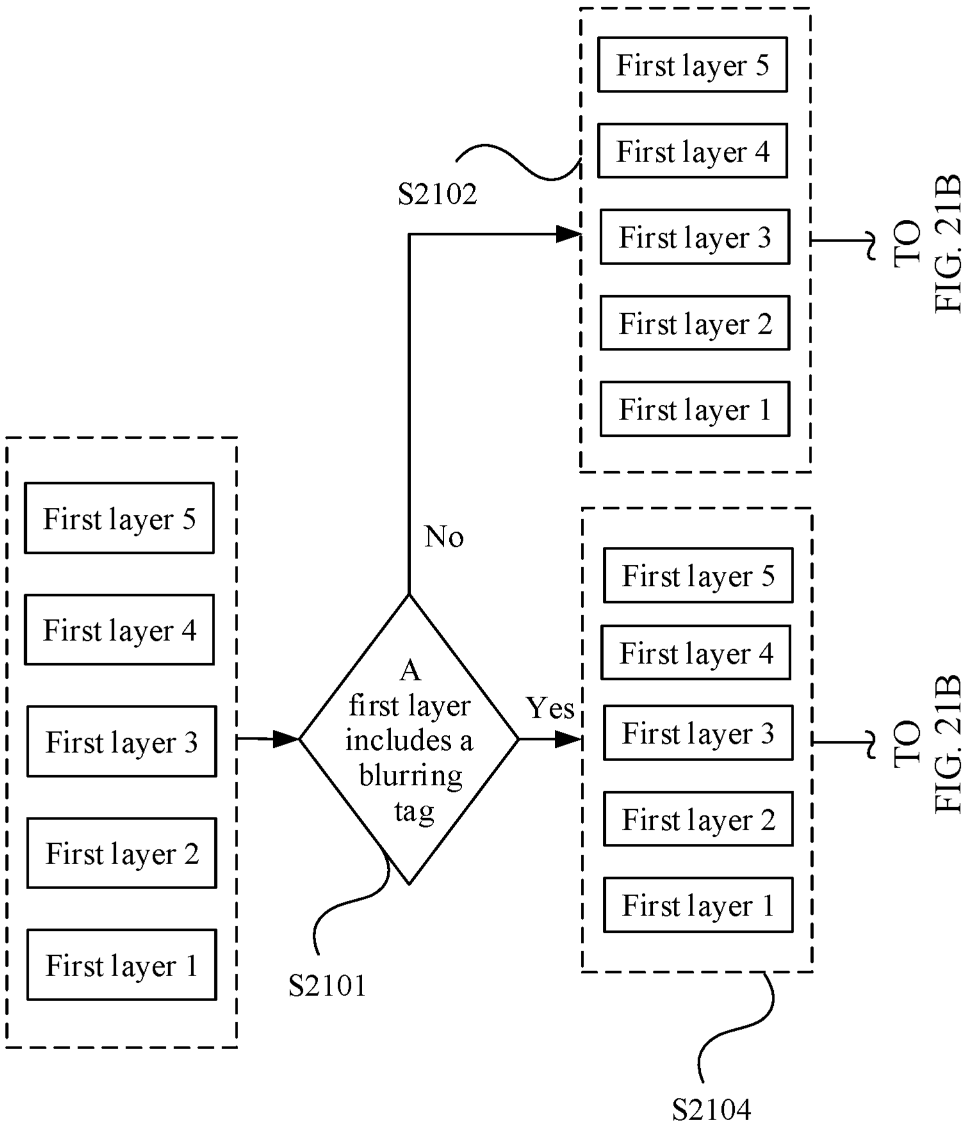
FIG. 21A, FIG. 21B, and FIG. 21C are a schematic flowchart of another layer blurring method according to an embodiment of this application.
Figure 21B:
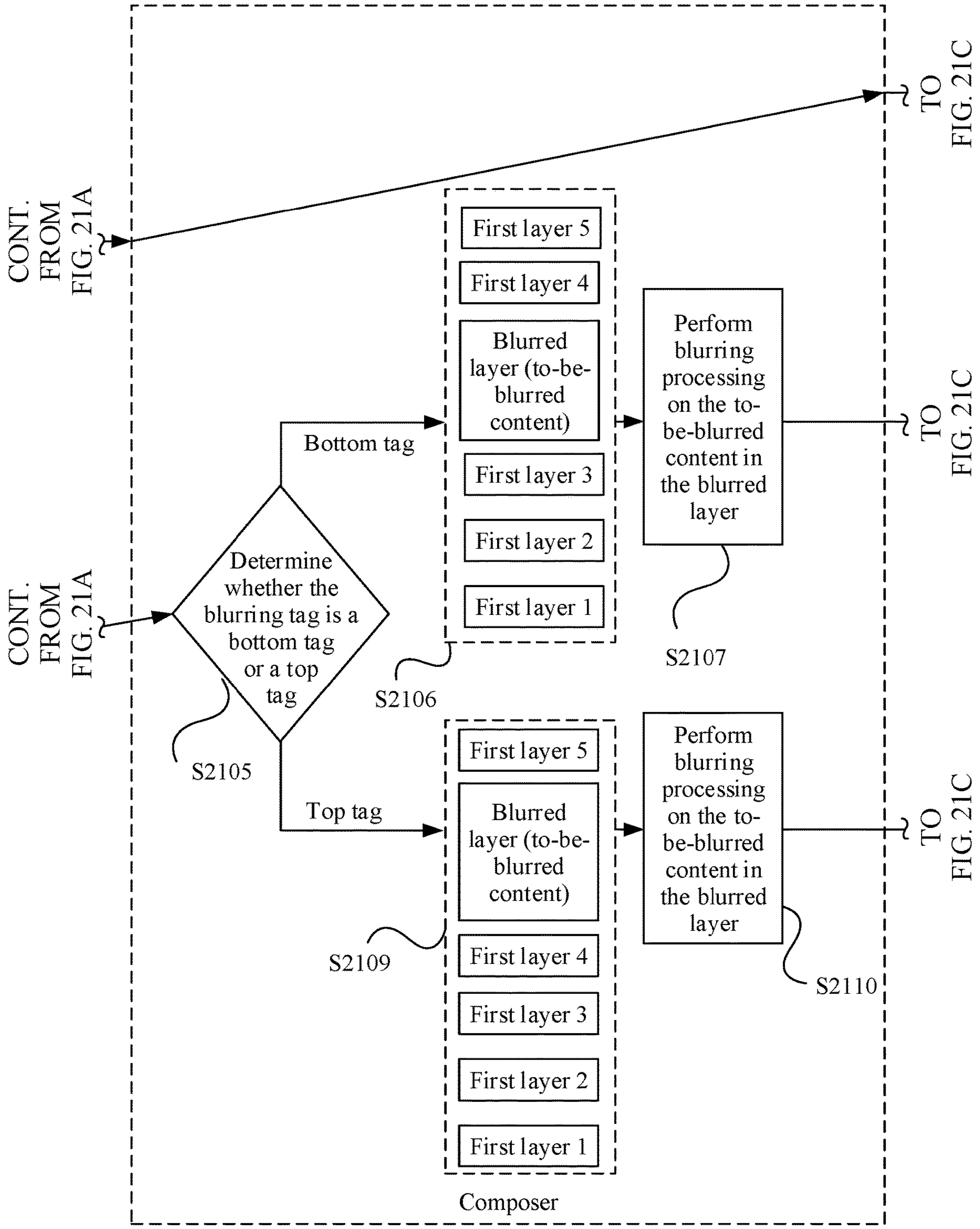
Figure 21C:
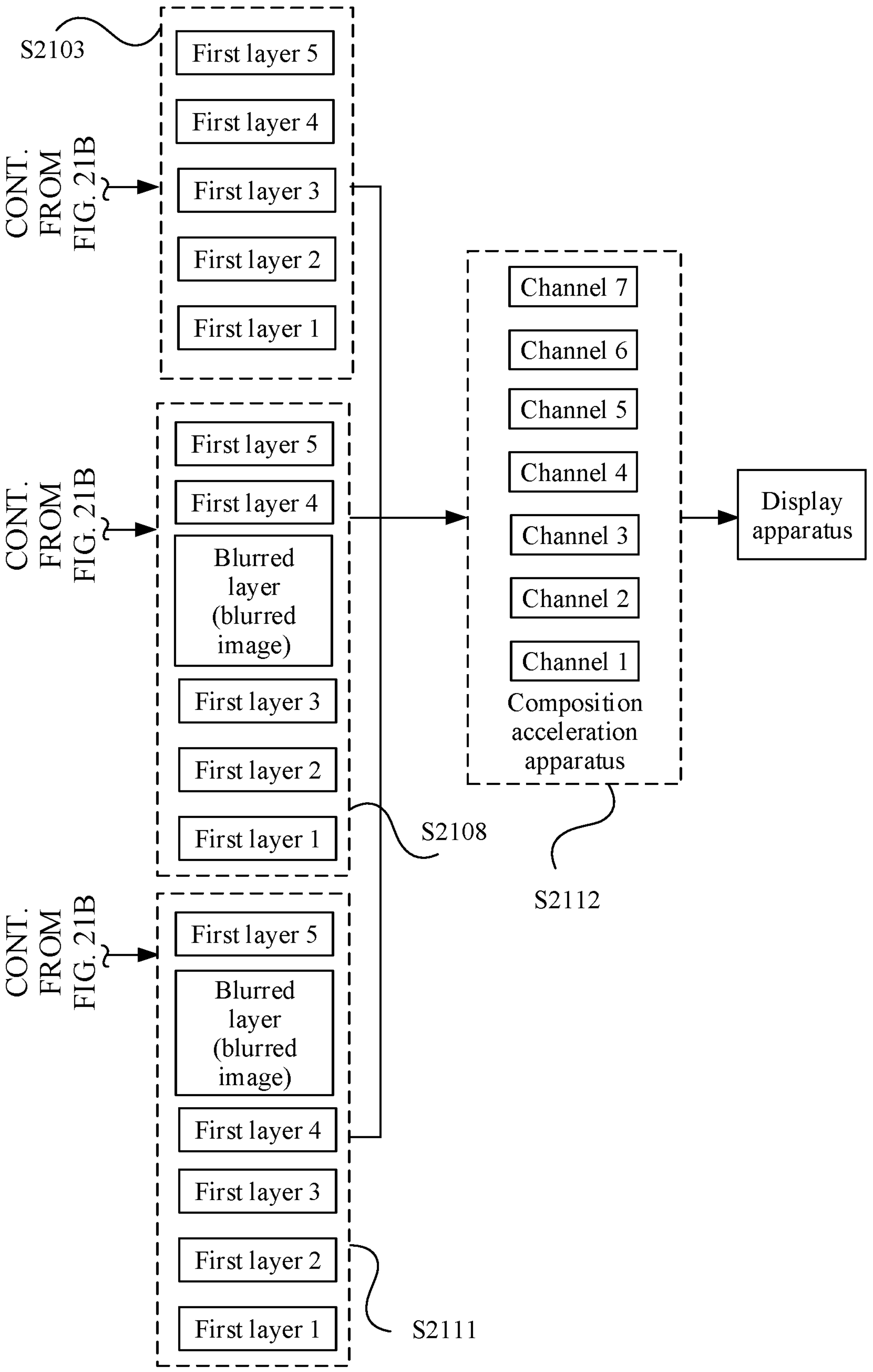

FIG. 21A, FIG. 21B, and FIG. 21C show a possible implementation procedure of the layer blurring method. According to the method, only one of a plurality of layers includes a blurring tag. A composer (Surfaceflinger) only performs blurring processing on the blurred layer, and the second layer is not composed into the blurred layer, but layers are composed in a composition acceleration apparatus.

Refer to FIG. 21A. The procedure includes the following steps.

S2101: Determine whether received first layers include a blurring tag; and if the received first layers do not include the blurring tag, perform S2102, or if the received first layers include the blurring tag, perform S2104.

S2102: Input the received first layers into a composer.

S2103: Input first layers that are output by the composer into a composition acceleration apparatus, and perform S2112.

S2104: Input the received layers including the blurring tag into the composer.

Refer to FIG. 21B. A first layer including the blurring tag is marked by shade, that is, a layer tag of the first layer 4 includes the blurring tag.

S2105: Determine whether the blurring tag is a bottom-blurring tag or a top-blurring tag; and if the blurring tag is the bottom-blurring tag, perform S2106, or if the blurring tag is the top-blurring tag, perform S2109.

S2106: Use a first layer below the first layer including the bottom-blurring tag as a second layer, and determine to-be-blurred content in the second layer based on a dynamic parameter.

Figure 22:
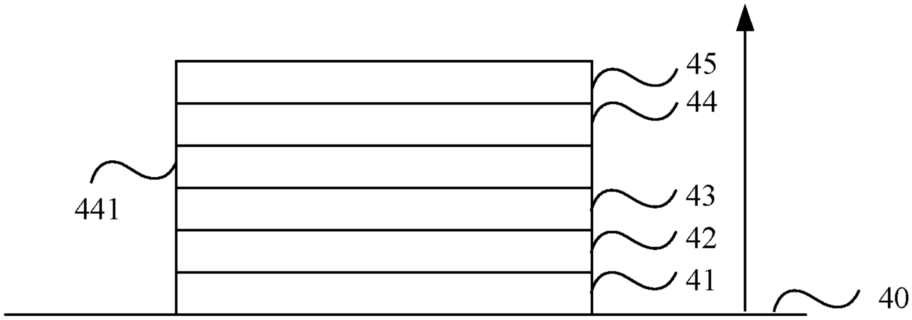
FIG. 22 is a schematic diagram of a sequence of a second layer in a layer blurring method according to an embodiment of this application.

Refer to FIG. 22. A blurred layer 441 is below a first layer 4 (44) and above a first layer 3 (43), and to-be-blurred content in the blurred layer 441 is obtained by combining a first layer 1 (41), a first layer 2 (42), and a first layer 3 (43) based on a dynamic parameter.

S2107: Perform blurring processing on the to-be-blurred content based on a static parameter, to generate the blurred layer.

For a method for performing blurring processing on the to-be-blurred content in the blurred layer, refer to the method shown in S2031 to S2034. Details are not described herein again.

S2108: Input the blurred layer, an unblurred layer, and the second layer that are output by the composer into the composition acceleration apparatus according to a layer sequence, and perform S2112.

S2109: Use a first layer below the first layer including the top-blurring tag as a second layer, and determine to-be-blurred content in the second layer based on a dynamic parameter.

Figure 23:
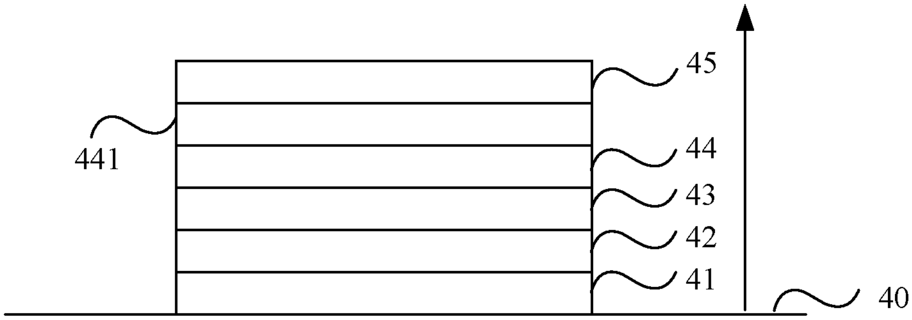
FIG. 23 is a schematic diagram of another sequence of a second layer in a layer blurring method according to an embodiment of this application.

Refer to FIG. 23. A blurred layer 441 is below a first layer 5 (45) and above a first layer 4 (44), and to-be-blurred content in the blurred layer 441 is obtained by combining a first layer 1 (41), a first layer 2 (42), a first layer 3 (43), and a first layer 4 (44) based on a dynamic parameter.

S2110: Perform blurring processing on the to-be-blurred content in the blurred layer.

A method for performing blurring processing on the to-be-blurred content in the blurred layer is the same as that in S2107. Details are not described herein again.

S2111: Input the blurred layer, an unblurred layer, and the second layer that are output by the composer into the composition acceleration apparatus according to a layer sequence, and perform S2112.

S2112: The composition acceleration apparatus composes the input layers, so that the layers can be displayed on a display apparatus.

The display apparatus may be a display screen. The display screen may be a display screen integrated to an electronic device, or may be an external display screen connected to the electronic device. This is not limited herein.

Figure 24A:
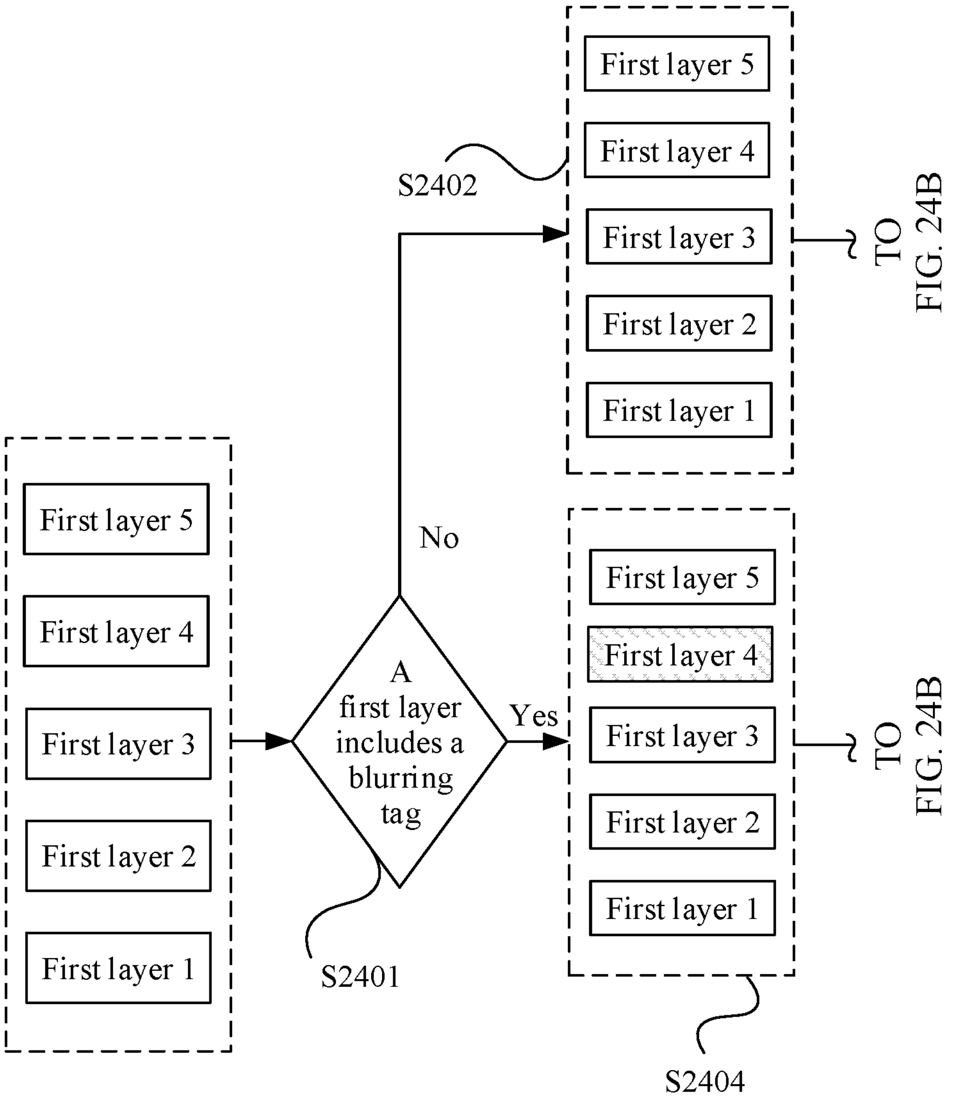
FIG. 24A, FIG. 24B, and FIG. 24C are a schematic flowchart of another layer blurring method according to an embodiment of this application.
Figure 24B:
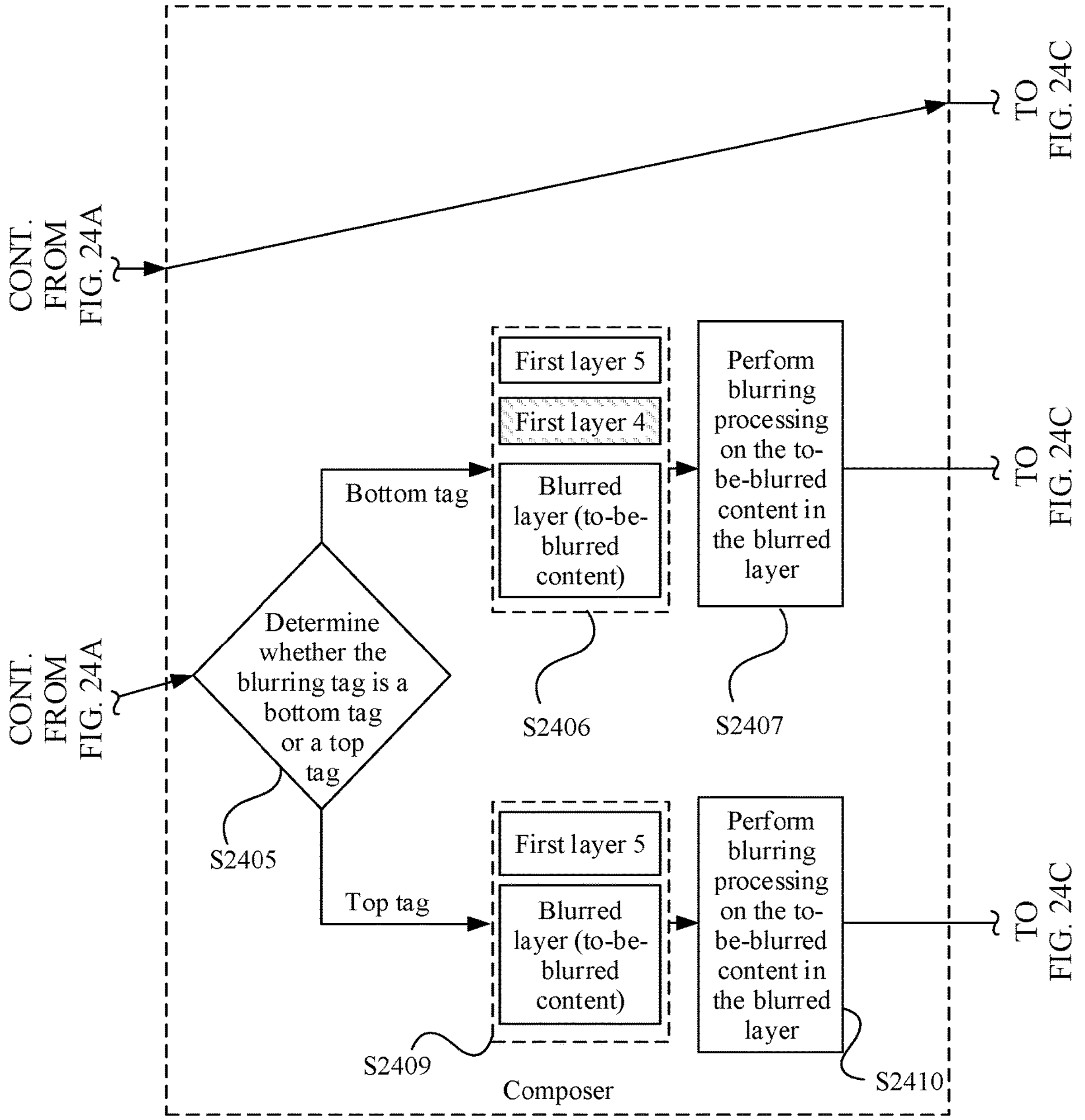
Figure 24C:
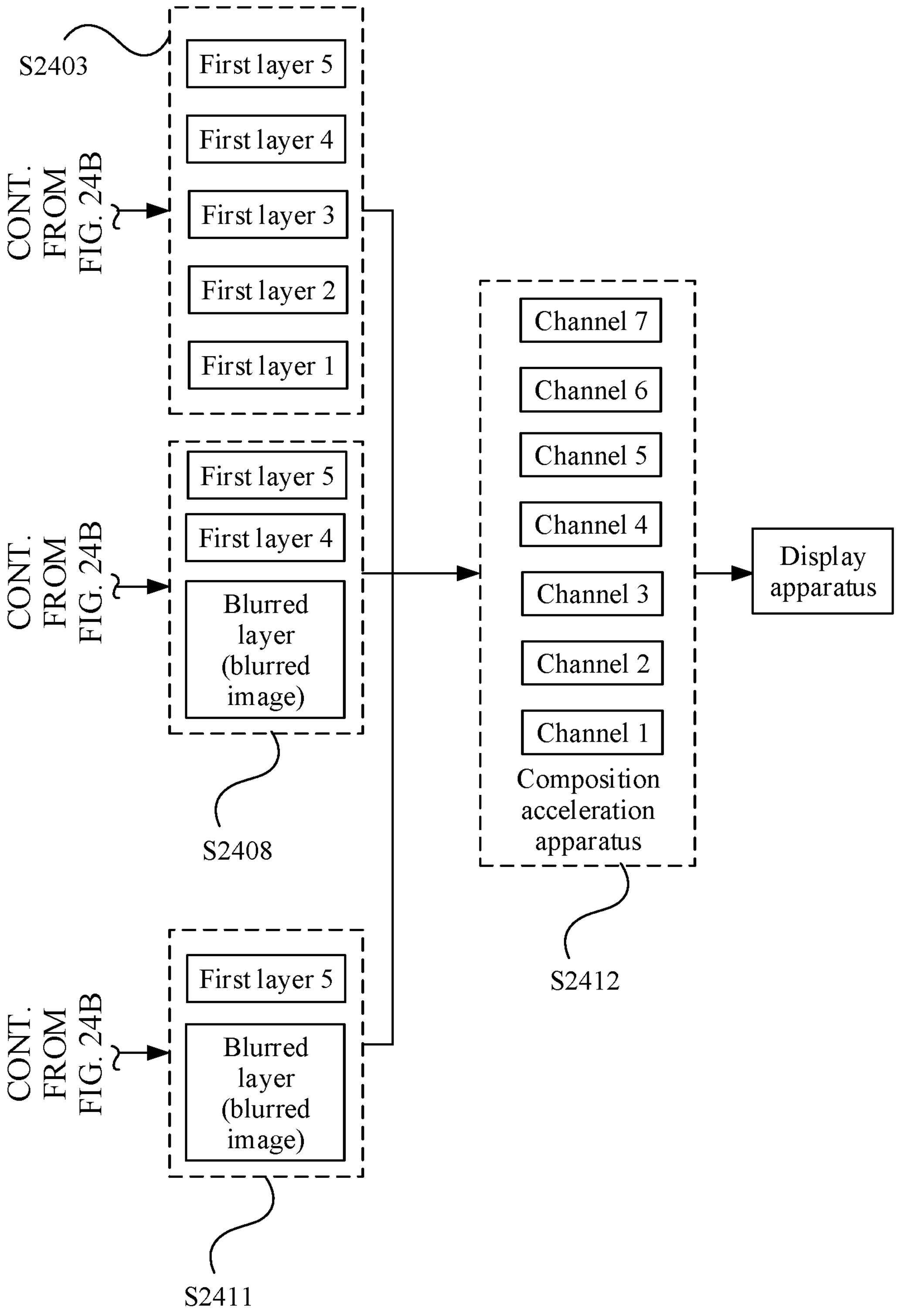
Figure 25A:
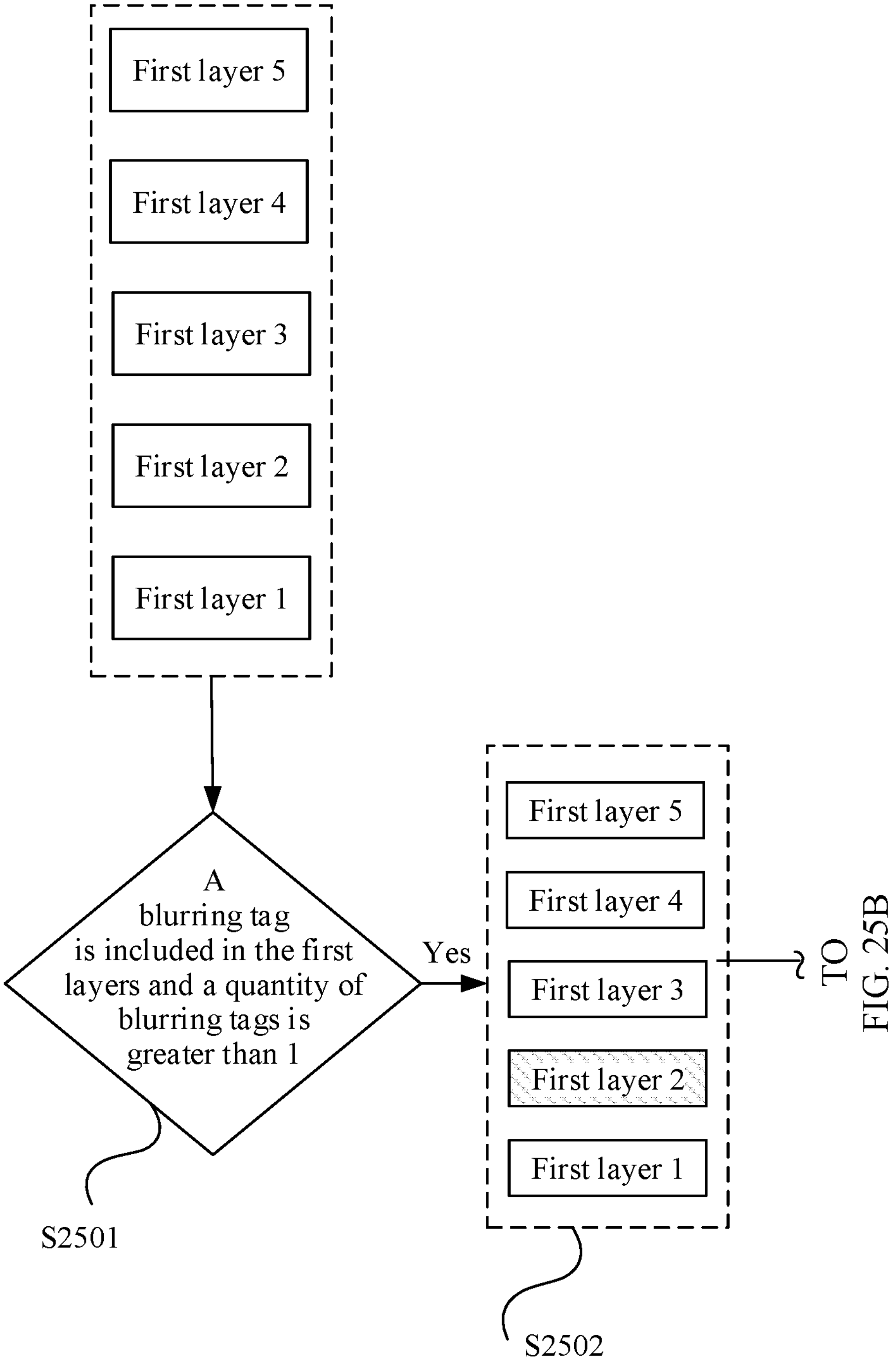
FIG. 25A, FIG. 25B, FIG. 25C, and FIG. 25D are a schematic flowchart of another layer blurring method according to an embodiment of this application.
Figure 25B:
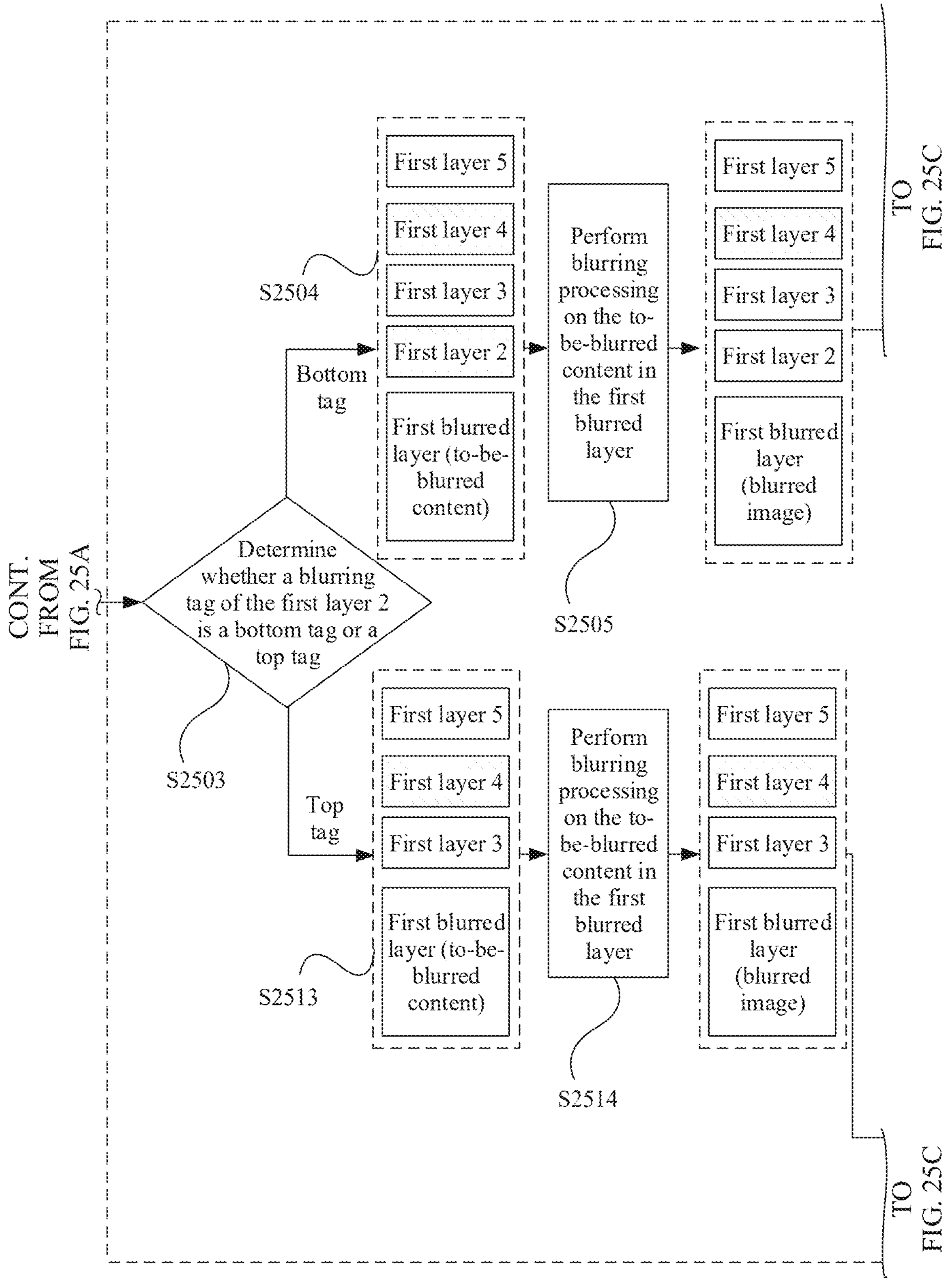
Figure 25C:
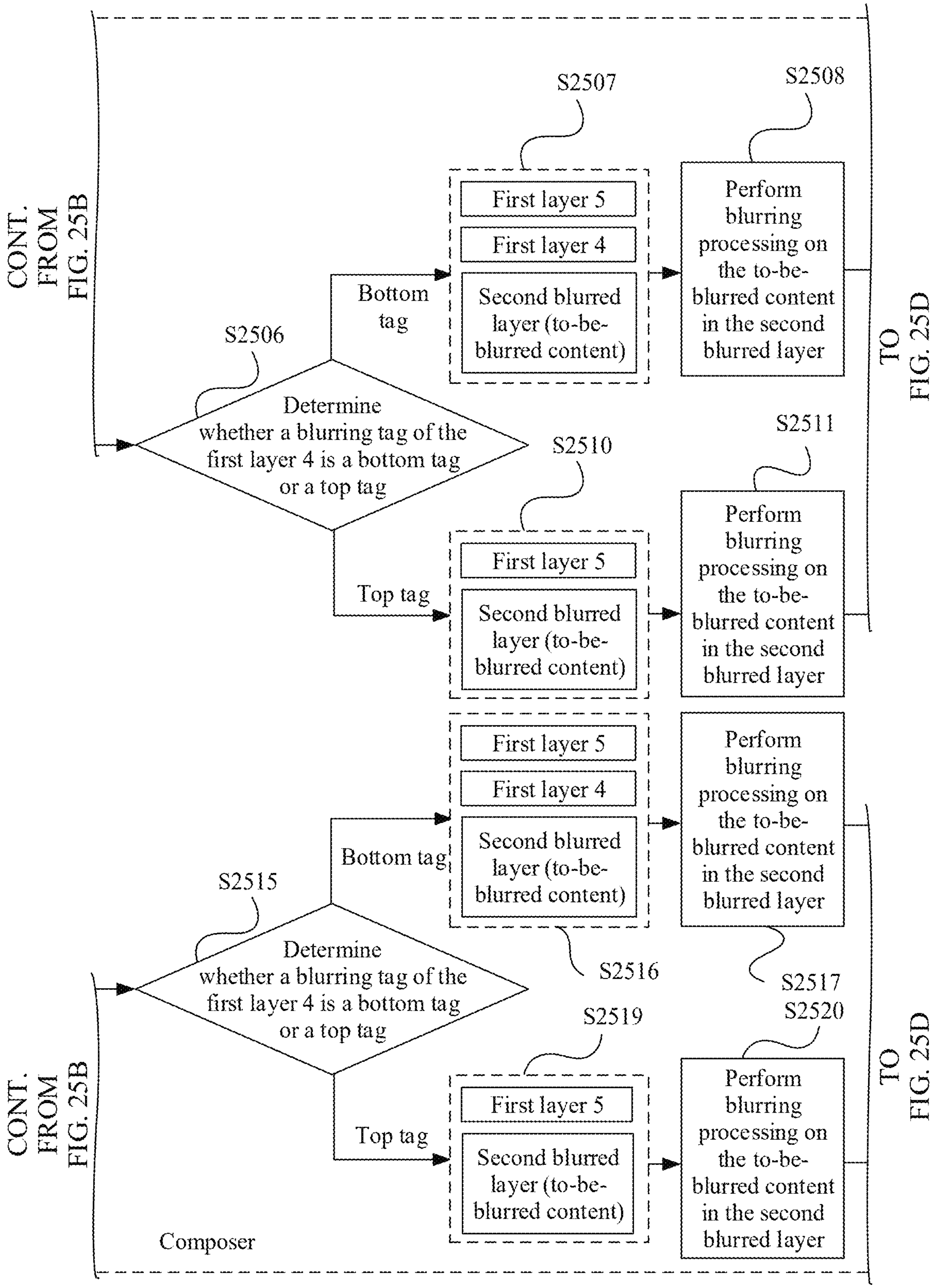
Figure 25D:
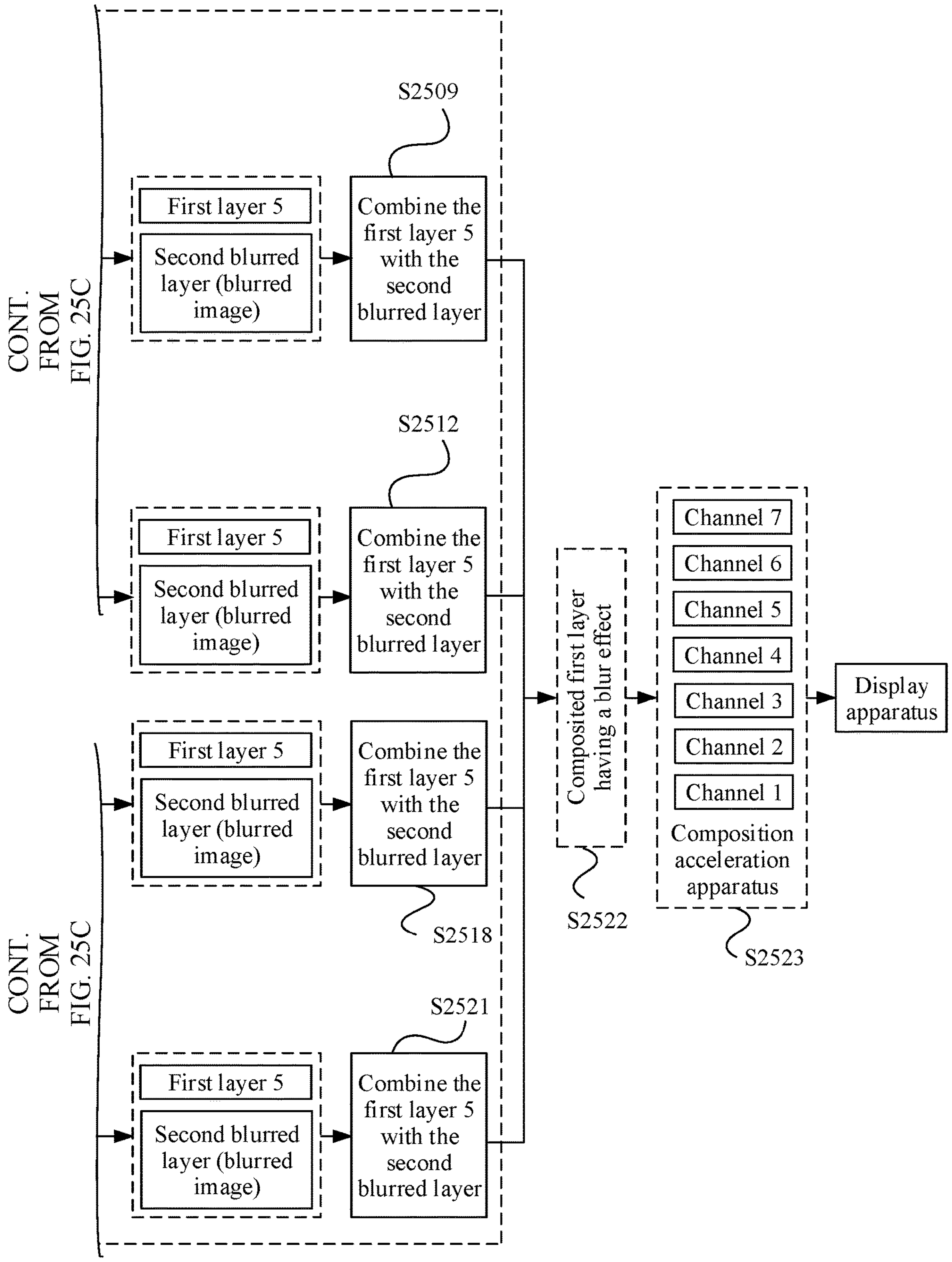

FIG. 24A, FIG. 24B, and FIG. 24C show another possible implementation procedure of the layer blurring method. According to the method, only one of a plurality of layers includes a blurring tag. A composer (Surfaceflinger) first performs blurring processing on a blurred layer, and then a second layer is composed into the blurred layer. Then the blurred layer and an unblurred layer are composed in a composition acceleration apparatus.

Refer to FIG. 24A, FIG. 24B, and FIG. 24C. The procedure includes the following steps.

S2401: Determine whether received first layers include a blurring tag; and if the received first layers do not include the blurring tag, perform S2402, or if the received first layers include the blurring tag, perform S2404.

S2402: Input the received first layers into a composer.

S2403: Input first layers that are output by the composer into a composition acceleration apparatus, and perform S2412.

S2404: Input the received layers including the blurring tag into the composer.

The blurring tag and a layer sequence in S2404 is the same as those in S2104. Details are not described herein again.

S2405: Determine whether the blurring tag is a bottom-blurring tag or a top-blurring tag; and if the blurring tag is the bottom-blurring tag, perform S2406, or if the blurring tag is the top-blurring tag, perform S2409.

S2406: Use a first layer below the first layer including the bottom-blurring tag as a second layer, and determine to-be-blurred content in the second layer based on a dynamic parameter.

For a location relationship between the first layer and a blurred layer, refer to S2106. Details are not described herein again.

S2407: Perform blurring processing on the to-be-blurred content based on a static parameter, to generate the blurred layer.

In this embodiment, when blurring processing is performed on the to-be-blurred content in the blurred layer, blurring processing may be first performed on the to-be-blurred content to obtain a blurred image. Then the blurred image is composed with the second layer, and then the blurred layer is updated on the image. To be specific, the blurred layer includes an area that is not blurred and an area that is blurred based on the dynamic parameter. For example, a first layer 4 includes the bottom-blurring tag, that is, a first layer 1, a first layer 2, and a first layer 3 form a second layer. To-be-blurred areas in the first layer 1, the first layer 2, and the first layer 3 may be first combined based on the dynamic parameter, and stored in the blurred layer as the to-be-blurred content. Then, blurring processing is performed on the to-be-blurred content to obtain a blurred image. Finally, the blurred image is composed with the second layer, and the blurred layer is updated on the image.

For blurring processing on the to-be-blurred content, refer to the method shown in S2031 to S2034. Details are not described herein again.

S2408: Input the blurred layer and an unblurred layer that are output by the composer into the composition acceleration apparatus according to a layer sequence, and perform S2412.

S2409: Use a first layer below the first layer including the top-blurring tag as a second layer, and determine to-be-blurred content in the second layer based on a dynamic parameter.

For a location relationship between the layer and the blurred layer, refer to S2109. Details are not described herein again.

S2410: Perform blurring processing on the to-be-blurred content in the blurred layer.

A method for performing blurring processing on the to-be-blurred content in the blurred layer is the same as that in S2407. Details are not described herein again.

S2411: Input the blurred layer and an unblurred layer that are output by the composer into the composition acceleration apparatus according to a layer sequence, and perform S2412.

S2412: The composition acceleration apparatus composes the input layers, so that the layers can be displayed on a display apparatus.

In this embodiment, because some layers are first composed in the composer, it can be ensured that a quantity of image layers output by the composer is less than a quantity of channels of the composition acceleration apparatus. This can effectively avoid a case in which the composition acceleration apparatus cannot compose all layers at one time because the quantity of the layers output by the composer is greater than the quantity of the channels of the composition acceleration apparatus.

FIG. 25A, FIG. 25B, FIG. 25C, and FIG. 25D show another possible implementation procedure of the layer blurring method. According to the method, there are two first layers including a blurring tag among first layers. A composer (Surfaceflinger) performs blurring processing on a blurred layer, and then the blurred layer and an unblurred layer are composed by using a GPU to obtain a composed layer having a blur effect. Finally, a composition result having the blur effect of the first frame image is transferred for display in a composition acceleration device.

Refer to FIG. 25A, FIG. 25B, FIG. 25C, and FIG. 25D. The procedure includes the following steps.

S2501: Determine whether received first layers include a blurring tag and whether a quantity of blurring tags is greater than 1, and if yes, perform S2502.

S2502: Input the received first layers into a composer.

Refer to FIG. 24A, FIG. 24B, and FIG. 24C. Among a first layer 1, a first layer 2, a first layer 3, a first layer 4, and a first layer 5 that are input to the composer, the first layer 4 and the first layer 2 include the blurring tag. Because the first layer 1 is a bottom layer, the first layers including the blurring tag may be processed in sequence from bottom to top.

S2503: Determine whether the blurring tag of the first layer 2 is a bottom-blurring tag or a top-blurring tag; and if the blurring tag is the bottom-blurring tag, perform S2504, or if the blurring tag is the top-blurring tag, perform S2513.

S2504: Use a first layer below the first layer 2 as a second layer, and determine to-be-blurred content in the second layer based on a dynamic parameter.

For a location relationship between the first layer 2 and a first blurred layer, refer to S2106. Details are not described herein again.

S2505: Perform blurring processing on the to-be-blurred content based on a static parameter, to generate the first blurred layer.

A method for performing blurring processing on to-be-blurred content in the first blurred layer is the same as that in S507. Details are not described herein again.

S2506: Determine whether the blurring tag of the first layer 4 is a bottom-blurring tag or a top-blurring tag; and if the blurring tag is the bottom-blurring tag, perform S2507, or if the blurring tag is the top-blurring tag, perform S2510.

S2507: Use the first layers below the first layer 4 as a second layer, and determine to-be-blurred content in the second layer based on the dynamic parameter.

S2508: Perform blurring processing on the to-be-blurred content based on a static parameter, to generate a second blurred layer.

A method for performing blurring processing on to-be-blurred content in the second blurred layer is the same as that in S2505. Details are not described herein again.

S2509: Compose an unblurred layer and the second blurred layer to obtain a composition result having a blur effect of a first frame image, and perform S2522.

S2510: Use the first layer 4, the first layers below the first layer 4, and the first blurred layer as a second layer, and determine to-be-blurred content in the second layer based on the dynamic parameter.

S2511: Perform blurring processing on the to-be-blurred content based on a static parameter, to generate a second blurred layer.

A method for performing blurring processing on to-be-blurred content in the second blurred layer is the same as that in S2505. Details are not described herein again.

S2512: Compose an unblurred layer and the second blurred layer to obtain a composition result having a blur effect of a first frame image, and perform S2522.

S2513: Use the first layer 2 and a first layer below the first layer 2 as a second layer, and determine to-be-blurred content in the second layer based on a dynamic parameter.

S2514: Perform blurring processing on the to-be-blurred content based on a static parameter, to generate a first blurred layer.

A method for performing blurring processing on to-be-blurred content in the first blurred layer is the same as that in S2505. Details are not described herein again.

S2515: Determine whether the blurring tag of the first layer 4 is a bottom-blurring tag or a top-blurring tag; and if the blurring tag is the bottom-blurring tag, perform S2507, or if the blurring tag is the top-blurring tag, perform S2519.

S2516: Use the first layers below the first layer 4 as a second layer, and determine to-be-blurred content in the second layer based on the dynamic parameter.

S2517: Perform blurring processing on the to-be-blurred content based on a static parameter, to generate a second blurred layer.

A method for performing blurring processing on to-be-blurred content in the second blurred layer is the same as that in S2505. Details are not described herein again.

S2518: Compose an unblurred layer and the second blurred layer to obtain a composition result having a blur effect of a first frame image, and perform S2522.

S2519: Use the first layer 4, the first layers below the first layer 4, and the first blurred layer as a second layer, and determine to-be-blurred content in the second layer based on the dynamic parameter.

S2520: Perform blurring processing on the to-be-blurred content based on a static parameter, to generate a second blurred layer.

A method for performing blurring processing on to-be-blurred content in the second blurred layer is the same as that in S2505. Details are not described herein again.

S2521: Compose an unblurred layer and the second blurred layer to obtain a composition result having a blur effect of a first frame image, and perform S2522.

S2522: Input a composed layer having the blur effect into a composition acceleration apparatus.

S2523: The composition acceleration apparatus outputs the input composition result having the blur effect of the first frame image to a display apparatus for display.

Figure 26:
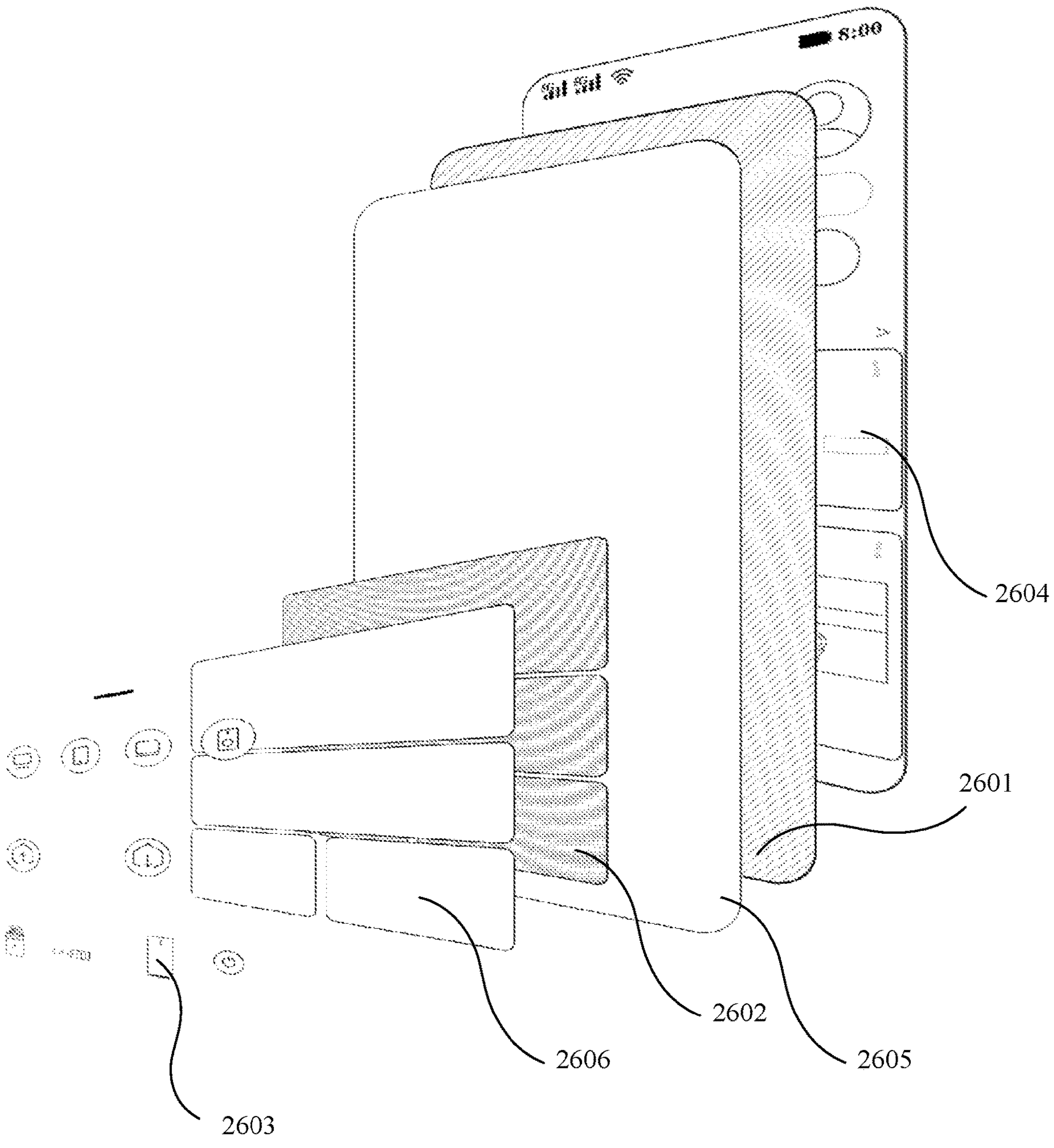
FIG. 26 is a schematic diagram of layers in a layer blurring method according to an embodiment of this application.
Figure 27:
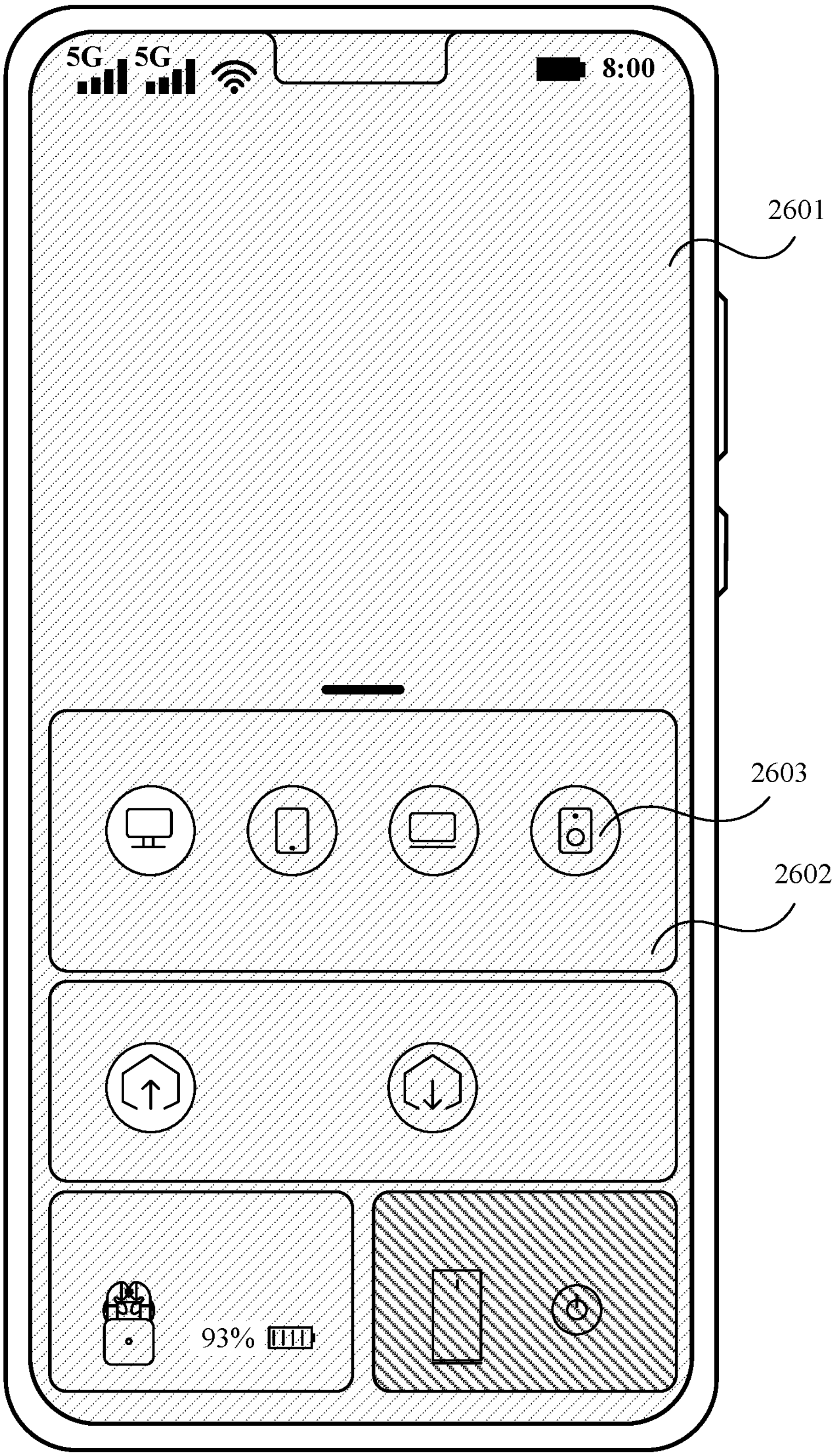
FIG. 27 is a schematic diagram of an application scenario of a layer blurring method according to an embodiment of this application.

FIG. 26 and FIG. 27 show a window interface obtained through composition according to an embodiment.

Refer to the foregoing example related to FIG. 16. As shown in FIG. 26, a first layer 1 is 2604, a first layer 2 is 2603, a first blurred layer is 2601, and a second blurred layer is 2602. A first mask 2605 and a second mask 2606 are respectively used for coloring on a first blurred layer and a second blurred layer. In some implementations, the first layer 2, namely, 2603, and the second mask 2606 may be combined, and are processed as a same first layer.

When the window shown in FIG. 26 is blurred, a top-blurring tag may be added to the first layer 1, and a bottom-blurring tag may be added to the first layer 2. In other words, the first blurred layer is a blurred image obtained when the first layer 1 is blurred, and the second blurred layer is a blurred image obtained when the first layer 1 and a corresponding blurred area in the first blurred layer are composed and blurred.

It should be noted that the first mask and the second mask may also be created by a composer, and may be set based on a preset color mixing parameter for creation. A layer covered by a mask is affected by a color parameter. For example, the color parameter may be saturation, contrast, brightness, or the like. This is not limited herein.

After the plurality of layers in FIG. 26 are composed, the window interface shown in FIG. 27 may be obtained. A color parameter of the first blurred layer 2601 and that of the second blurred layer 2602 may be different, so that a blurred image in the second blurred layer 2602 can be highlighted. For example, brightness of the first blurred layer 2601 may be lower than that of the second blurred layer 2602.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this application.

Figure 28:
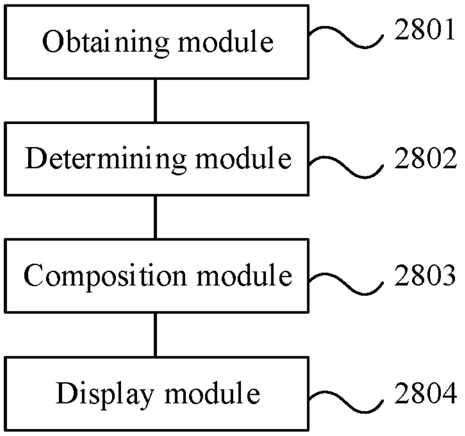
FIG. 28 is a schematic diagram of a structure of a layer blurring apparatus according to an embodiment of this application.

Corresponding to the layer blurring method in the foregoing embodiments, FIG. 28 is a block diagram of a structure of a layer blurring apparatus according to an embodiment of this application. For ease of description, only parts related to embodiments of this application are shown.

Refer to FIG. 28. The apparatus includes:

an obtaining module 2801, configured to obtain first layers of a first frame image, where the first layer includes a drawing result of the first frame image;

a determining module 2802, configured to determine a second layer based on the first layers, where the second layer is a layer that is in the first layers and that is used to generate a blurred layer;

a composition module 2803, configured to perform composition to obtain a blurred layer based on the second layer and a blurring parameter of a first control in the first layer, where the blurred layer includes an unblurred area and an area blurred based on a blurring parameter of the first control, and the composition module 2803 is configured to obtain, based on the blurred layer and the unblurred layer, a composition result having a blur effect of the first frame image; and a display module 2804, configured to perform display based on the composition result of the first frame image.

In some implementations, the determining module 2802 is specifically configured to obtain a blurring tag in the first layers and a layer sequence of the first layers, where the blurring tag includes a top-blurring tag or a bottom-blurring tag. If the blurring tag is the top-blurring tag, the second layer includes a first layer including the blurring tag and a first layer below the first layer including the blurring tag; and/or If the blurring tag is a bottom-blurring tag, the second layer is a first layer below the first layer including the blurring tag.

In some implementations, the unblurred layer is a first layer not indicated by the blurring tag.

In some implementations, the blurring parameter includes a dynamic parameter and a static parameter. The dynamic parameter is a parameter that is of the first control and that changes over time. The dynamic parameter includes one or more of coordinates, a size, a corner radius, and transparency of a control. The static parameter includes a blur type and a blur strength.

In some implementations, the composition module 2803 is specifically configured to determine to-be-blurred content in the second layer based on the dynamic parameter; and perform blurring processing on the to-be-blurred content based on the static parameter, to generate the blurred layer.

In some implementations, the composition module 2803 is specifically configured to: create the blurred layer, where the blurred layer includes the to-be-blurred content; perform down-sampling on the to-be-blurred content, to obtain a to-be-blurred image; perform blurring processing on the to-be-blurred content based on the static parameter, to obtain a blurred image; and enlarge the blurred image to a size same as a size of the to-be-blurred content, and update the blurred layer on the image.

In some implementations, the composition module 2803 is specifically configured to: obtain a quantity of blurring tags; and if the quantity of the blurring tags is 1, input the blurred layer and the unblurred layer to a composition acceleration apparatus, and perform composition to obtain the composition result having the blur effect of the first frame image; or if the quantity of the blurring tags is an integer greater than 1, input the blurred layer and the unblurred layer to a graphics processing unit, and perform composition to obtain the composition result having the blur effect of the first frame image.

In some implementations, the obtaining module 2801 is further configured to obtain a first quantity, where the first quantity is a quantity of channels in the composition acceleration apparatus; and obtain a second quantity, where the second quantity is a sum of a quantity of unblurred layers and a quantity of blurred layers. If the second quantity is greater than the first quantity, the composition module is further configured to combine at least two consecutive unblurred layers in the layer sequence into one unblurred layer, so that the second quantity is equal to or smaller than the first quantity.

In some implementations, the composition module 2803 is further configured to: if layer information of the first layers does not include the blurring tag, send the first layers to the composition acceleration apparatus according to the layer sequence for composition, to obtain the composition result of the first frame image.

In some implementations, the layer sequence refers to a sequence of the first layers arranged in a direction perpendicular to a screen.

It should be noted that content such as information exchange between the foregoing modules and an execution process is based on a same concept as that in the method embodiments of this application. For specific functions and technical effects of the content, refer to the method embodiments. Details are not described herein again.

It may be clearly understood by a person skilled in the art that, for convenient and brief description, division of the foregoing functional units and modules is merely used as an example for description. In actual application, the foregoing functions can be allocated to different functional units and modules for implementation according to a requirement, that is, an inner structure of the apparatus is divided into different functional units or modules to implement all or some of the functions described above. The functional units or modules in the embodiments may be integrated into one processing unit, or each of the units may exist alone physically, or two or more units may be integrated into one unit. The integrated unit may be implemented in a form of hardware, or may be implemented in a form of a software functional unit. In addition, specific names of the functional units and modules are merely used for ease of distinguishing between the functional units and modules, but are not intended to limit the protection scope of this application. For a specific working process of the units or modules in the foregoing system, refer to a corresponding process in the foregoing method embodiments. Details are not described herein again.

Figure 29:
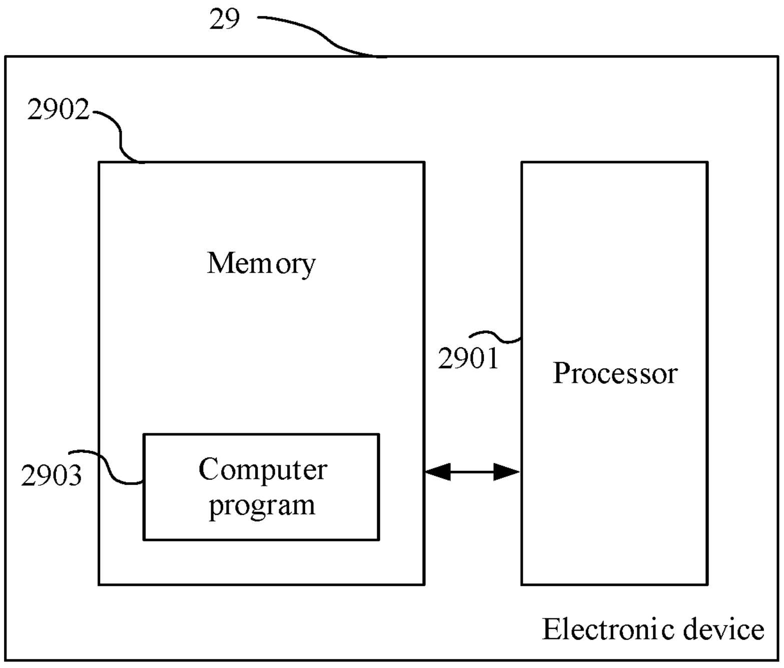
FIG. 29 is a schematic diagram of a structure of another electronic device according to an embodiment of this application.

FIG. 29 is a schematic diagram of a structure of an electronic device according to an embodiment of this application. As shown in FIG. 29, an electronic device 29 in this embodiment includes: at least one processor 2901 (only one processor is shown in FIG. 29), a memory 2902, and a computer program 2903 that is stored in the memory 2902 and that can be run on the at least one processor 2901. The processor 2901 executes the computer program 2903 to implement the steps in the foregoing method embodiments.

The electronic device 29 may be an electronic device such as a mobile phone, a desktop computer, a notebook computer, a palmtop computer, or a cloud server. The electronic device may include but is not limited to including the processor 2901 and the memory 2902. A person skilled in the art may understand that FIG. 15 is merely an example of the electronic device 29, and does not constitute a limitation on the electronic device 29. The electronic device may include more or fewer components than those shown in the figure, or some components may be combined, or different components may be used. For example, the terminal device may further include an input/output device, a network access device, or the like.

The processor 2901 may be a central processing unit (Central Processing Unit, CPU). The processor 2901 may alternatively be another general-purpose processor, a digital signal processor (Digital Signal Processor, DSP), an application-specific integrated circuit (Application-Specific Integrated Circuit, ASIC), a field-programmable gate array (Field-Programmable Gate Array, FPGA) or another programmable logic device, a discrete gate or a transistor logic device, or a discrete hardware component. The general-purpose processor may be a microprocessor, or the processor may be any conventional processor or the like.

In some embodiments, the memory 2902 may be an internal storage unit of the electronic device 29, for example, a hard disk drive or an internal memory of the electronic device 29. In some other embodiments, the memory 2902 may alternatively be an external storage device of the electronic device 29, for example, a swappable hard disk, a smart media card (Smart Media Card, SMC), a secure digital (Secure Digital, SD) card, a flash card (Flash Card), or the like that is provided on the electronic device 29. Further, the memory 2902 may alternatively include both the internal storage unit and the external storage device of the electronic device 29. The memory 2902 is configured to store an operating system, an application, a boot loader (Boot Loader), data, another program, and the like, for example, program code of a computer program. The memory 2902 may further be configured to temporarily store data that has been output or is to be output.

An embodiment of this application further provides a computer-readable storage medium. The computer-readable storage medium stores a computer program. When a processor executes the computer program, the steps in the foregoing method embodiments can be implemented.

An embodiment of this application provides a computer program product. When the computer program product is run on a mobile terminal, the mobile terminal is enabled to implement steps in the foregoing method embodiments.

An embodiment of this application provides a chip system. The chip system includes a memory and a processor. The processor executes a computer program stored in the memory, to implement the steps in the foregoing method embodiments.

An embodiment of this application provides a chip system. The chip system includes a processor. The processor is coupled to the foregoing computer-readable storage medium. The processor executes a computer program stored in the computer-readable storage medium, to implement the steps in the foregoing method embodiments.

When the integrated unit is implemented in a form of a software functional unit and sold or used as an independent product, the integrated unit may be stored in a computer-readable storage medium. Based on such an understanding, in this application, all or some of the procedures of the methods in the foregoing embodiments may be implemented by a computer program instructing related hardware. The computer program may be stored in a computer-readable storage medium. When a processor executes the computer program, steps in the foregoing method embodiments can be implemented. The computer program includes computer program code. The computer program code may be in a source code form, an object code form, an executable file form, some intermediate forms, or the like. The computer-readable medium may include at least any entity or apparatus that can carry the computer program code to a terminal device, a recording medium, a computer memory, a read-only memory (Read-Only Memory, ROM), a random access memory (Random Access Memory, RAM), an electrical carrier signal, a telecommunication signal, and a software distribution medium, for example, a USB flash drive, a removable hard disk, a magnetic disk, or an optical disk. In some jurisdictions, the computer-readable medium cannot be an electrical carrier signal or a telecommunication signal according to legislation and patent practices.

In the foregoing embodiments, descriptions of all the embodiments have respective focuses. For a part that is not described in detail in an embodiment, refer to related descriptions in other embodiments.

A person of ordinary skill in the art may be aware that the units and algorithm steps described with reference to the examples in embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In embodiments provided in this application, it should be understood that the disclosed layer blurring method, apparatus, and device may be implemented in other manners. For example, the described embodiments for the layer blurring apparatus and device are merely examples. For example, division of the modules or units is merely logical function division and may be other division in an actual implementation. For example, a plurality of units or components may be combined or integrated into another system, or some features may be ignored or not performed. In addition, the displayed or discussed mutual couplings, direct couplings, or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected according to an actual requirement to achieve objectives of the solutions of the embodiments.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

When a user uses a terminal device to view a page or an application window that includes a video, if there is a control that needs to be blurred, for example, a push notification or a raised control center, blurring composition needs to be performed on a video image to perform blur the control. If a compression format used by the video cannot be directly used by the GPU, the video needs to be transcoded.

A large quantity of compression formats are used to generate videos. A GPU of a current terminal device may not support a compression format used to generate a video. For example, Huawei frame buffer compression (Huawei frame buffer compression, HFBC) is used to generate a video, but a HiSilicon (Hisi) or advanced reduced instruction set machines (Advanced RISC Machines, ARM) chip is used on the GUP. Because GPUs of the HiSilicon and ARM do not support HFBC, HFBC needs to be converted to ARM frame buffer compression (Arm frame buffer compression, AFBC), and then blurring composition is performed in the GPU.

In an application scenario, a push message may be received when a video is being played. A control layer for the push message is superimposed on a video layer, and the video layer is used as a background image to obtain a special effect of a blurred background through rendering and composition. If a compression format of the played video does not match the compression format supported by the GPU of the current terminal device, hardware transcoding needs to be performed on the video before blurring composition is performed.

Figure 30:
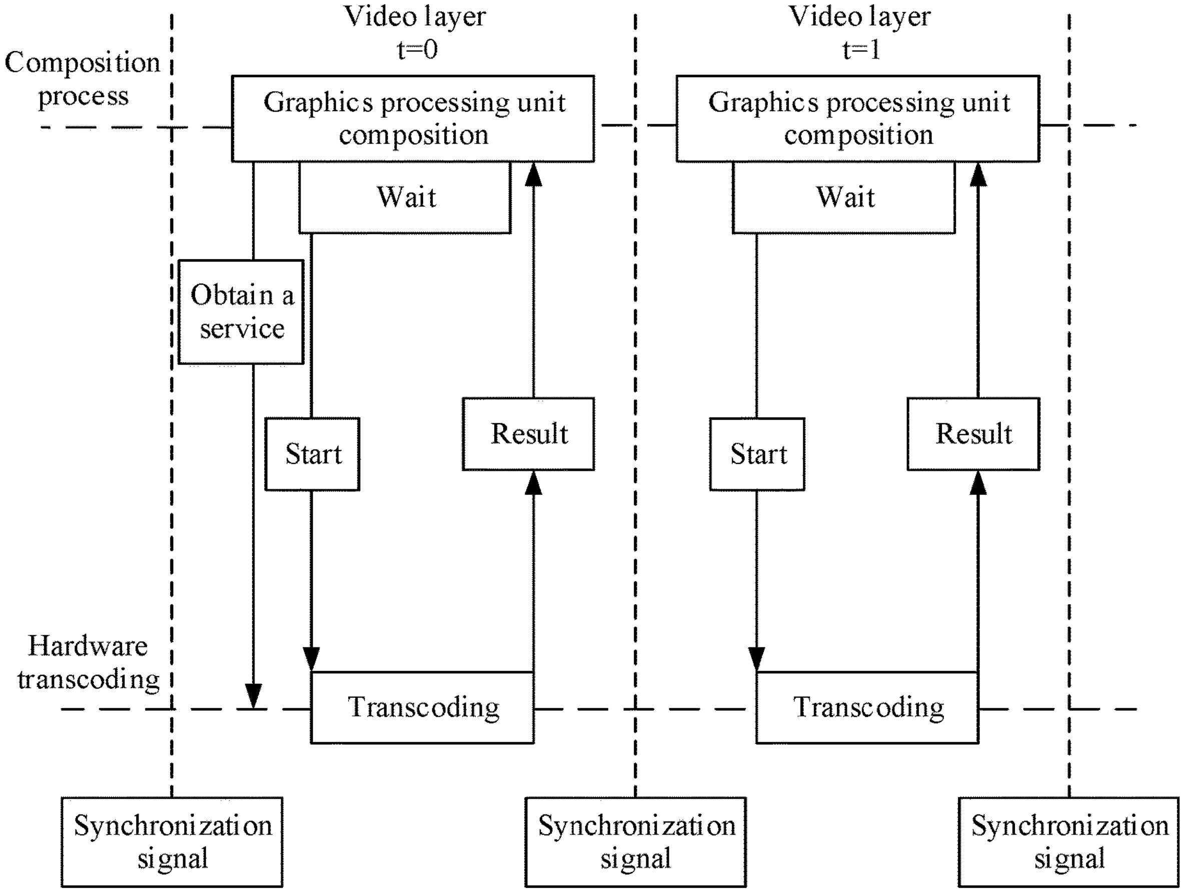
FIG. 30 is a schematic diagram of a timing of synchronous transcoding.

For a current process of performing hardware transcoding on a video, refer to a process shown in FIG. 30.

Refer to FIG. 30. In the conventional art, video transcoding is performed together with blurring composition. In other words, video transcoding and blurring composition are completed in one period. Duration between two synchronization signals is one period. Duration of the period may depend on a screen refresh rate. For example, if a screen refresh rate is 60 Hz, duration of each period is 1/60 second, that is, about 16.667 milliseconds. Graphics processing unit composition is implemented by using a GPU in a composition process, and may be used for blurring composition. Hardware transcoding is implemented by using a physical component that supports hardware transcoding, for example, a central processing unit (Central Processing Unit, CPU) that supports hardware transcoding, a hardware transcoding chip, or a hardware transcoding gateway.

In a first period (t=0), a composition process first obtains permission for a hardware transcoding service, and performs hardware transcoding on a first frame of a video after obtaining the permission for the hardware transcoding service. For example, the first frame of the video is sent to a hardware transcoding chip. The hardware transcoding chip transcodes the first frame in a buffer, and records a transcoding result in the buffer. Finally, a flag indicating that the first frame is successfully transcoded is added to the buffer.

In a process of transcoding performed by a hardware transcoding chip, the composition process stays in a waiting state until a transcoding result is obtained. The composition process uploads the transcoding result in the buffer to the GPU by using an embedded-system graphics library image (Embedded-System Graphics Library, EGLImage). Then a texture of the first frame of the video layer. Then, the composition process performs blurring composition on the video layer and other layers (such as a control layer) by using the GPU, and then outputs a composition result to a display device for display.

EGLImage is a shared resource type created by an open graphics library (Open Graphics Library, OpenGL) or a vector graphics algorithm standard (Open Vector Graphics, OpenVG), and may be used for image data sharing. The embedded-system graphics library (Embedded-System Graphics Library, EGL) is an interface layer between the OpenGL or the OpenVG and a local windowing system (such as SurfaceView in Android).

In the existing technologies, the blurring composition service and the hardware transcoding service are synchronous, in other words, the two services process a same frame of a to-be-transcoded video file in one period. However, because it takes time to complete hardware transcoding and blurring composition, when hardware transcoding and blurring composition cannot be completed in one period, a step of blurring composition and transferring for display can only be completed in a next period, resulting in blockage of the composition process. This slows down a composition speed, and causes visible frame freezing or frame loss.

Therefore, this application provides a transcoding method to process a to-be-transcoded video.

The method includes: obtaining first layers of an $x^{th}$ first frame image, where x is an integer greater than 0; determining a second layer based on a blurring tag in layer information of the first layers and a layer sequence; if it is determined that the second layer includes a to-be-transcoded video layer, performing blurring composition based on a transcoding result of an $(x-1)^{th}$ frame of a to-be-transcoded video in the to-be-transcoded video layer, to obtain a composition result having a blur effect of the $x^{th}$ first frame image, where the transcoding result of the $(x-1)^{th}$ frame of the to-be-transcoded video is obtained through transcoding performed during composition of an $(x-1)^{th}$ first frame image; and performing display based on the composition result having the blur effect of the $x^{th}$ first frame image.

During control blurring, according to the transcoding method provided in this embodiment, when a blurred layer includes a to-be-transcoded video layer, blurring composition may be performed by using a transcoding result of an $(x-1)^{th}$ frame of a to-be-transcoded video, to obtain a composition result having a blur effect of an $x^{th}$ first frame image. During blurring composition, a transcoding result obtained through transcoding is used, and blurring composition and hardware transcoding are performed asynchronously, so that time spent on waiting for completion of transcoding can be reduced. In this way, a probability of composition process blockage can be reduced, and a composition speed is effectively improved. As a result, visual effect is smoother, and visual experience of a user is improved.

The transcoding method provided in embodiments of this application may be applied to a terminal device such as a mobile phone, a tablet computer, a wearable device, an in-vehicle device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the terminal device is not limited in embodiments of this application.

Figure 31:
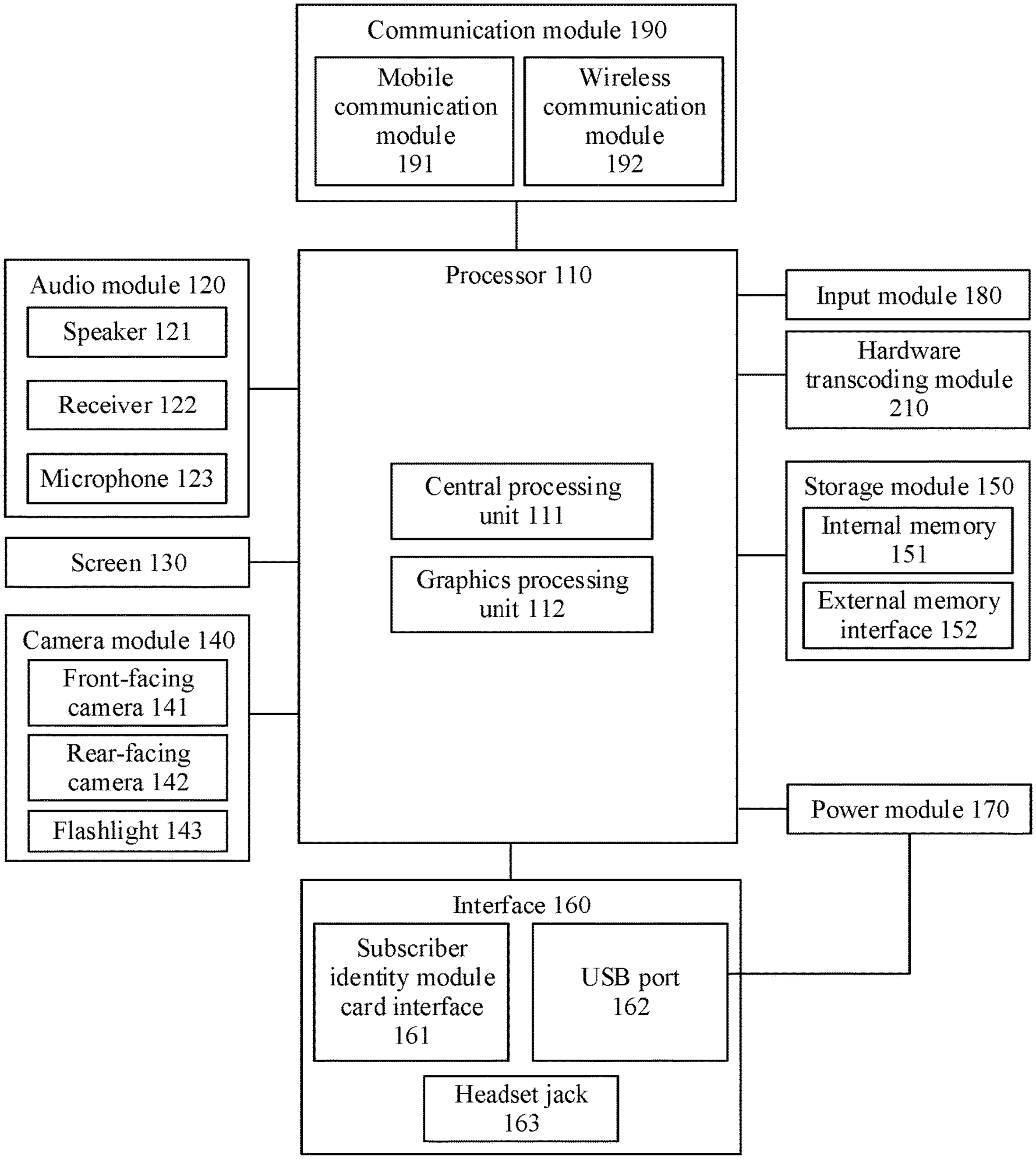
FIG. 31 is a schematic diagram of a structure of a terminal device according to an embodiment of this application.

For example, the terminal device is a mobile phone in descriptions herein. As shown in FIG. 2 and FIG. 31, the terminal device may further include a hardware transcoding module 210. A person skilled in the art may understand that the structures of the terminal device shown in FIG. 2 and FIG. 31 do not constitute a limitation on the terminal device. The terminal device may include more or fewer components than those shown in the figure, or some components may be combined, or a different component arrangement may be used.

The hardware transcoding module 210 may be a hardware transcoding chip, a hardware transcoding gateway, a module that provides a hardware transcoding function in a CPU, or the like.

The software structure of the electronic device in this embodiment of this application is the same as that in FIG. 2. Details are not described herein.

Figure 32:
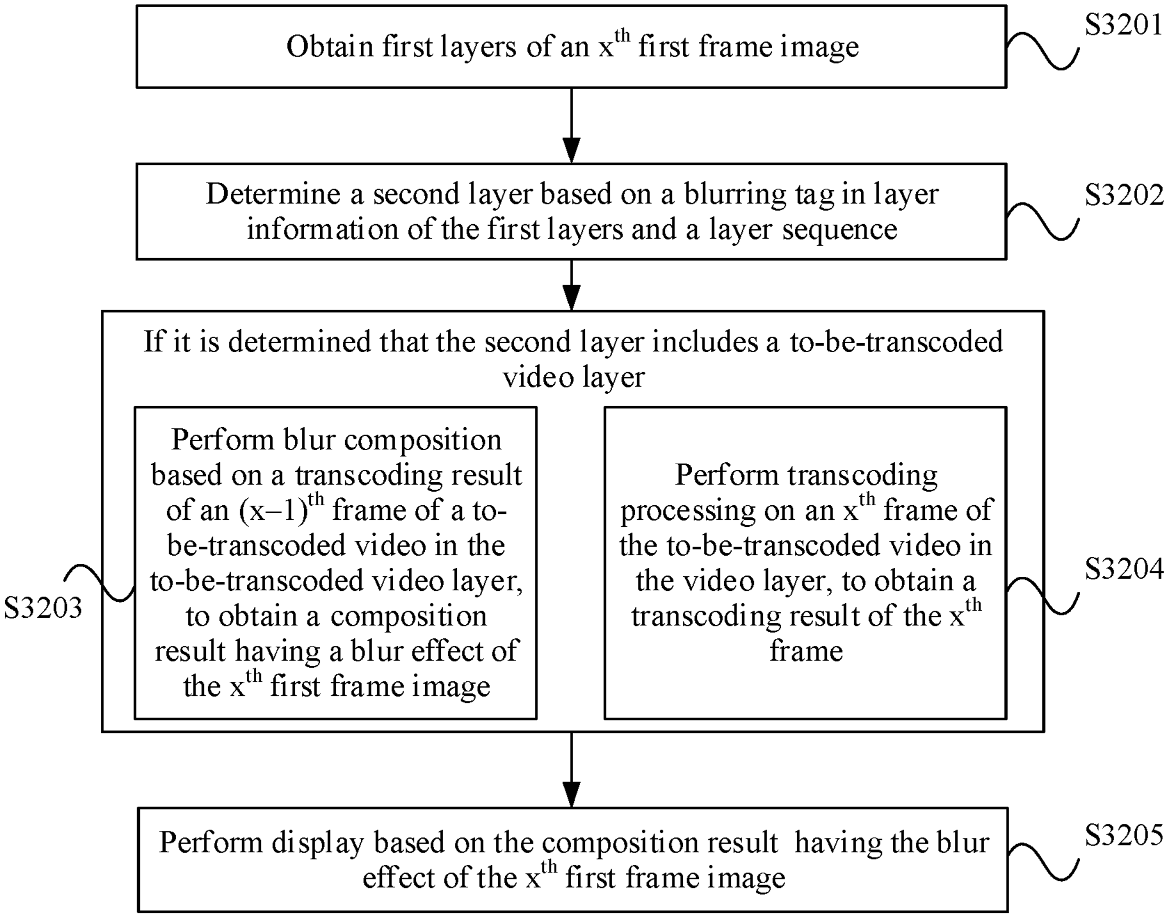
FIG. 32 is a schematic flowchart of a transcoding method according to an embodiment of this application.

FIG. 32 is a schematic flowchart of a transcoding method according to this application. By way of example and not limitation, the method may be implemented on the foregoing electronic device.

Refer to FIG. 32. Processing a to-be-transcoded video according to the transcoding method provided in this application may include the following steps.

S3201: Obtain first layers of an $x^{th}$ first frame image.

S3202: Determine a second layer based on a blurring tag in layer information of the first layers and a layer sequence.

A layer is a unit for drawing an image, and memory space corresponding to the layer may be used to store a drawing result and layer information. The layer information may include layer property information such as a color gamut space, a layer position, a layer identifier, a layer size, and a layer resolution. The layer information may further include other layer-related information, for example, may further include a blurring tag, a blurring parameter, and the like.

In some system architectures, one application may correspond to at least one layer. For example, in an Android system, one application includes at least one activity component (activity), where the activity is a visualized application component, and one activity may correspond to one layer. For example, an activity can be displayed in a form of a key, text, or check box.

Layer drawing is to draw control content that is provided by an application and that corresponds to a layer in a memory corresponding to the layer, to obtain a drawing result corresponding to the layer. Layer composition is to overlay drawing results of one or more layers corresponding to a frame image according to a layer sequence to obtain a composition result. The composition result can be used to display a frame image on a screen.

A drawing result of the first frame image includes drawing results of one or more layers corresponding to the first frame image. For example, if the first frame image includes one or more applications, and each application includes at least one activity, the drawing result of the first frame image includes a drawing result of each activity on a corresponding layer.

The layer sequence refers to a sequence of one or more first layers arranged in a direction perpendicular to a screen. The layer sequence can be specified by an application when the application creates the layer, and the layer sequence can be stored in a composer (surfaceflinger).

In some implementations, the first layer may be created by the application to draw a drawing result of the application (a window image of the application) or a drawing result of a control invoked by the application (a window image of the control).

Figure 33:
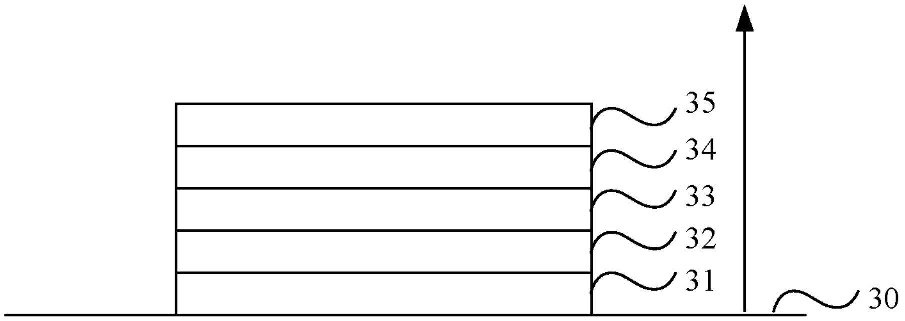
FIG. 33 is a schematic diagram of a sequence of first layers in a transcoding method according to an embodiment of this application.

When a plurality of first layers are used for overlaying, an overlaying sequence of each first layer needs to be determined according to a layer sequence. For example, it is assumed that there are five first layers: a first layer 1, a first layer 2, a first layer 3, a first layer 4, and a first layer 5. In this case, the first layer 1 is a bottom layer in an outward direction perpendicular to the display screen, and the first layer 5 is a top layer in the outward direction perpendicular to the display screen. For example, FIG. 33 shows a sequence of a plurality of first layers, including a first layer 1 (31), a first layer 2 (32), a first layer 3 (33), a first layer 4 (34), and a first layer 5 (35). The first layer 1 is in a position closest to a display apparatus 30 among all the layers. An overlaying direction of the first layers is an outward direction perpendicular to the display apparatus 30 (a direction indicated by an arrow), that is, the first layer 5 is a top layer.

S3203: If it is determined that the second layer includes a to-be-transcoded video layer, perform blurring composition based on a transcoding result of an $(x-1)^{th}$ frame of a to-be-transcoded video in the to-be-transcoded video layer, to obtain a composition result having a blur effect of the $x^{th}$ first frame image.

The transcoding result of the $(x-1)^{th}$ frame of the to-be-transcoded video is obtained through transcoding performed during composition of an $(x-1)^{th}$ first frame image.

S3204: If it is determined that the second layer includes the to-be-transcoded video layer, perform transcoding processing on an $x^{th}$ frame of the to-be-transcoded video in the video layer, to obtain a transcoding result of the $x^{th}$ frame.

In some implementations, the determining that the second layer includes the to-be-transcoded video layer includes: traversing second layers to obtain a compression format of each second layer; if the compression format of the second layer is a video compression format, determining that the second layer is a video layer; obtaining a list of video compression formats supported by a graphics processing unit; and if the compression format of the second layer is not on the list of the video compression formats supported by the GPU, determining that the second layer is the to-be-transcoded video layer.

In some implementations, each second layer corresponds to memory space used to store content of the layer, and a compression format of the content stored in the memory space may be obtained and used as the compression format of the second layer. The video compression format may include HFBC, AFBC, and the like. If the compression format of the second layer is HFBC or AFBC, it may be determined that the second layer is a video layer. When the list of the video compression formats supported by the GPU is obtained, a query instruction may be sent to the GPU by using an HAL layer, to query the video compression formats supported by the GPU. For example, the list supported by the GPU includes AFBC, but the obtained compression format of the second layer is HFBC. The GPU cannot directly process a video in the HFBC format, the second layer may be determined as a to-be-transcoded video layer.

In some implementations, before blurring composition is performed based on the transcoding result of the $(x-1)^{th}$ frame of the to-be-transcoded video in the to-be-transcoded video layer, detection of a transcoding completion flag of the $(x-1)^{th}$ frame may be first performed. If the transcoding completion flag of the $(x-1)^{th}$ frame is detected, blurring composition is performed based on the transcoding result of the $(x-1)^{th}$ frame of the to-be-transcoded video in the to-be-transcoded video layer. If the transcoding completion flag of the $(x-1)^{th}$ frame is not detected, after transcoding processing for the $(x-1)^{th}$ frame of the to-be-transcoded video is completed, blurring composition is performed based on the transcoding result of the $(x-1)^{th}$ frame of the to-be-transcoded video in the to-be-transcoded video layer.

It should be noted that detecting the completion flag refers to detecting the transcoding completion flag of the $(x-1)^{th}$ frame. When the transcoding completion flag of the $(x-1)^{th}$ frame is detected, it indicates that transcoding of the $(x-1)^{th}$ frame is completed. The transcoding result of the $(x-1)^{th}$ frame may be directly used for blurring composition. Otherwise, blurring composition can be performed only after transcoding of the $(x-1)^{th}$ frame is completed and the transcoding result of the $(x-1)^{th}$ frame is obtained.

In some implementations, when blurring composition is performed based on the transcoding result of the $(x-1)^{th}$ frame of the to-be-transcoded video, the transcoding result of the $(x-1)^{th}$ frame stored in a transcoding buffer corresponding to the $(x-1)^{th}$ frame may be uploaded to the GPU in a composition process (surfaceflinger) by using EGLImage, and then a texture is drawn and used for blurring composition. The transcoding result refers to data stored in a buffer after data code that cannot be directly used by a GPU of a current terminal device is converted into usable data code. For example, the to-be-transcoded video is encoded by using HFBC when being created, but a GPU of a current terminal device supports AFBC rather than HFBC. In this case, the transcoding result of the $(x-1)^{th}$ frame in the to-be-transcoded video is an image file of the $(x-1)^{th}$ frame encoded by using AFBC.

It should be noted that the EGLImage is a shared resource type created by an application programming interface (Application Programming Interface, API) of an EGL client such as OpenGL or OpenVG. Although the EGLImage is intended for two-dimensional (2D) image data sharing, a resource type and a sharing purpose of shared data are not clearly defined. Therefore, theoretically, the EGLImage may also be used to share data of other resource types, such as text data and audio data. In this application, the EGLImage is configured to create a 2D texture based on a transcoding result shared therein.

For example, the transcoding result of the $(x-1)^{th}$ frame is stored in a buffer of the video layer. The surfaceflinger can create an EGLImage object. When the EGLImage object is created, a target (Target) and a buffer (Buffer) need to be considered. The target can determine an EGLImage creation manner. For example, in an Android system, a target named "EGL_NATIVE_BUFFER_ANDROID" is specially defined. This target supports creating an EGLImage object by using a structure like "ANativeWindowBuffer". A buffer corresponds to data used for creating the EGLImage object. For example, in this embodiment, the data corresponding to the buffer is the transcoding result of the $(x-1)^{th}$ frame.

It should be further noted that a texture generated by the GPU is a pixel format that can be recognized by the GPU, and can be quickly addressed and sampled. Common GPU texture formats include RGB-565, RGBA-4444, RGBA-5551, RGB-888, and RGBA-8888. A GPU texture can be compressed to reduce space occupied by the texture. For example, if the terminal device is a mobile device such as a mobile phone or a tablet computer, the texture may be compressed based on an embedded-system three-dimensional graphics library (OpenGL for Embedded Systems, OpenGL ES). Common texture compression based on OpenGL ES includes Ericsson texture compression (Ericsson texture compression, ETC1), PowerVR texture compression (PowerVR texture compression, PVRTC), ATI texture compression (ATI texture compression, ATITC), S3 texture compression (S3 texture compression, S3TC), and the like. After the texture generated by the GPU is encoded by a CPU, a corresponding image file can be obtained for blurring composition.

In some implementations, the first layer includes a drawing result of the first frame image.

The performing blurring composition based on a transcoding result of an $(x-1)^{th}$ frame of a to-be-transcoded video in the to-be-transcoded video layer, to obtain a composition result having a blur effect of the $x^{th}$ first frame image includes: performing composition to obtain a blurred layer based on the second layer and a blurring parameter of a first control in the first layer, where the video layer in the second layer includes the transcoding result of the $(x-1)^{th}$ frame of the to-be-transcoded video, and the blurred layer includes an unblurred area and an area blurred based on the blurring parameter of the first control; and obtaining, based on the blurred layer and an unblurred layer, the composition result having the blur effect of the first frame image.

The second layer is a layer that is in the first layers and that is used to generate the blurred layer, the unblurred layer is a first layer that is not indicated by a blurring tag, and the blurring parameter includes a dynamic parameter and a static parameter. The dynamic parameter is a parameter that is of the first control and that changes over time. The dynamic parameter includes one or more of coordinates, a size, a corner radius, and transparency of the control. The static parameter includes a blur type and a blur strength.

In some implementations, the performing transcoding processing on an $x^{th}$ frame of the to-be-transcoded video in the video layer, to obtain a transcoding result of the $x^{th}$ frame includes: obtaining a hardware transcoding service; performing transcoding processing on the $x^{th}$ frame of the to-be-transcoded video by using the hardware transcoding service; and after transcoding processing for the $x^{th}$ frame of the to-be-transcoded video is completed, storing the transcoding processing result of the $x^{th}$ frame of the to-be-transcoded video, and adding a transcoding completion flag marking the $x^{th}$ frame.

In some implementations, the performing transcoding processing on the $x^{th}$ frame of the to-be-transcoded video by using the hardware transcoding service includes: obtaining a first compression format of the $x^{th}$ frame of the to-be-transcoded video; and sending the $x^{th}$ frame of the to-be-transcoded video to a hardware transcoding module, and converting the first compression format into a second compression format by using the hardware transcoding module, to obtain the transcoding result of the $x^{th}$ frame of the to-be-transcoded video.

It should be noted that the hardware transcoding module may be a hardware transcoding chip or a module that provides a hardware transcoding function in the CPU. The $x^{th}$ frame of the to-be-transcoded video and the first compression format of the to-be-transcoded video may be first obtained for transcoding. The $x^{th}$ frame of the to-be-transcoded video is sent to the hardware transcoding module, and the first compression format is converted into the second compression format, to obtain the transcoding result of the $x^{th}$ frame and store the transcoding result into a transcoding buffer corresponding to the $n^{th}$ frame.

For example, if the hardware transcoding module is a module that provides a hardware transcoding function in the CPU, a transcoding thread may obtain permission for the hardware transcoding service from the CPU, and then transmit the $x^{th}$ frame (whose compression format is the first compression format, for example, HFBC) of the to-be-transcoded video to the buffer corresponding to the $x^{th}$ frame. The CPU performs transcoding processing on the $x^{th}$ frame in the buffer to obtain the transcoding result of the $x^{th}$ frame (whose compression format is the second compression format, such as AFBC), and stores the transcoding result in the buffer corresponding to the $x^{th}$ frame.

It should be noted that, after the transcoding result of the $x^{th}$ frame is obtained, a flag indicating that transcoding of the $x^{th}$ frame is completed may be further added to the buffer corresponding to the $x^{th}$ frame, so that the composition process determines that transcoding of the $x^{th}$ frame is completed, and then performs blurring composition on the $x^{th}$ frame. The buffer includes a property information storage area and a data storage area. The property information storage area may include a size, a location, and a plurality of identifiers of the buffer, and the added transcoding completion flag can be stored in this area. The transcoding result may be stored in the data storage area.

In some implementations, when x=1, the $x^{th}$ frame is the first frame of the to-be-transcoded video. In this case, the first frame of the to-be-transcoded video may be processed in the first period through synchronous transcoding. In the second period, blurring composition is performed by using a transcoding result of the first frame, and the second frame is transcoded at the same time. In this way, asynchronous processing is processed.

Alternatively, composition may be performed in the first period without using the video layer, and transcoding is performed only on the first frame of the to-be-transcoded video. Blurring composition is performed in the second period by using a transcoding result of the first frame of the to-be-transcoded video, and transcoding is performed on the second frame at the same time. In this way, asynchronous processing is implemented.

S3205: Perform display based on the composition result having the blur effect of the $x^{th}$ first frame image.

Figure 34A:
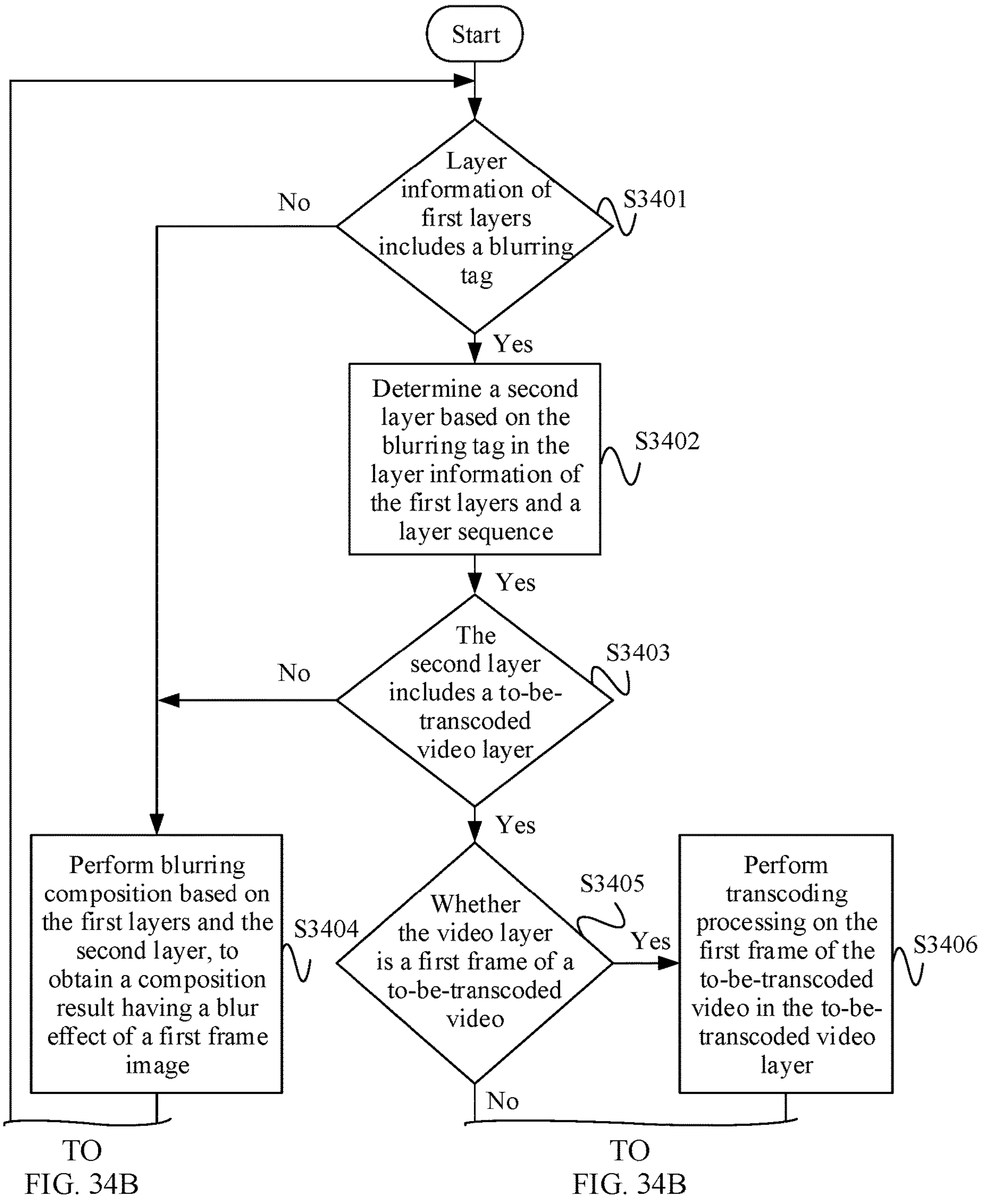
FIG. 34A and FIG. 34B are a schematic flowchart of another transcoding method according to an embodiment of this application.
Figure 34B:
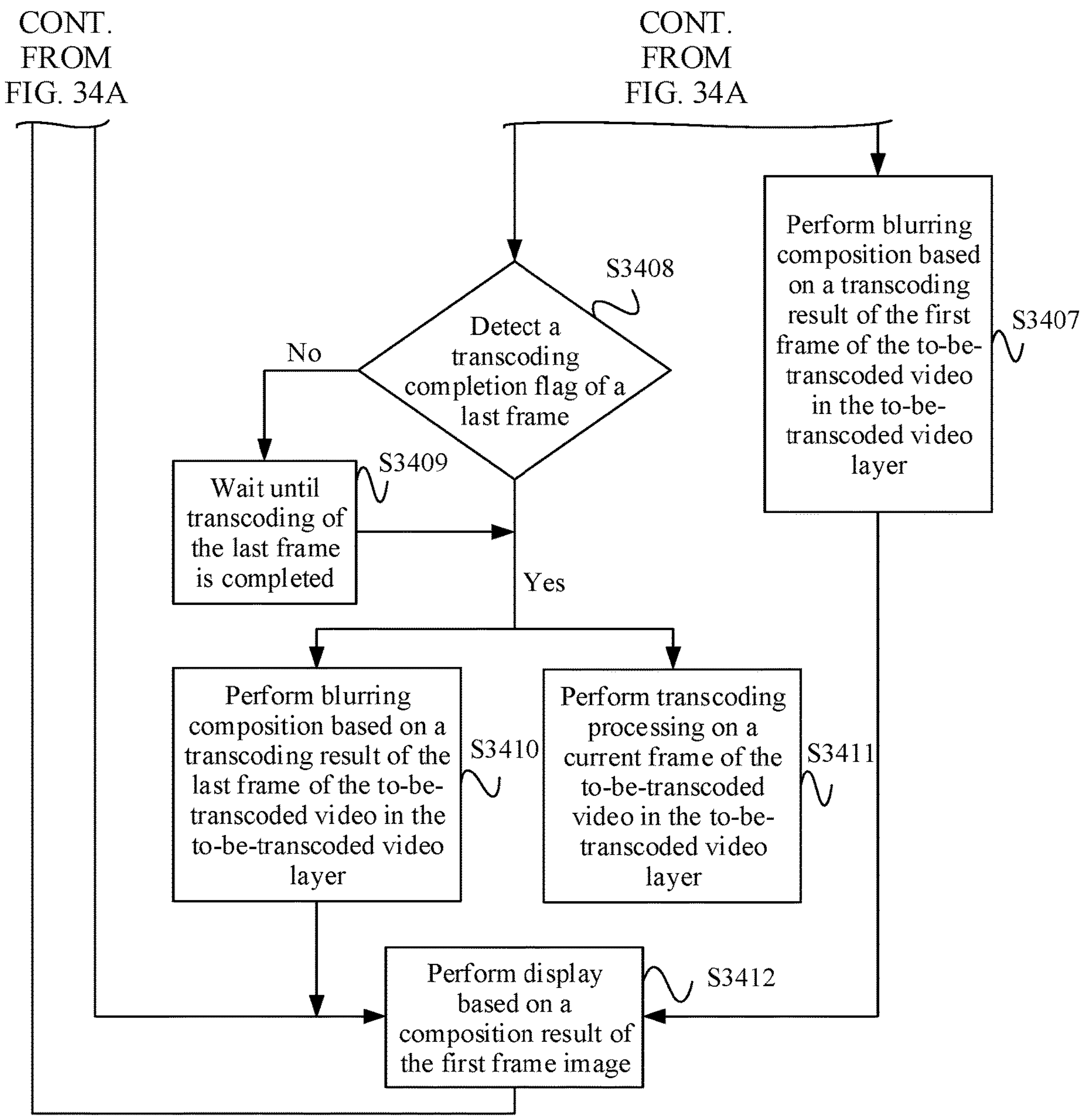

FIG. 34A and FIG. 34B are a schematic flowchart of an application of a transcoding method. Refer to FIG. 34A and FIG. 34B. The method includes the following steps.

S3401: Determine whether layer information of first layers includes a blurring tag; and if yes, perform S3402; otherwise, perform S3404.

S3402: Determine a second layer based on the blurring tag in the layer information of the first layers and a layer sequence.

In this embodiment, for implementations of S3401 and S3402, refer to the implementations in S201 and S202. Details are not described herein again.

S3403. Determine whether the second layer includes a to-be-transcoded video layer; and if yes, perform S3405; otherwise, perform S3404.

In this embodiment, for determining whether the second layer includes the to-be-transcoded video layer, refer to the manner shown in S203 and S204. Details are not described herein again.

S3404: Perform blurring composition based on the first layers and the second layer, to obtain a composition result having a blur effect of a first frame image, and perform S3412.

In this embodiment, for a manner of performing blurring composition based on the first layers and the second layer to obtain the composition result having the blur effect of the first frame image, refer to the manner shown in S203 and S204. Details are not described herein again.

S3405: Determine whether the video layer is a first frame of a to-be-transcoded video; and if yes, perform S3406; otherwise, perform S3408.

In this embodiment, for determining whether the video layer is the first frame of the to-be-transcoded video, refer to the manner shown in S203 and S204. Details are not described herein again.

S3406: Perform transcoding processing on the first frame of the to-be-transcoded video in the to-be-transcoded video layer.

S3407: Perform blurring composition based on a transcoding result of the first frame of the to-be-transcoded video in the to-be-transcoded video layer, and perform S3412.

In this embodiment, S3406 and S3407 are a synchronous transcoding solution, and implementation details are not described herein.

For a method for converting synchronous transcoding into asynchronous transcoding, refer to the manners shown in S203 and S204. Details are not described herein again.

S3408: Determine whether a transcoding completion flag of a last frame is detected, and if yes, perform S3410 and S3411; otherwise, perform S3409.

S3409: Wait until transcoding of the last frame is completed, and then perform S3410 and S3411.

S3410: Perform blurring composition based on a transcoding result of the last frame of the to-be-transcoded video in the to-be-transcoded video layer.

S3411: Perform transcoding processing on a current frame of the to-be-transcoded video in the to-be-transcoded video layer.

In this embodiment, for the asynchronous transcoding method in S3408 to S3409, refer to the manner shown in S203 and S204. Details are not described herein again.

S3412: Perform display based on the composition result of the first frame image.

Figure 35:
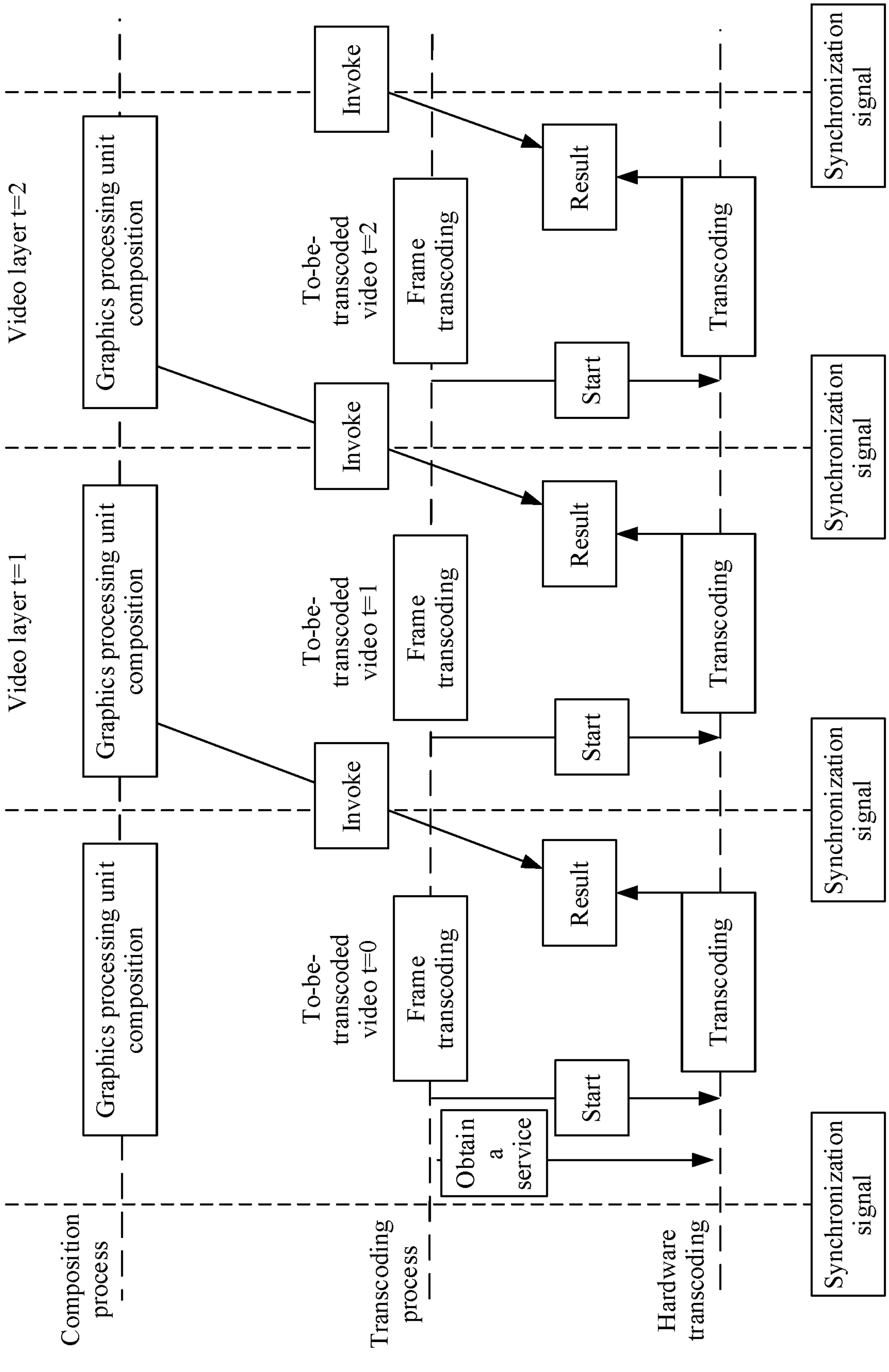
FIG. 35 is a schematic diagram of timing of asynchronous transcoding in a transcoding method according to an embodiment of this application.

The following describes a transcoding method provided in this application with reference to FIG. 35.

As shown in FIG. 35, a horizontal axis in the figure indicates time, and a vertical axis indicates actions performed by different processes or devices.

Duration between two synchronization signals is one period. It is assumed that a screen refresh rate for display is 60 Hz, and the period is 16.667 ms.

Refer to FIG. 7. In the first period, graphics processing unit composition (GPU composition) may stay idle for one period, and at the same time, a transcoding process obtains a hardware transcoding service to transcode a first frame (t=0) of a to-be-transcoded video. A transcoding result is stored in a buffer corresponding to the first frame, and a transcoding process adds a transcoding success flag to the buffer corresponding to the first frame.

In the second period, the GPU composition process invokes the transcoding result stored in the buffer corresponding to the first frame, and generates, in a video layer, a texture of the first frame (t=1) for blurring composition. In addition, a transcoding thread obtains the hardware transcoding service to transcode the second frame (t=1) of the to-be-transcoded video, and a transcoding result is stored in a buffer corresponding to the second frame. In addition, the transcoding thread adds a transcoding success flag to the buffer corresponding to the second frame.

In this application, each frame of the to-be-transcoded video is transcoded, and blurring composition is performed based on a transcoding result of a last frame, where a composition result is transferred for display. Therefore, time for waiting for transcoding to complete can be reduced. This effectively improves a blurring composition speed, and reduces problems of frame loss and frame freezing.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this application.

Figure 36:
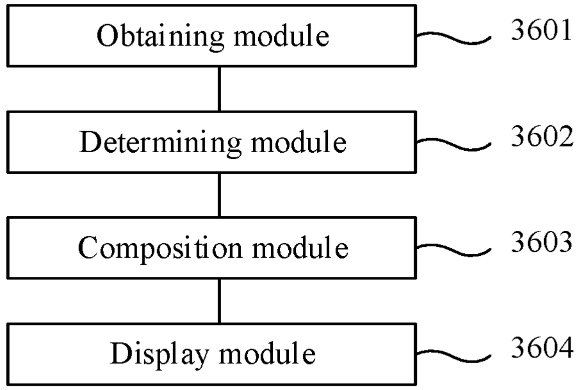
FIG. 36 is a schematic diagram of a structure of a transcoding apparatus according to an embodiment of this application.

Corresponding to the transcoding method in the foregoing embodiments, FIG. 36 is a block diagram of a structure of a transcoding apparatus according to an embodiment of this application. For ease of description, only parts related to embodiments of this application are shown.

Refer to FIG. 36. An embodiment of this application provides a transcoding apparatus. The apparatus includes:

- an obtaining module 3601, configured to obtain first layers of an $x^{th}$ first frame image, where x is an integer greater than 0;
- a determining module 3602, configured to determine a second layer based on a blurring tag in layer information of the first layers and a layer sequence;
- a composition module 3603, configured to: if it is determined that the second layer includes a to-be-transcoded video layer, perform blurring composition based on a transcoding result of an $(x-1)^{th}$ frame of a to-be-transcoded video in the to-be-transcoded video layer, to obtain a composition result having a blur effect of the $x^{th}$ first frame image, where the transcoding result of the $(x-1)^{th}$ frame of the to-be-transcoded video is obtained through transcoding performed during composition of an $(x-1)^{th}$ first frame image; and
- a display module 3604, configured to perform display based on the composition result having the blur effect of the $x^{th}$ first frame image.

In some implementations, the determining module 3602 is further configured to traverse second layers to obtain a compression format of each second layer; if the compression format of the second layer is a video compression format, determine that the second layer is a video layer; obtain a list of video compression formats supported by a graphics processing unit; and if the compression format of the second layer is not on the list of the video compression formats supported by the GPU, determine that the second layer is the to-be-transcoded video layer.

Figure 37:
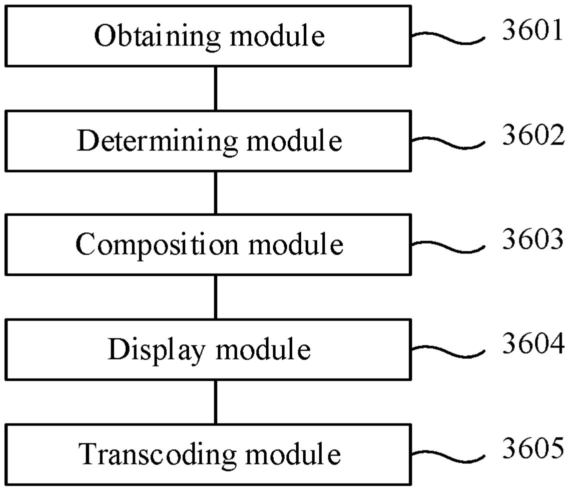
FIG. 37 is a schematic diagram of a structure of another transcoding apparatus according to an embodiment of this application.

Refer to FIG. 37. In some implementations, the apparatus further includes a transcoding module 3605, configured to perform transcoding processing on an $x^{th}$ frame of the to-be-transcoded video in the video layer, to obtain a transcoding result of the $x^{th}$ frame.

In some implementations, the transcoding module 3605 is specifically configured to obtain a hardware transcoding service; perform transcoding processing on the $x^{th}$ frame of the to-be-transcoded video by using the hardware transcoding service; and after transcoding processing for the $x^{th}$ frame of the to-be-transcoded video is completed, store a transcoding processing result of the $x^{th}$ frame of the to-be-transcoded video, and add a transcoding completion flag marking the $x^{th}$ frame.

In some implementations, the transcoding module 3605 is specifically configured to obtain a first compression format of the $x^{th}$ frame of the to-be-transcoded video; and send the $x^{th}$ frame of the to-be-transcoded video to a hardware transcoding module, and convert the first compression format into a second compression format by using the hardware transcoding module, to obtain the transcoding result of the $x^{th}$ frame of the to-be-transcoded video.

Figure 38:
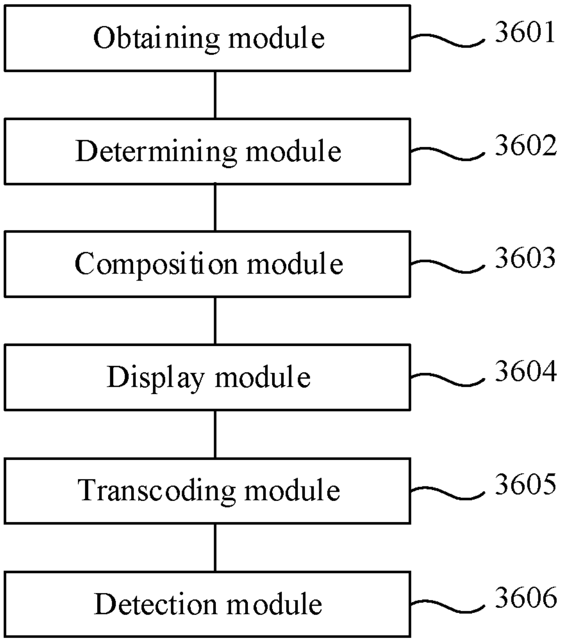
FIG. 38 is a schematic diagram of a structure of another transcoding apparatus according to an embodiment of this application.

Refer to FIG. 38. In some implementations, the apparatus further includes a detection module 3606, configured to detect a transcoding completion flag of the $(x-1)^{th}$ frame.

The composition module 3603 is specifically configured to: if the transcoding completion flag of the $(x-1)^{th}$ frame is detected, perform blurring composition based on the transcoding result of the $(x-1)^{th}$ frame of the to-be-transcoded video in the to-be-transcoded video layer; or if the transcoding completion flag of the $(x-1)^{th}$ frame is not detected, after transcoding processing for the $(x-1)^{th}$ frame of the to-be-transcoded video is completed, perform blurring composition based on the transcoding result of the $(x-1)^{th}$ frame of the to-be-transcoded video in the to-be-transcoded video layer.

In some implementations, the first layer includes a drawing result of the first frame image. The composition module 3603 is specifically configured to perform composition to obtain a blurred layer based on the second layer and a blurring parameter of a first control in the first layer, where the video layer in the second layer includes the transcoding result of the $(x-1)^{th}$ frame of the to-be-transcoded video, and the blurred layer includes an unblurred area and an area that is blurred based on the blurring parameter of the first control; and obtain, based on the blurred layer and the unblurred layer, the composition result having the blur effect of the first frame image.

In some implementations, the second layer is a layer that is in the first layers and that is used to generate the blurred layer.

In some implementations, the unblurred layer is a first layer not indicated by the blurring tag.

In some implementations, the blurring parameter includes a dynamic parameter and a static parameter. The dynamic parameter is a parameter that is of the first control and that changes over time. The dynamic parameter includes one or more of coordinates, a size, a corner radius, and transparency of the control. The static parameter includes a blur type and a blur strength.

It should be noted that content such as information exchange between the foregoing modules and an execution process is based on a same concept as that in the method embodiments of this application. For specific functions and technical effects of the content, refer to the method embodiments. Details are not described herein again.

A person skilled in the art may clearly understand that, for the purpose of convenient and brief description, division of the foregoing functional units and modules is merely used as an example for description. In an actual application, the foregoing functions may be allocated to different functional units and modules for implementation according to a requirement. That is, an inner structure of the apparatus is divided into different functional units or modules, to implement all or some of the functions described above. Functional units and modules in embodiments may be integrated into one processing unit, or each of the units may exist alone physically, or two or more units may be integrated into one unit. The integrated unit may be implemented in a form of hardware, or may be implemented in a form of a software functional unit. In addition, specific names of the functional units and modules are used merely for ease of distinguishing between the functional units and modules, but are not intended to limit the protection scope of this application. For a specific working process of the units or modules in the foregoing system, refer to a corresponding process in the foregoing method embodiments. Details are not described herein again.

Figure 39:
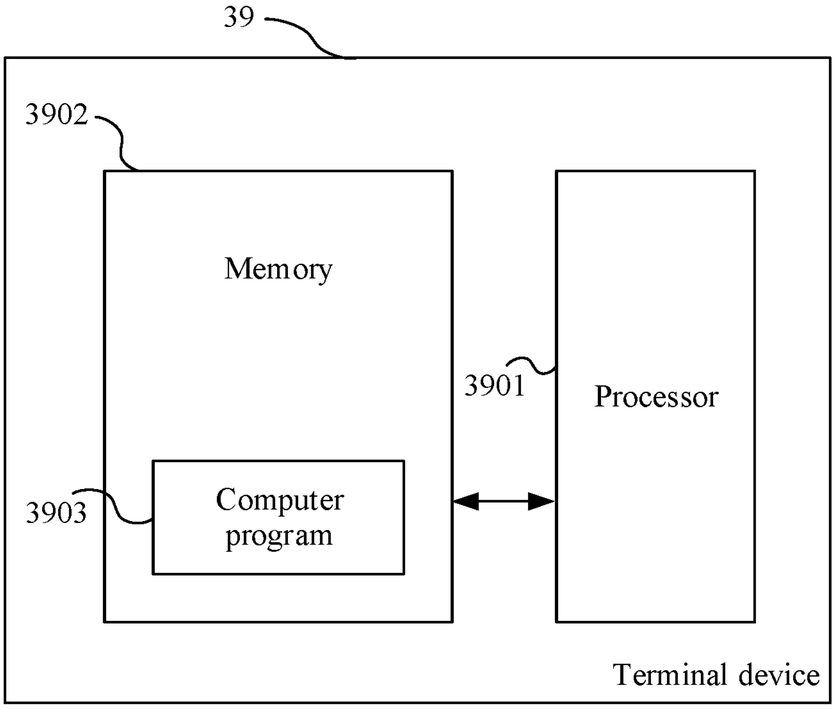
FIG. 39 is a schematic diagram of a structure of another terminal device according to an embodiment of this application.

FIG. 39 is a schematic diagram of a structure of a terminal device according to an embodiment of this application. As shown in FIG. 39, a terminal device 39 in this embodiment includes: at least one processor 3901 (only one processor is shown in FIG. 39), a memory 3902, and a computer program 3903 that is stored in the memory 3902 and that can be run on the at least one processor 3901. The processor 3901 executes the computer program 3903 to implement the steps in the foregoing method embodiments.

Figure 11:
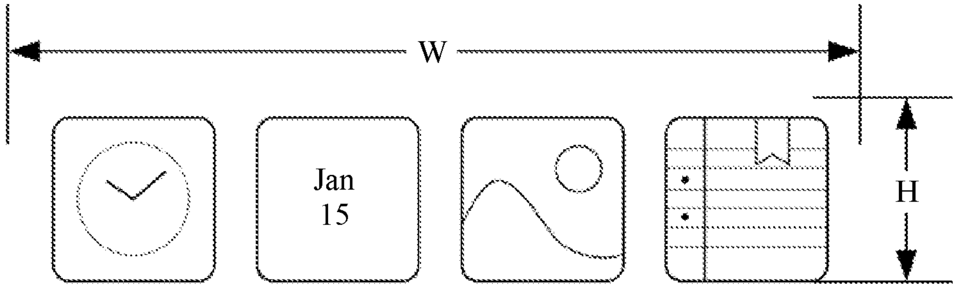
FIG. 11 is a schematic diagram of an application scenario of another control blurring method according to an embodiment of this application.

The terminal device 39 may be a terminal device such as a mobile phone, a desktop computer, a notebook computer, a palmtop computer, or a cloud server. The terminal device 39 may include but is not limited to including the processor 3901 and the memory 3902. A person skilled in the art may understand that FIG. 11 is merely an example of the terminal device 39, and does not constitute a limitation on the terminal device 39. The terminal device may include more or fewer components than those shown in the figure, or some components may be combined, or different components may be used. For example, the terminal device may further include an input/output device, a network access device, or the like.

The processor 3901 may be a central processing unit (Central Processing Unit, CPU). The processor 3901 may alternatively be another general-purpose processor, a digital signal processor (Digital Signal Processor, DSP), an application-specific integrated circuit (Application-Specific Integrated Circuit, ASIC), a field-programmable gate array (Field-Programmable Gate Array, FPGA) or another programmable logic device, a discrete gate or a transistor logic device, or a discrete hardware component. The general-purpose processor may be a microprocessor, or the processor may be any conventional processor or the like.

In some embodiments, the memory 3902 may be an internal storage unit of the terminal device 39, for example, a hard disk drive or an internal memory of the terminal device 39. In some other embodiments, the memory 3902 may alternatively be an external storage device of the terminal device 39, for example, a swappable hard disk, a smart media card (Smart Media Card, SMC), a secure digital (Secure Digital, SD) card, a flash card (Flash Card), or the like that is provided on the terminal device 39. Further, the memory 3902 may alternatively include both the internal storage unit and the external storage device of the terminal device 39. The memory 3902 is configured to store an operating system, an application, a boot loader (Boot Loader), data, another program, and the like, for example, program code of a computer program. The memory 3902 may further be configured to temporarily store data that has been output or is to be output.

An embodiment of this application further provides a computer-readable storage medium. The computer-readable storage medium stores a computer program. When a processor executes the computer program, the steps in the foregoing method embodiments can be implemented.

An embodiment of this application provides a computer program product. When the computer program product is run on a mobile terminal, the mobile terminal is enabled to implement steps in the foregoing method embodiments.

An embodiment of this application provides a chip system. The chip system includes a memory and a processor. The processor executes a computer program stored in the memory, to implement the steps in the foregoing method embodiments.

An embodiment of this application provides a chip system. The chip system includes a processor. The processor is coupled to the foregoing computer-readable storage medium. The processor executes a computer program stored in the computer-readable storage medium, to implement the steps in the foregoing method embodiments.

When an integrated unit is implemented in a form of a software functional unit and sold or used as an independent product, the integrated unit may be stored in a computer-readable storage medium. Based on such an understanding, in this application, all or some of the procedures of the methods in the foregoing embodiments may be implemented by a computer program instructing related hardware. The computer program may be stored in a computer-readable storage medium. When a processor executes the computer program, steps in the foregoing method embodiments can be implemented. The computer program includes computer program code. The computer program code may be in a source code form, an object code form, an executable file form, some intermediate forms, or the like. The computer-readable medium may include at least any entity or apparatus that can carry the computer program code to a terminal device, a recording medium, a computer memory, a read-only memory (Read-Only Memory, ROM), a random access memory (Random Access Memory, RAM), an electrical carrier signal, a telecommunication signal, and a software distribution medium, for example, a USB flash drive, a removable hard disk, a magnetic disk, or an optical disk. In some jurisdictions, the computer-readable medium cannot be the electrical carrier signal or the telecommunication signal according to legislation and patent practices.

In the foregoing embodiments, descriptions of all the embodiments have respective focuses. For a part that is not described in detail in an embodiment, refer to related descriptions in other embodiments.

A person of ordinary skill in the art may be aware that the units and algorithm steps described with reference to the examples in embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In the embodiments provided in this application, it should be understood that the disclosed transcoding method, apparatus, and device may be implemented in other manners. For example, the described embodiments of transcoding apparatus/terminal device are merely examples. For example, division of the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected according to an actual requirement to achieve objectives of the solutions of the embodiments.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A control blurring method, comprising:

obtaining, by a drawing and rendering process and from a drawing instruction of a first frame image of a plurality of frame images, a dynamic parameter of a first control in the first frame image and a static parameter of the first control, wherein the first control includes a control animation with the plurality of frame images, wherein the dynamic parameter of the first control and the static parameter of the first control are blurring parameters of the first control and included in the drawing instruction of the first frame image, the static parameter indicates a blur effect parameter when blurring processing is performed on all frames of the plurality of frame images, and the dynamic parameter changes over time and is used when blurring processing is performed on a current frame of the first frame image other than other frames of other frame images of the plurality of frame images;

sending, by drawing and rendering process, the static parameter of the first control to a window manager;

obtaining, by the drawing and rendering process, a drawing result of the first frame image;

encapsulating, by the drawing and rendering process, the drawing result of the first frame image and the dynamic parameter, to obtain an encapsulation result;

storing, by the drawing and rendering process, the encapsulation result in a frame buffer to generate a buffer entry corresponding to the first frame image;

sending, by the drawing and rendering process, an identifier of the buffer entry to a composition process;

obtaining, by the composition process, the static parameter of the first control from the window manager:

obtaining, by the composition process based on the identifier of the buffer entry, the drawing result of the first frame image and the dynamic parameter from the frame buffer;

performing, by the composition process, composition process to obtain a composition result of the first frame image in accordance with the static parameter of the first control from the window manager and the drawing result of the first frame image and the dynamic parameter obtained from the frame entry, wherein the performing the composition process comprises: performing blurring process, based on the static parameter of the first control, the drawing result of the first frame image, and the dynamic parameter, such that the composition result has a blur effect of the first frame image; and performing display based on the composition result of the first frame image.

2. The method of claim 1, wherein control property of the first control comprises a blurring tag indicating to perform blurring processing on the first control.

3. The method of claim 1, wherein the dynamic parameter comprises one or more of coordinates, a size, a corner radius, or transparency of the first control.

4. The method of claim 1, wherein the performing composition process comprises:

determining, based on the dynamic parameter, an area corresponding to the first control in the drawing result of the first frame image;

performing, based on the static parameter, blurring processing on the area corresponding to the first control in the drawing result of the first frame image, to obtain a blurred area image; and performing composition process based on the drawing result of the first frame image and the blurred area image, to obtain the composition result having the blur effect of the first frame image.

5. The method of claim 1, wherein the drawing result of the first frame image comprises a plurality of drawing results of a plurality of layers, the first control is in at least one of the plurality of layers, and the static parameter comprises a layer sequence for overlaying of drawing results of the first frame image.

6. A control blurring apparatus, comprising:

a processor, and a non-transitory computer-readable storage coupled to the processor and configured to store a computer program, the computer program comprising computer instructions that, when executed by the processor, cause the control blurring apparatus to perform:

obtaining, by a drawing and rendering process and from a drawing instruction of a first frame image of a plurality of frame images, a dynamic parameter of a first control in the first frame image and a static parameter of the first control, wherein the first control includes a control animation with the plurality of frame images, wherein the dynamic parameter of the first control and the static parameter of the first control are blurring parameters of the first control and included in the drawing instruction of the first frame image, the static parameter indicates a blur effect parameter when blurring processing is performed on all frames of the plurality of frame images, and the dynamic parameter changes over time and is used when blurring processing is performed on a current frame of the first frame image other than other frames of other frame images of the plurality of frame images;

sending, by the drawing and rendering process, the static parameter of the first control to a window manager;

obtaining, by the drawing and rendering process, a drawing result of the first frame image;

encapsulating, by the drawing and rendering process, the drawing result of the first frame image and the dynamic parameter, to obtain an encapsulation result;

storing, by the drawing and rendering process, the encapsulation result in a frame buffer to generate a buffer entry corresponding to the first frame image;

sending, by the drawing and rendering process, an identifier of the buffer entry to a composition process;

obtaining, by the composition process, the static parameter of the first control from the window manager:

obtaining, by the composition process based on the identifier of the buffer entry, the drawing result of the first frame image and the dynamic parameter from the frame entry;

performing, by the composition process, composition process to obtain a composition result of the first frame image in accordance with the static parameter of the first control from the window manager and the drawing result of the first frame image and the dynamic parameter obtained from the frame entry, wherein the performing the composition process comprises: performing blurring process, based on the static parameter of the first control, the drawing result of the first frame image, and the dynamic parameter, such that the composition result has a blur effect of the first frame image; and performing display based on the composition result of the first frame image.

7. The apparatus of claim 6, wherein control property of the first control comprises a blurring tag indicating to perform blurring processing on the first control.

8. The apparatus of claim 6, wherein the dynamic parameter comprises one or more of coordinates, a size, a corner radius, or transparency of the first control.

9. The apparatus of claim 6, wherein the computer instructions, when executed by the processor, cause the control blurring apparatus to perform:

determining, based on the dynamic parameter, an area corresponding to the first control in the drawing result of the first frame image;

performing, based on the static parameter, blurring processing on the area corresponding to the first control in the drawing result of the first frame image, to obtain a blurred area image; and performing composition based on the drawing result of the first frame image and the blurred area image, to obtain the composition result having the blur effect of the first frame image.

10. The apparatus of claim 6, wherein the drawing result of the first frame image comprises a plurality of drawing results of a plurality of layers, the first control is in at least one of the plurality of layers, and the static parameter comprises a layer sequence for overlaying of drawing results of the first frame image.

11. A non-transitory computer-readable storage medium, wherein the computer-readable storage medium stores a computer program, the computer program comprising computer instructions that, when executed by a processor, cause a control blurring apparatus to perform:

obtaining, by a drawing and rendering process and from a drawing instruction of a first frame image of a plurality of frame images, a dynamic parameter of a first control in the first frame image and a static parameter of the first control, wherein the first control includes a control animation with the plurality of frame images, wherein the dynamic parameter of the first control and the static parameter of the first control are blurring parameters of the first control and included in the drawing instruction of the first frame image, the static parameter indicates a blur effect parameter when blurring processing is performed on all frames of the plurality of frame images, and the dynamic parameter changes over time and is used when blurring processing is performed on a current frame of the first frame image other than other frames of other frame images of the plurality of frame images;

sending, by the drawing and rendering process, the static parameter of the first control to a window manager;

obtaining, by the drawing and rendering process, a drawing result of the first frame image;

encapsulating, by the drawing and rendering process, the drawing result of the first frame image and the dynamic parameter, to obtain an encapsulation result;

storing, by the drawing and rendering process, the encapsulation result in a frame buffer to generate a buffer entry corresponding to the first frame image;

sending, by the drawing and rendering process, an identifier of the buffer entry to a composition process;

obtaining, by the composition process, the static parameter of the first control from the window manager;

obtaining, by the composition process based on the identifier of the buffer entry, the drawing result of the first frame image and the dynamic parameter from the frame entry;

performing, by the composition process, composition process to obtain a composition result of the first frame image in accordance with the static parameter of the first control from the window manager and the drawing result of the first frame image and the dynamic parameter obtained from the frame entry, wherein the performing the composition process comprises:

performing blurring process, based on the static parameter of the first control, the drawing result of the first frame image, and the dynamic parameter, such that the composition result has a blur effect of the first frame image; and performing display based on the composition result of the first frame image.

12. The non-transitory computer-readable storage medium of claim 11, wherein the performing composition process comprises:

determining, based on the dynamic parameter, an area corresponding to the first control in the drawing result of the first frame image;

performing, based on a static parameter including a blur type and a blur strength, blurring processing on the area corresponding to the first control in the drawing result of the first frame image, to obtain a blurred area image; and performing composition process based on the drawing result of the first frame image and the blurred area image, to obtain the composition result having the blur effect of the first frame image.

13. The non-transitory computer-readable storage medium of claim 11, wherein the drawing result of the first frame image comprises a plurality of drawing results of a plurality of layers, the first control is in at least one of the plurality of layers, and the static parameter comprises a layer sequence for overlaying of drawing results of the first frame image.

* * * * *